US010783513B2

United States Patent
Davis

(10) Patent No.: US 10,783,513 B2
(45) Date of Patent: Sep. 22, 2020

(54) FACILITATING SENDING AND RECEIVING OF PAYMENTS USING MESSAGE-BASED CONTEXTUAL PROMPTS

(71) Applicant: Facebook, Inc., Menlo Park, CA (US)

(72) Inventor: Stephen Moore Davis, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 451 days.

(21) Appl. No.: 14/524,380

(22) Filed: Oct. 27, 2014

(65) Prior Publication Data

US 2016/0117670 A1 Apr. 28, 2016

(51) Int. Cl.
| | |
|---|---|
| *G06Q 30/00* | (2012.01) |
| *G06Q 20/32* | (2012.01) |
| *G06Q 20/40* | (2012.01) |
| *G06Q 20/02* | (2012.01) |

(52) U.S. Cl.
CPC ....... *G06Q 20/3255* (2013.01); *G06Q 20/027* (2013.01); *G06Q 20/40* (2013.01); *G06Q 20/405* (2013.01)

(58) Field of Classification Search
CPC .................................................... G06Q 20/32
USPC .. 705/39, 1.1, 40, 41, 42, 30, 14.32, 64, 78; 235/487, 380, 379; 273/292, 274
See application file for complete search history.

(56) References Cited

U.S. PATENT DOCUMENTS

| | | | |
|---|---|---|---|
| 7,680,888 B1 | 3/2010 | Marmaros et al. | |
| 8,661,046 B2* | 2/2014 | King | G06F 40/30 707/755 |
| 2004/0162882 A1 | 8/2004 | Mora | |
| 2011/0173252 A1 | 7/2011 | Eibach et al. | |
| 2012/0158589 A1* | 6/2012 | Katzin | G06Q 20/22 705/44 |
| 2014/0207679 A1* | 7/2014 | Cho | G06Q 20/3229 705/44 |
| 2014/0317208 A1 | 10/2014 | Hind | |

FOREIGN PATENT DOCUMENTS

| | | |
|---|---|---|
| JP | 2007-226794 A | 9/2007 |
| JP | 2010-519609 A | 6/2010 |

(Continued)

OTHER PUBLICATIONS

International Search Report as received in PCT/US2014/062459 dated Jun. 30, 2015.

(Continued)

*Primary Examiner* — John H. Holly
(74) *Attorney, Agent, or Firm* — Keller Jolley Preece

(57) ABSTRACT

The present disclosure relates to systems, methods, and devices for sending and receiving payments using an integrated payment and messaging system. In particular, the integrated payment and messaging system allows users to send and receive electronic payments as well as exchange messages. Additional implementations involve facilitating payment transaction by inferring payment events. Still further implementations involve facilitating payment transactions between groups of users. In addition to the foregoing, one or more implementations allow a user to initiate payment transactions without first providing a payment credential.

20 Claims, 34 Drawing Sheets

(56) References Cited

FOREIGN PATENT DOCUMENTS

JP      2012-185672      9/2012
WO   WO 2016-068854    5/2016

OTHER PUBLICATIONS

Office Action as received in Japanese Application 2017-517667 dated Sep. 4, 2018.
Office Action as received in Japanese Application 2017-517667 dated Apr. 23, 2019.

* cited by examiner

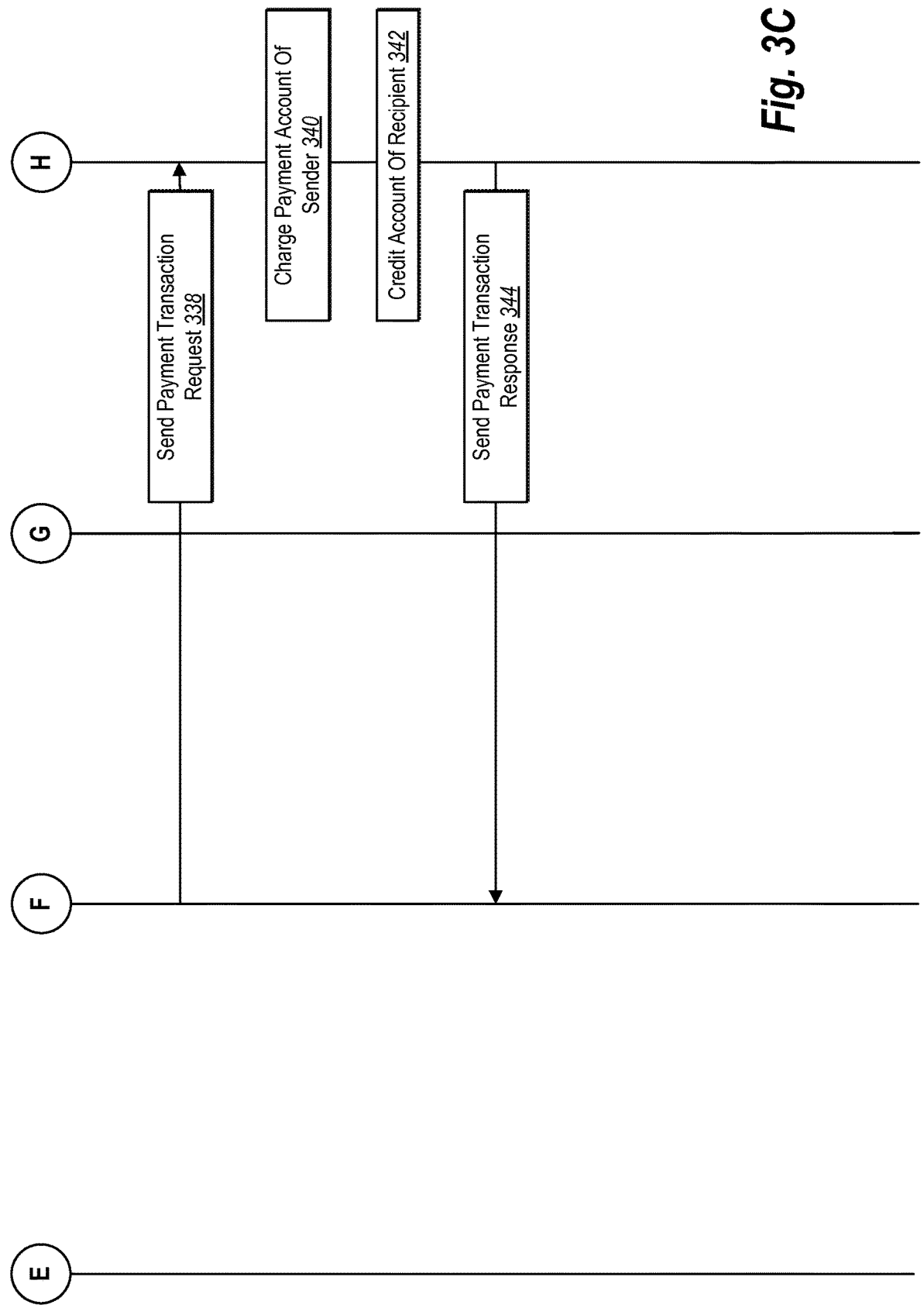

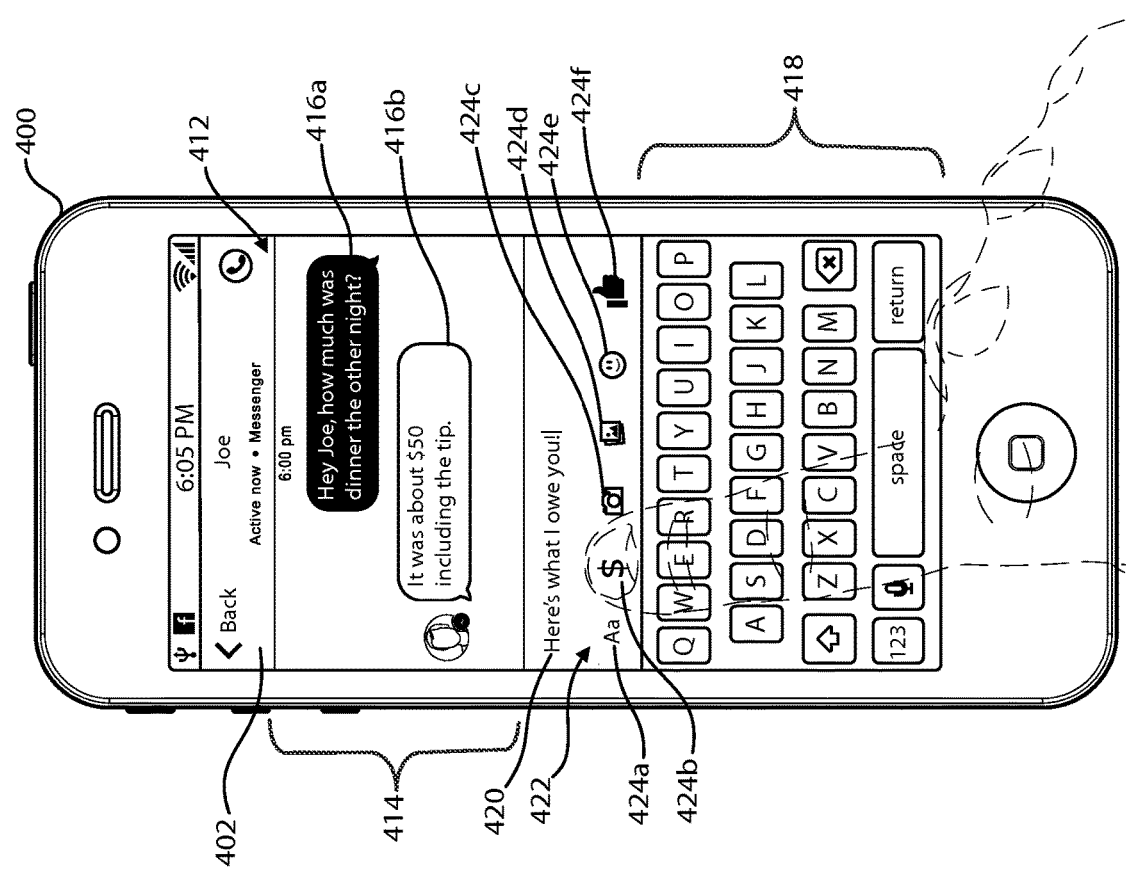
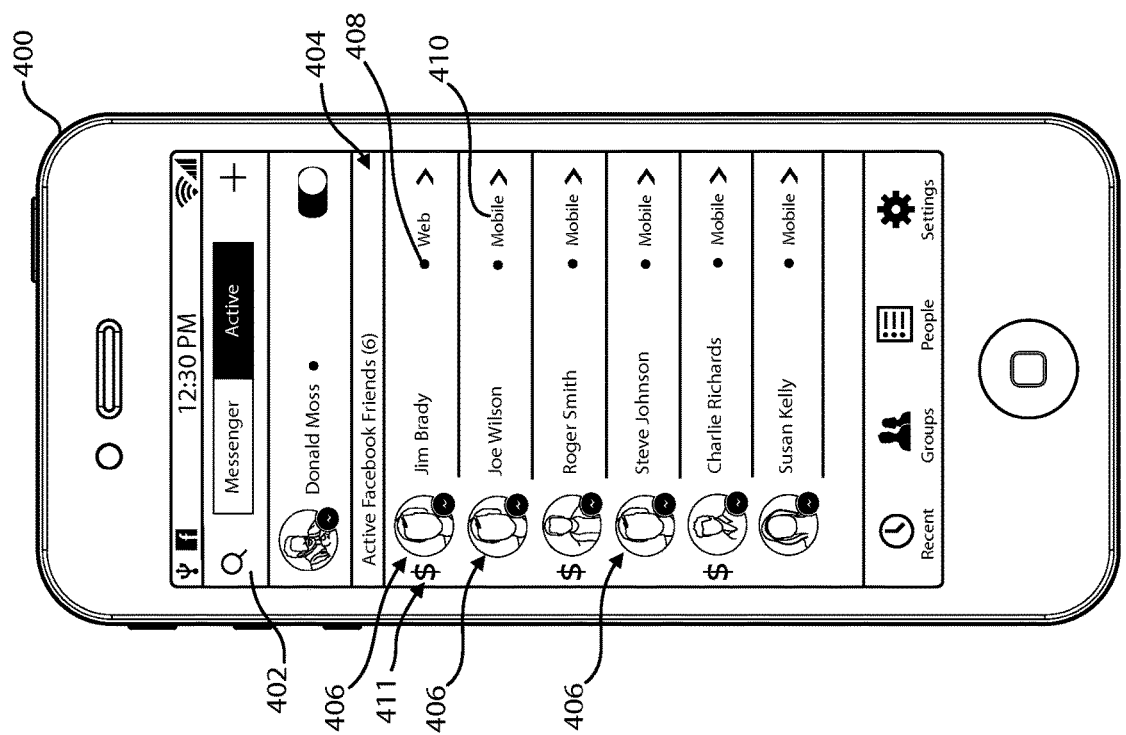
Fig. 4B
Fig. 4A

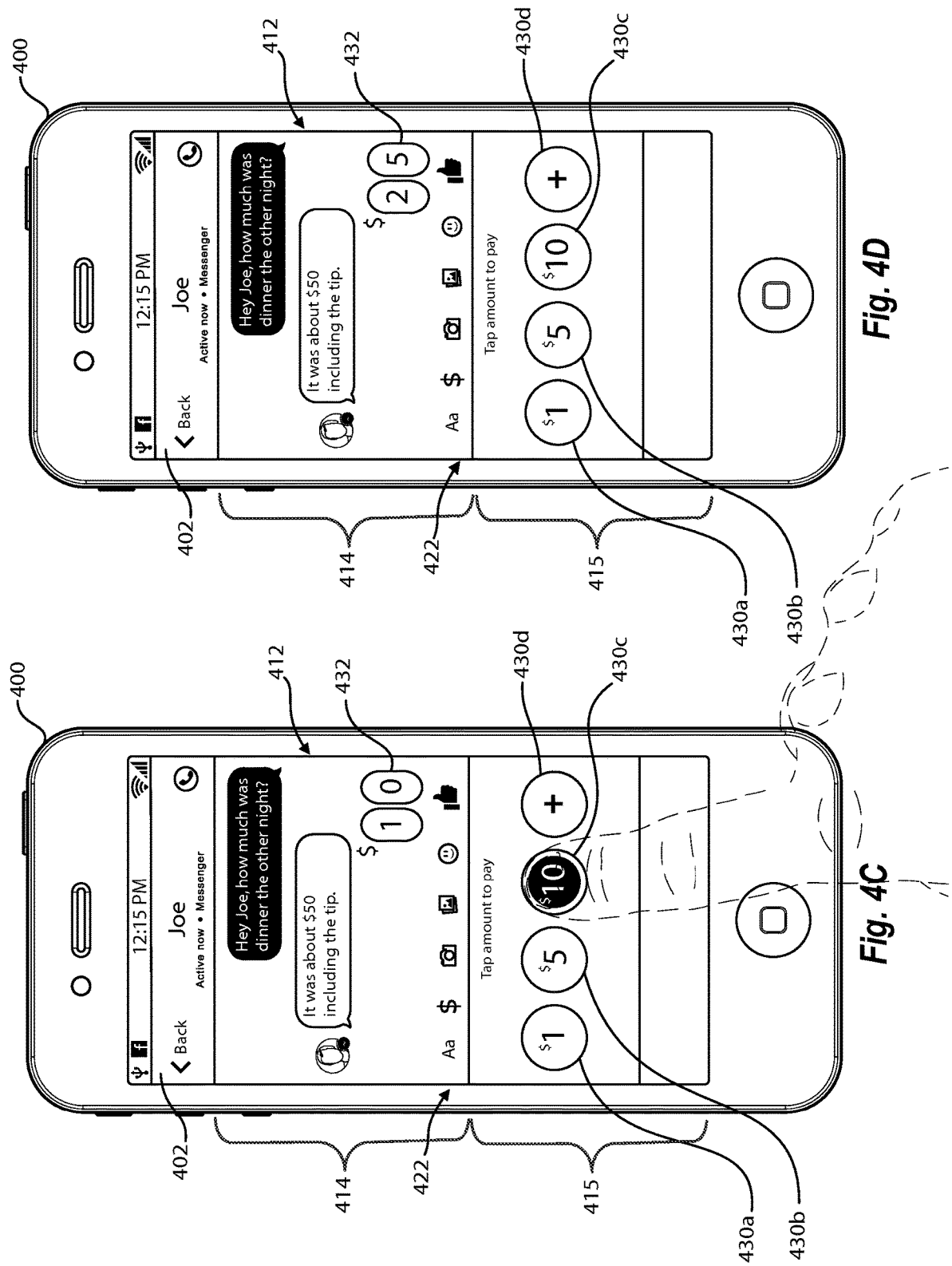

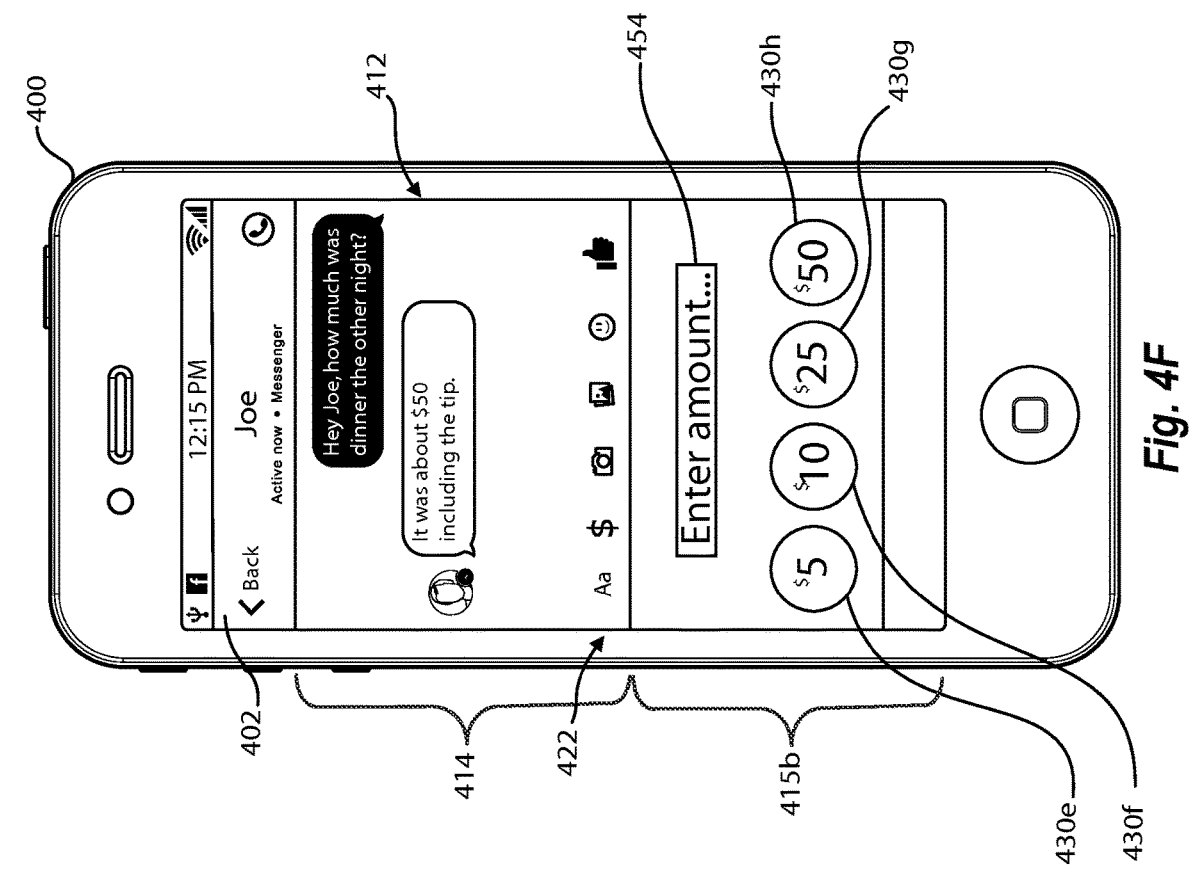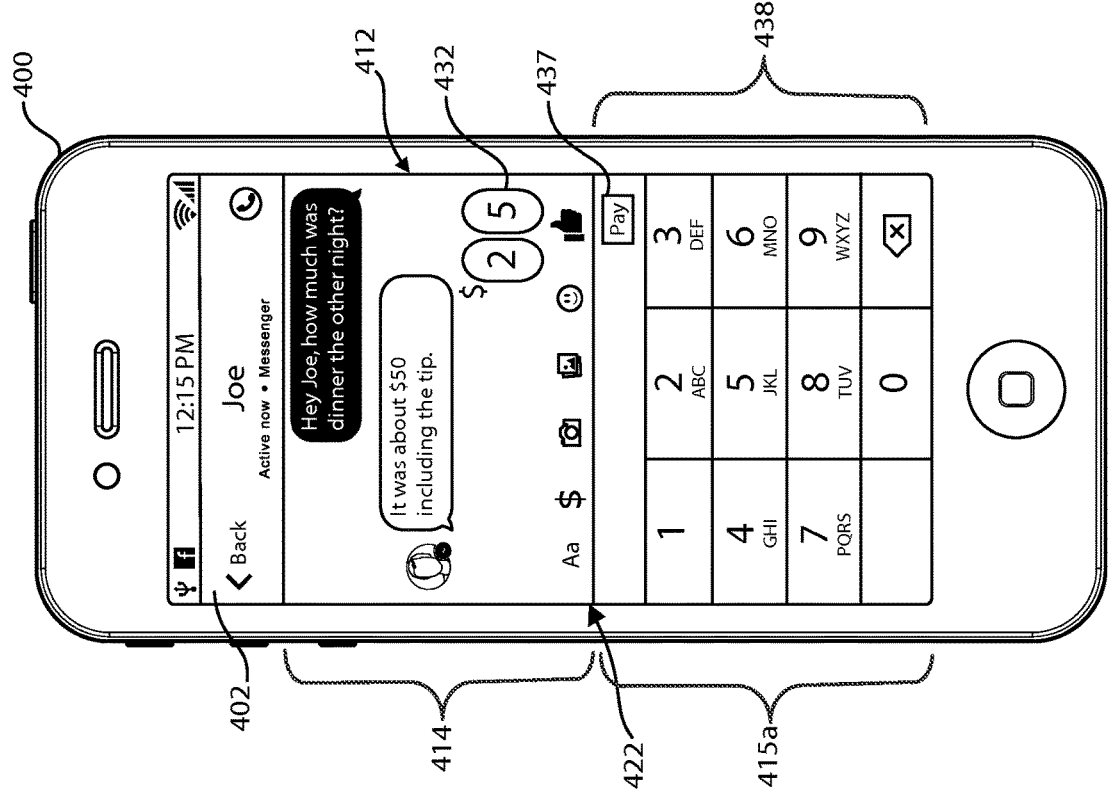

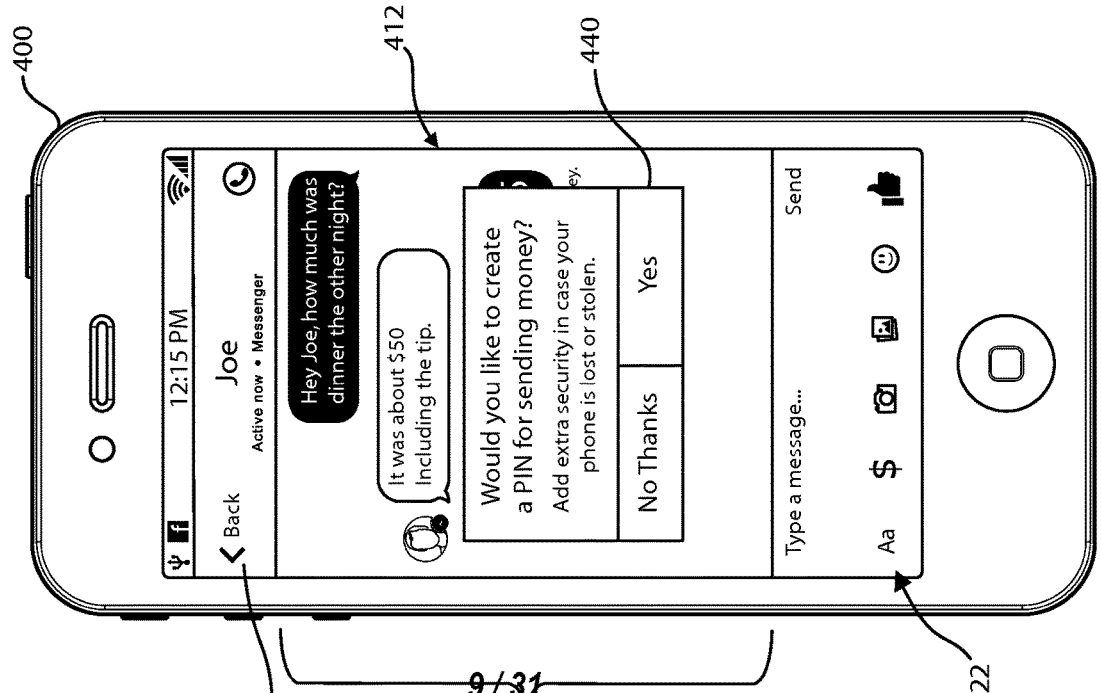
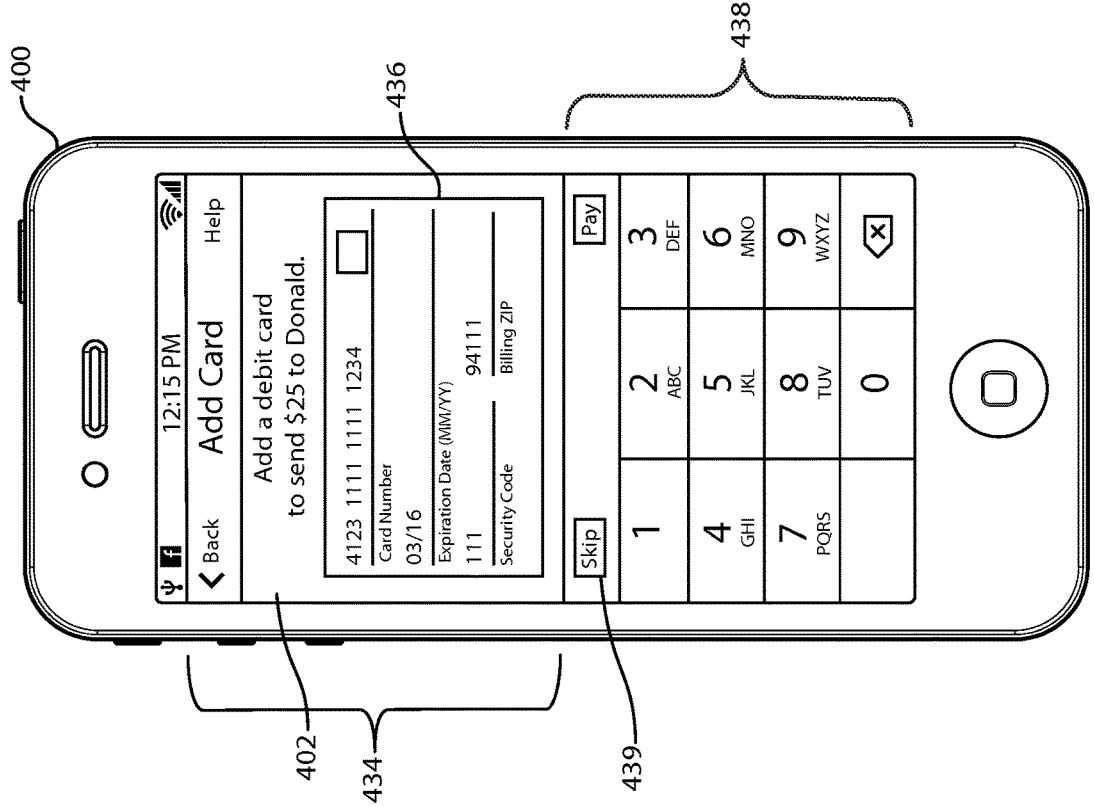
Fig. 4J
Fig. 4I

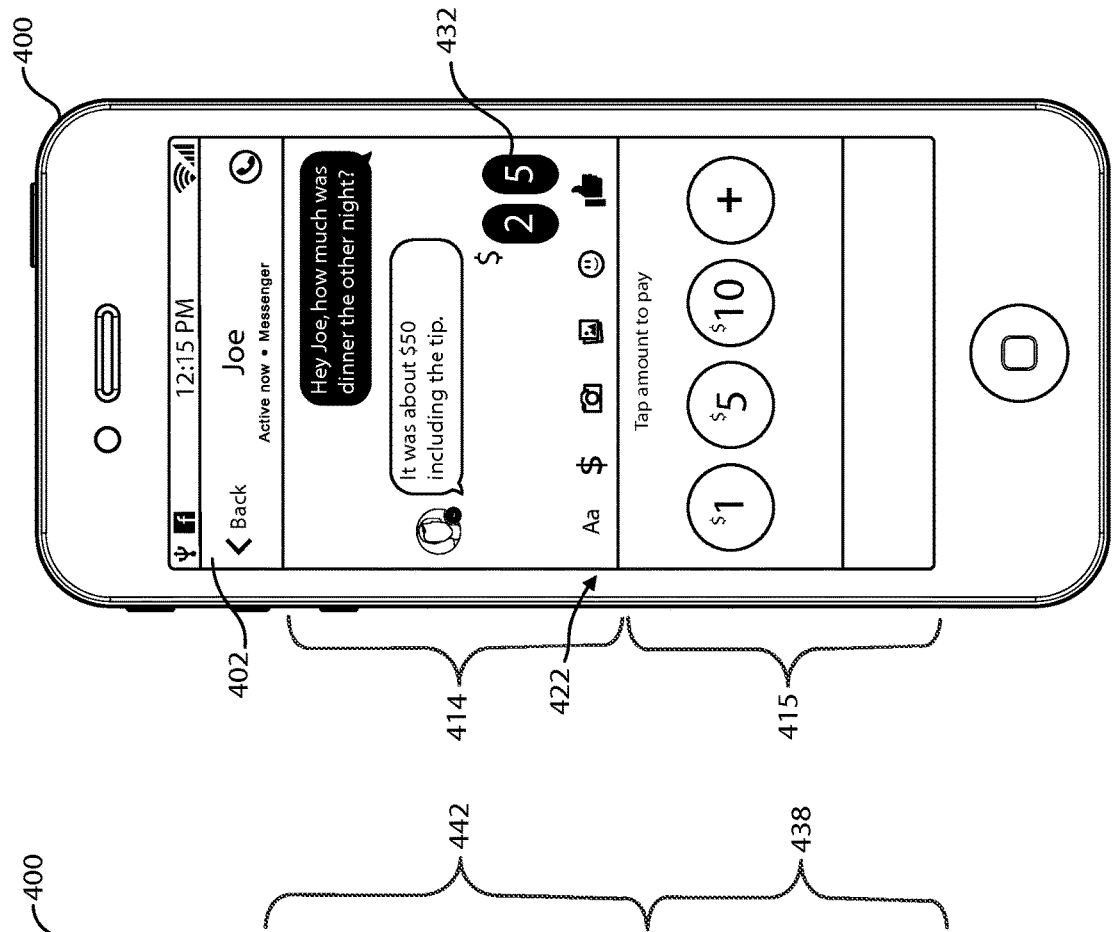
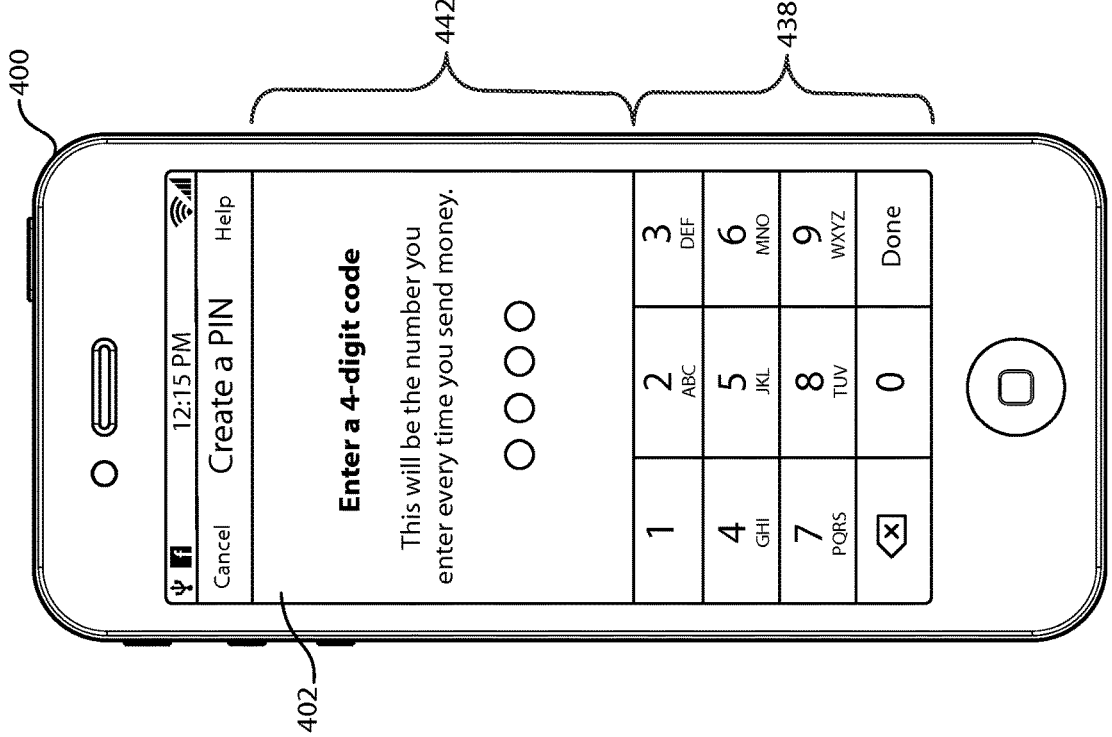
Fig. 4L
Fig. 4K

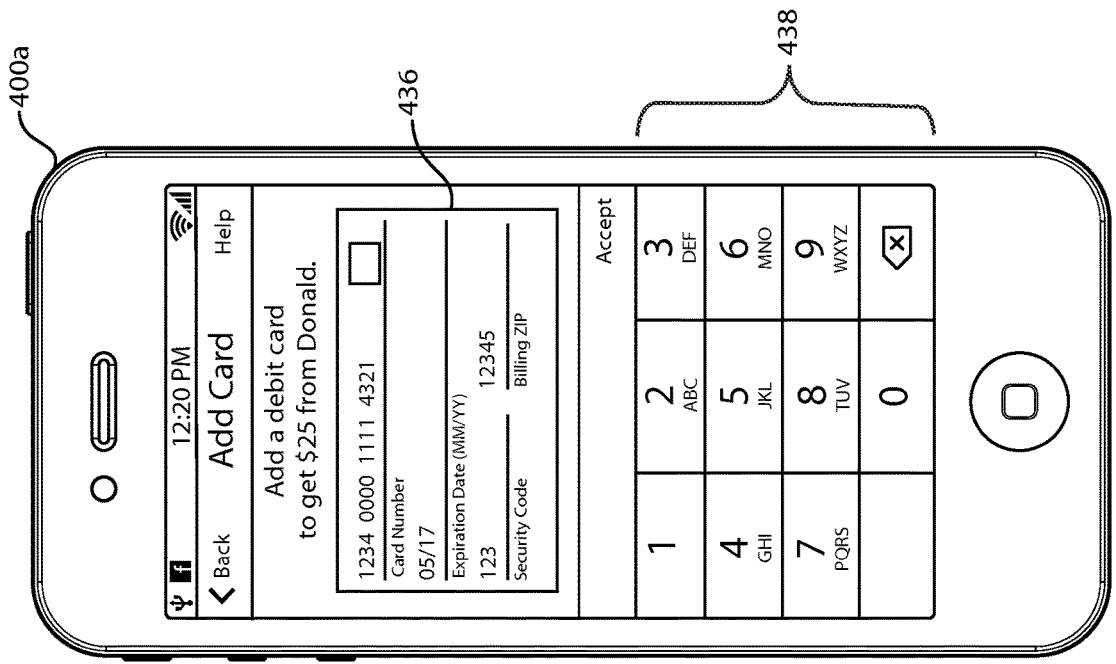
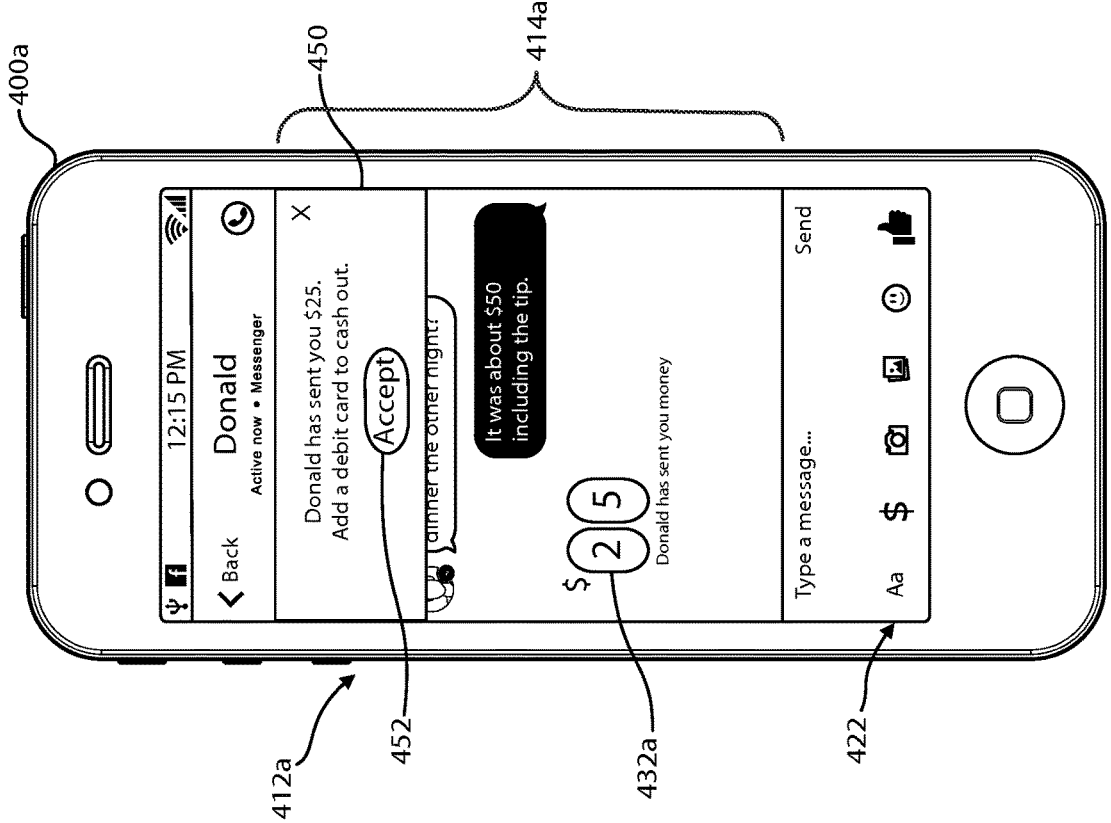
Fig. 4N
Fig. 4M

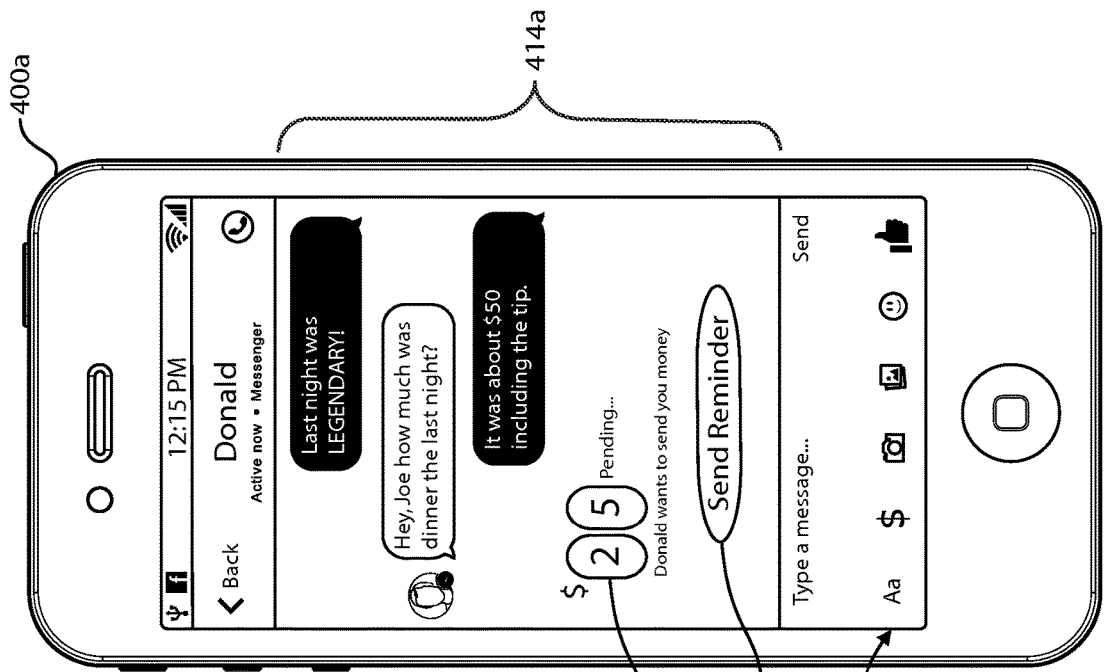
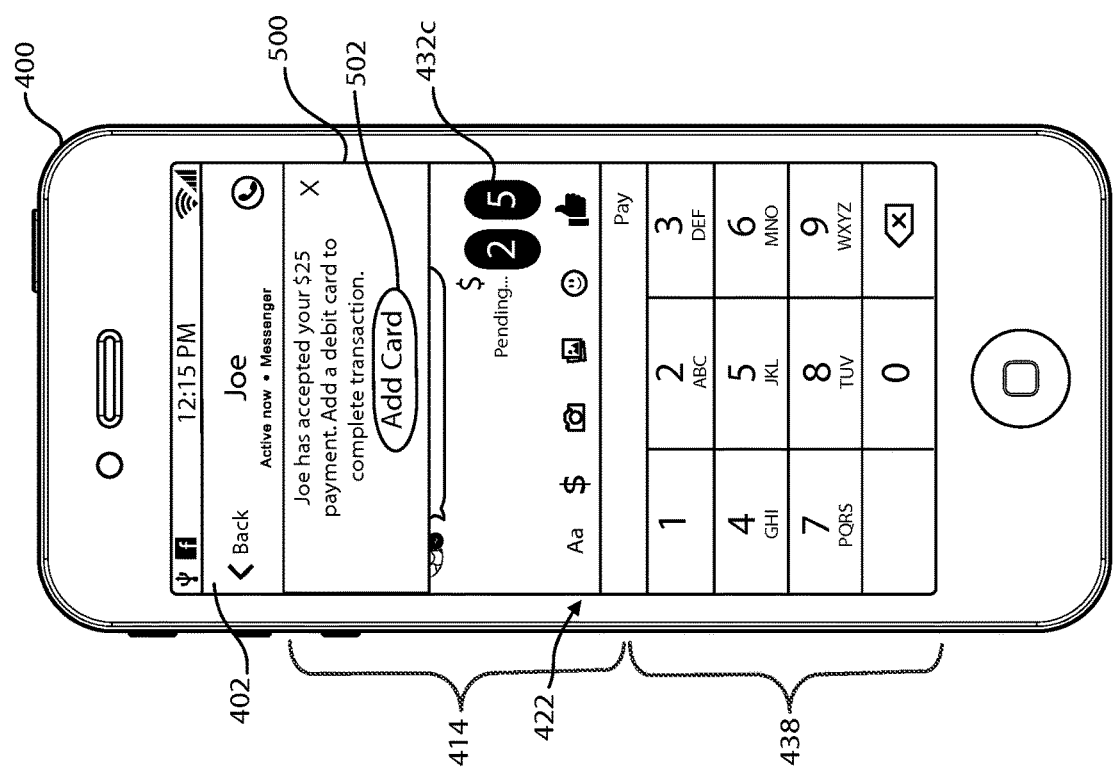
*Fig. 5D*
*Fig. 5C*

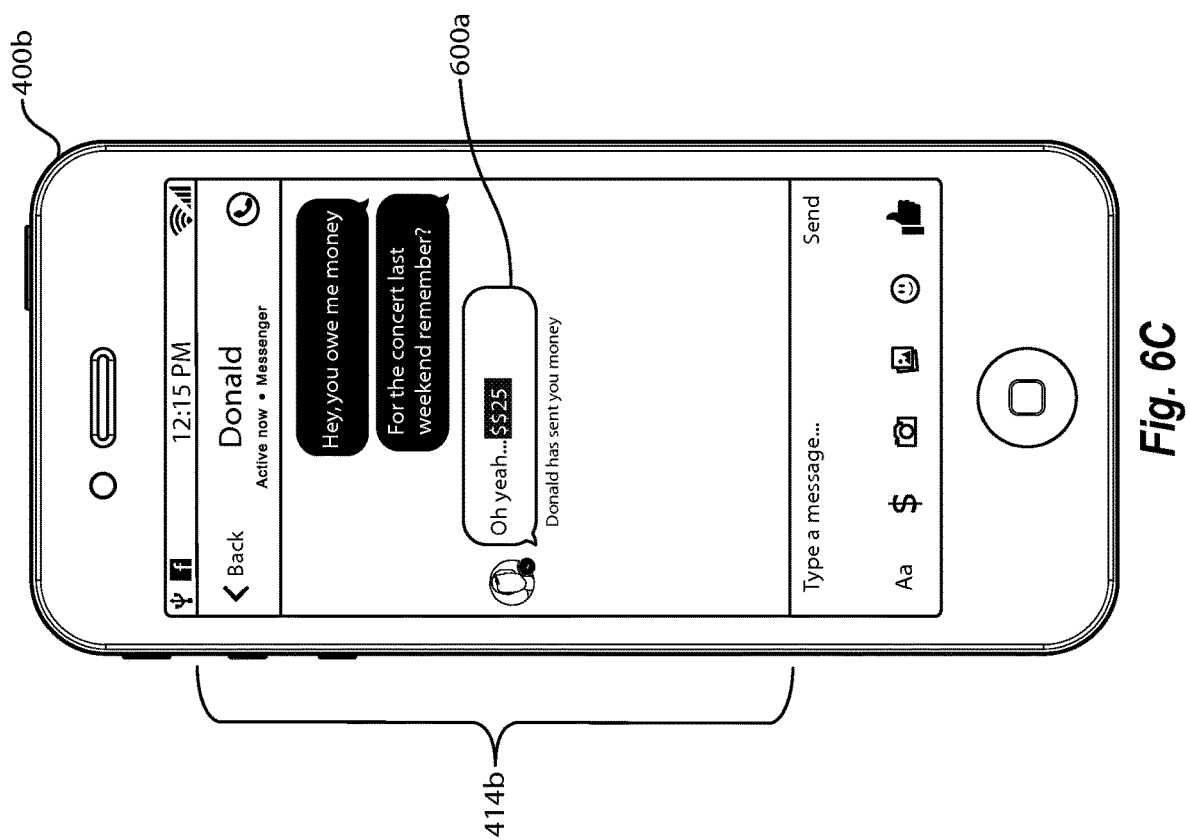

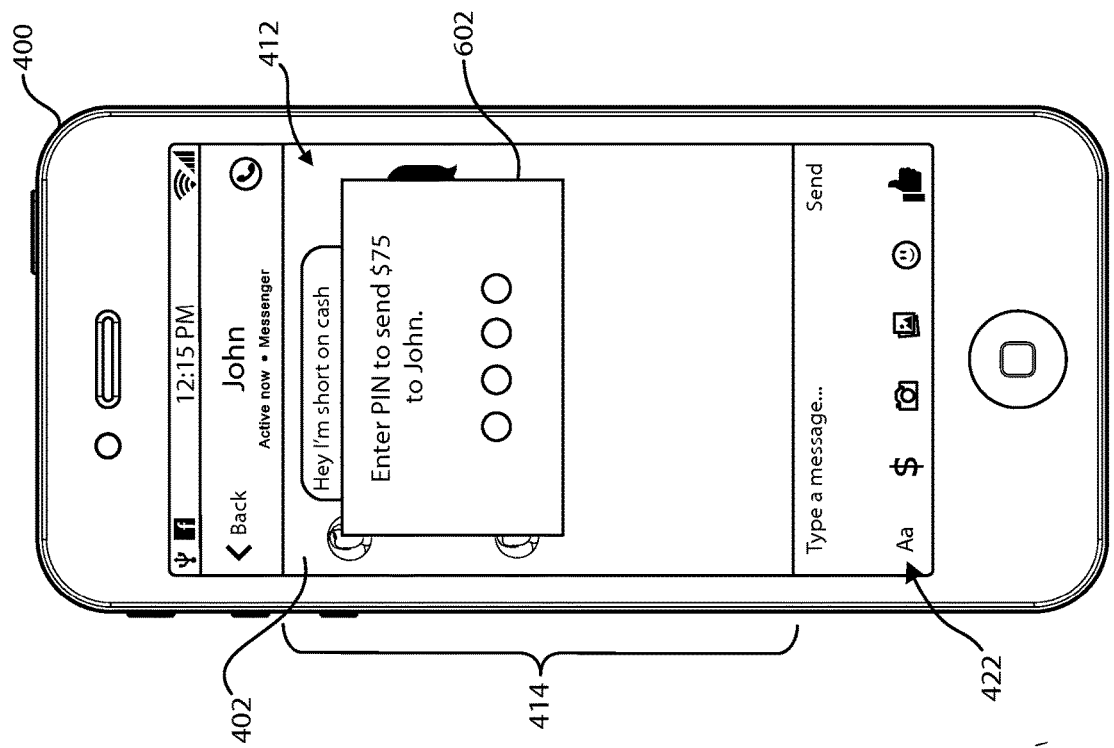
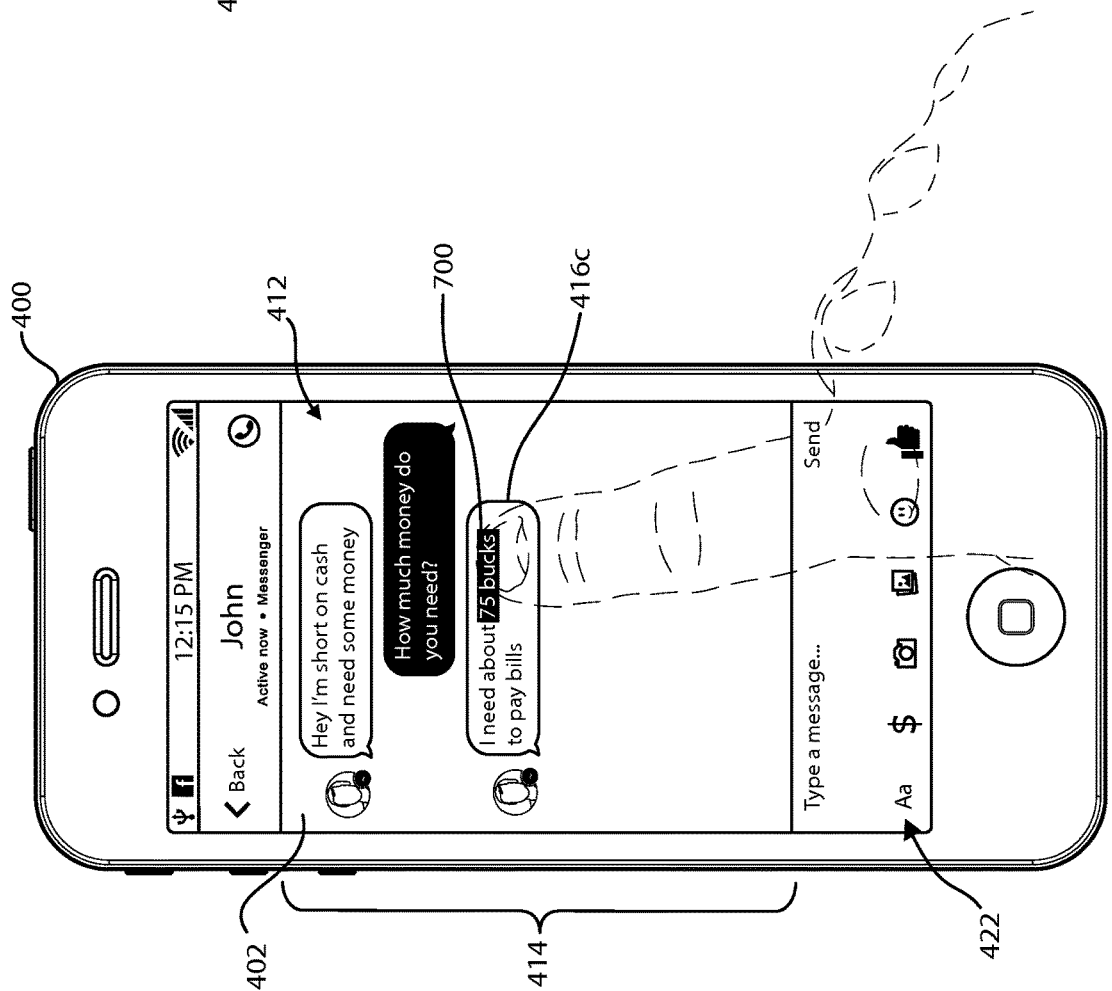
Fig. 7B
Fig. 7A

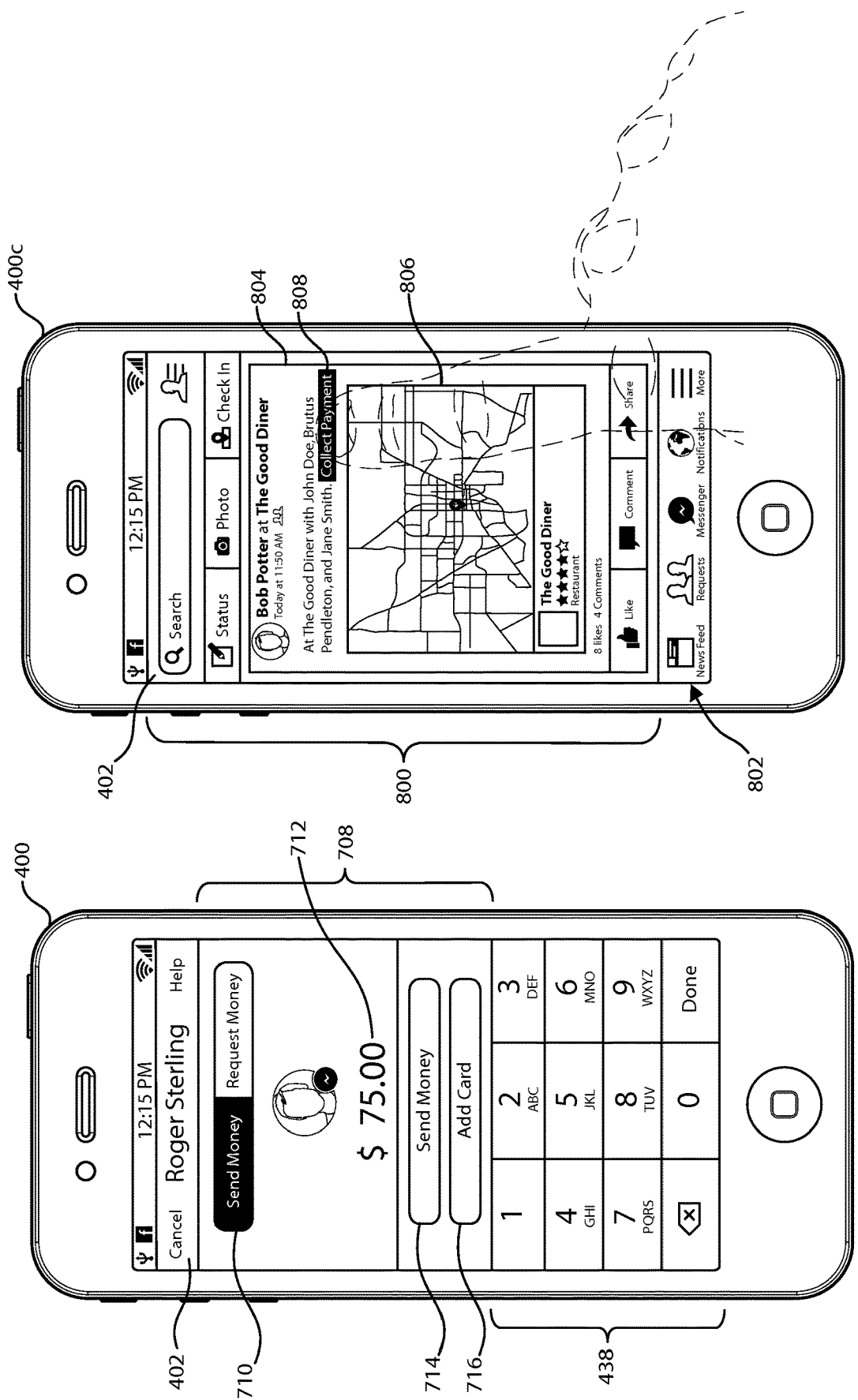

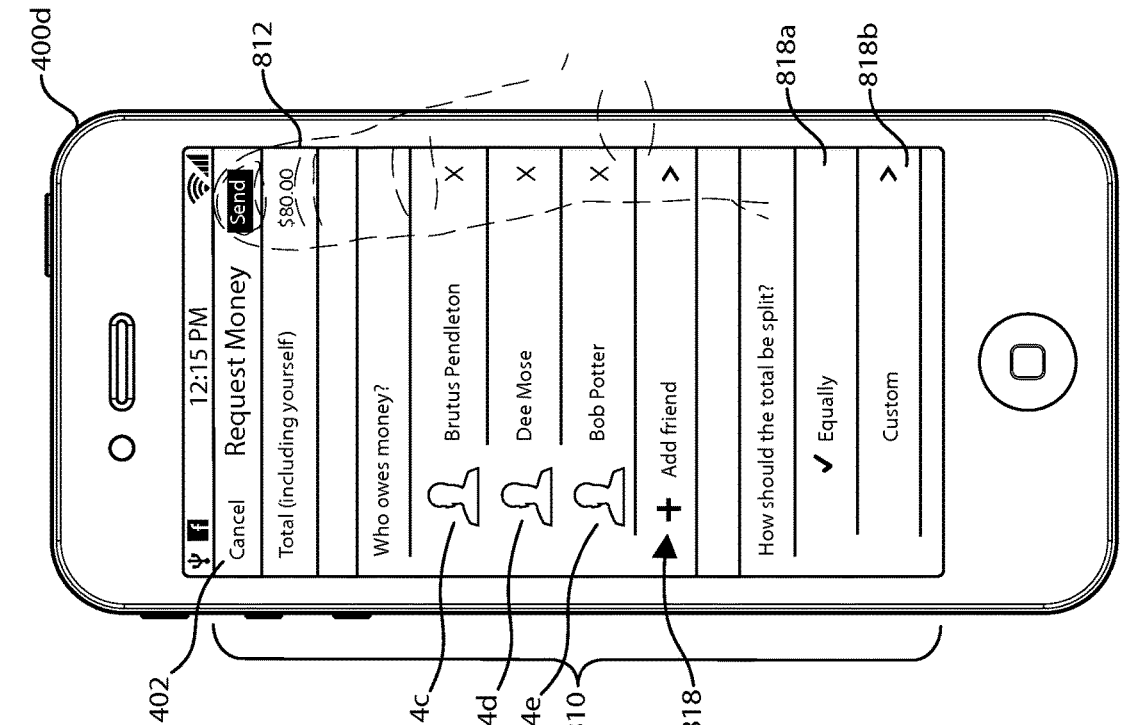
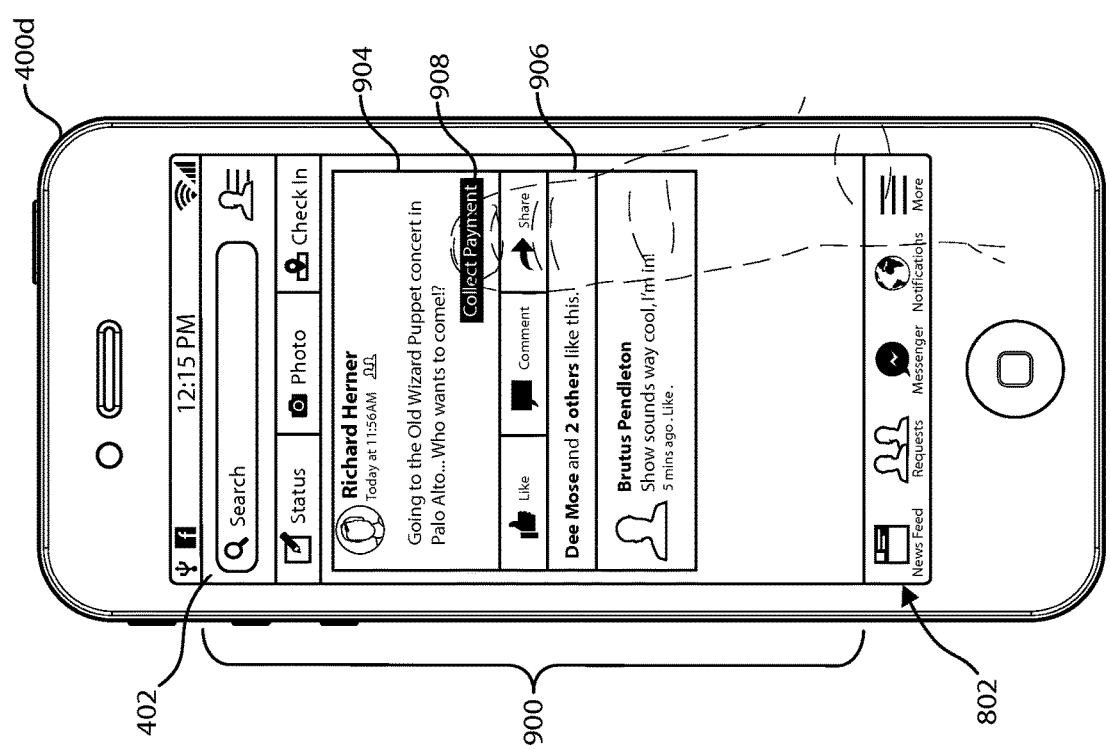
Fig. 9B
Fig. 9A

FACILITATING SENDING AND RECEIVING OF PAYMENTS USING MESSAGE-BASED CONTEXTUAL PROMPTS

BACKGROUND OF THE INVENTION

1. The Field of the Invention

One or more embodiments relate generally to systems and methods for peer-to-peer electronic payment transactions. More specifically, one or more embodiments relate to systems and methods of improving the ease and convenience of electronic payment transactions.

2. Background and Relevant Art

Electronic payment systems allow users to perform payment transactions with others via software applications on one or more types of devices (e.g., desktop devices and mobile devices). Some electronic payment systems allow users to perform payment transactions with financial institutions or vendors. Other electronic payment systems allow users to perform payment transactions with other users of the electronic payment systems (i.e., peer-to-peer payment transactions).

In theory, conventional electronic payment systems provide a convenient method for transferring money between users. Conventional electronic payment systems, however, have several drawbacks that often cause users frustration, confusion, and result in an unsatisfactory payment process. One such drawback of conventional electronic payment systems is that they are typically standalone systems to which both the sender and the recipient must subscribe. Due to the number and limited functionality of such systems, it is often the case that one of the sender or recipient is not a member of a particular electronic payment system. Thus, the sender, recipient, or both may have to go through a time-consuming process of setting up an account and providing sensitive financial information to use a system to send or receive a payment. Often times the users may rarely use the electronic payment system after an initial transaction.

Along related lines, conventional electronic payment systems typically require a user to provide sensitive financial information to access functionality of the system and to initiate a payment process. Thus, users typically have to provide sensitive financial information in order to test a system or discover which of their friends use the system. Upon creating an account and providing sensitive financial information, a user may attempt to send a payment to another user only to discover that the desired recipient is not a user or does not desire to use the electronic payment system.

Additionally, the payment process that many conventional electronic payment systems use is burdensome and complicated. For example, conventional electronic payment systems typically have a rigid transaction structure with little flexibility. In other words, users of the conventional system can only initiate and/or perform payment transactions in a specific, predetermined way. For example, the payment processes of many conventional electronic payment systems involve sending a series of emails with links. Users often must click on the email links to continue the payment process, such as accepting or denying a payment. Processing steps, such as sending separate emails for each step of an electronic transaction, are not intuitive and can cause user confusion or frustration.

The limited nature of conventional electronic payment systems also adds inconvenience. In particular, the standalone nature of conventional electronic payment systems typically requires that users open a separate application dedicated just to payment transactions in order to send or receive a payment. The inconvenience of the standalone nature of conventional electronic payment systems can discourage users of using such systems.

For example, when sending a payment using a conventional standalone electronic payment system, a user may have no idea if the intended recipient is enrolled with the electronic payment system, if the intended recipient has the capabilities of receiving a payment, or when the intended recipient receives a payment. As such, users of conventional electronic payment systems may feel that they are sending their payment into cyberspace without any real context or feedback.

In addition to the foregoing, conventional electronic payment systems are limited to one-to-one payment transactions. Thus, if a user desires to collect a payment from, or send a payment to, multiple co-users, the user typically must conduct individual transactions with each individual co-user. The time and effort required for collecting payment from a group of users can dissuade a user from employing conventional electronic payment systems.

Accordingly, there are a number of disadvantages with conventional electronic payment systems and methods.

SUMMARY

One or more embodiments described herein provide benefits and/or solve one or more of the foregoing or other problems in the art with systems and methods that increase the ease and convenience of electronic payment transactions. In particular, one or more embodiments provide a payment system integrated with a messaging system that allows two or more users to send and receive messages as well as electronic payments. For example, the systems and methods can allow a user to send a co-user(s) an electronic payment via a messaging interface that also allows for the exchange of electronic messages with the co-user(s). The integration of an electronic payment system and a messaging system can provide users with the ability to send and receive electronic payments within the flow of a conversation. Thus, one or more embodiments allow users to communicate about a payment transaction and conduct the transaction without having to open a separate application dedicated to electronic payments.

The integrated electronic payment and messaging system also can enable payment transactions to be conducted with flexibility in a natural flow rather than being limited to rigid predetermined processes. For example, one or more embodiments involve inferring payment events based on electronic messages exchanged between users. Specifically, one or more embodiments analyze electronic messages exchanged between two or more users to determine whether a payment event involving the two or more users has likely occurred. After inferring a payment event, one or more embodiments provide an option to initiate a payment transaction between the users based on the inferred payment event. Thus, one or more embodiments can allow users to initiate payment transactions with other users based on messages exchanged between the users without interrupting the natural flow of the message exchange.

One or more additional or alternative embodiments include providing options to request payments from a group of users. In particular, one or more embodiments can detect that user may desire to receive a payment from a group of users. For example, the systems can methods can detect that a group of friends are at a restaurant together or otherwise engaging in an event where one user may pay for the other users. The system and methods can identify the users in the group and provide an option to a user to request payment from co-users in the group in a single transaction.

Additionally, the system and methods described herein can allow a user to initiate a payment transaction without having to first provide a payment credential. Thus, a user can determine whether a desired recipient is a user of the system prior to providing sensitive financial information. If the desired recipient is not a user of the system, the system can allow the user to request that the desired recipient enroll and verify that the recipient is enrolled prior to providing a payment credential. Thus, one or more embodiments can allow a user to ensure that a recipient will receive funds before providing sensitive financial information.

In addition to the foregoing, one or more embodiments include providing selectable elements in an interface of a messaging user interface for setting a payment amount of a payment transaction. Specifically, one or more embodiments provide selectable elements with associated numerical (e.g., currency) values for requesting to initiate a payment transaction in a conversation with another user. In one or more embodiments, selecting one or more of the selectable elements can increment a payment amount of the payment transaction by the corresponding numerical value of each selected element. The selectable elements can allow users to incrementally increase a payment amount in real-time.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which:

FIGS. 3A-3D illustrate a sequence-flow diagram illustrating interactions as part of a payment process between a sender and a recipient in accordance with one or more embodiments;

FIGS. 5A-5D illustrate user interfaces for initiating a payment without first providing a payment credential in accordance with one or more embodiments;

FIGS. 6A-6C illustrate user interfaces for performing a payment transaction within a flow of a conversation in accordance with one or more embodiments;

FIGS. 7A-7C illustrate user interfaces for performing a payment transaction based on an inferred payment event in accordance with one or more embodiments;

FIGS. 8A-8E illustrate user interfaces for collecting payment from a group of co-users in accordance with one or more embodiments;

FIGS. 9A-9B illustrate user interfaces for collecting payment from a group of co-users in accordance with one or more additional embodiments;

DETAILED DESCRIPTION

Figure 1:
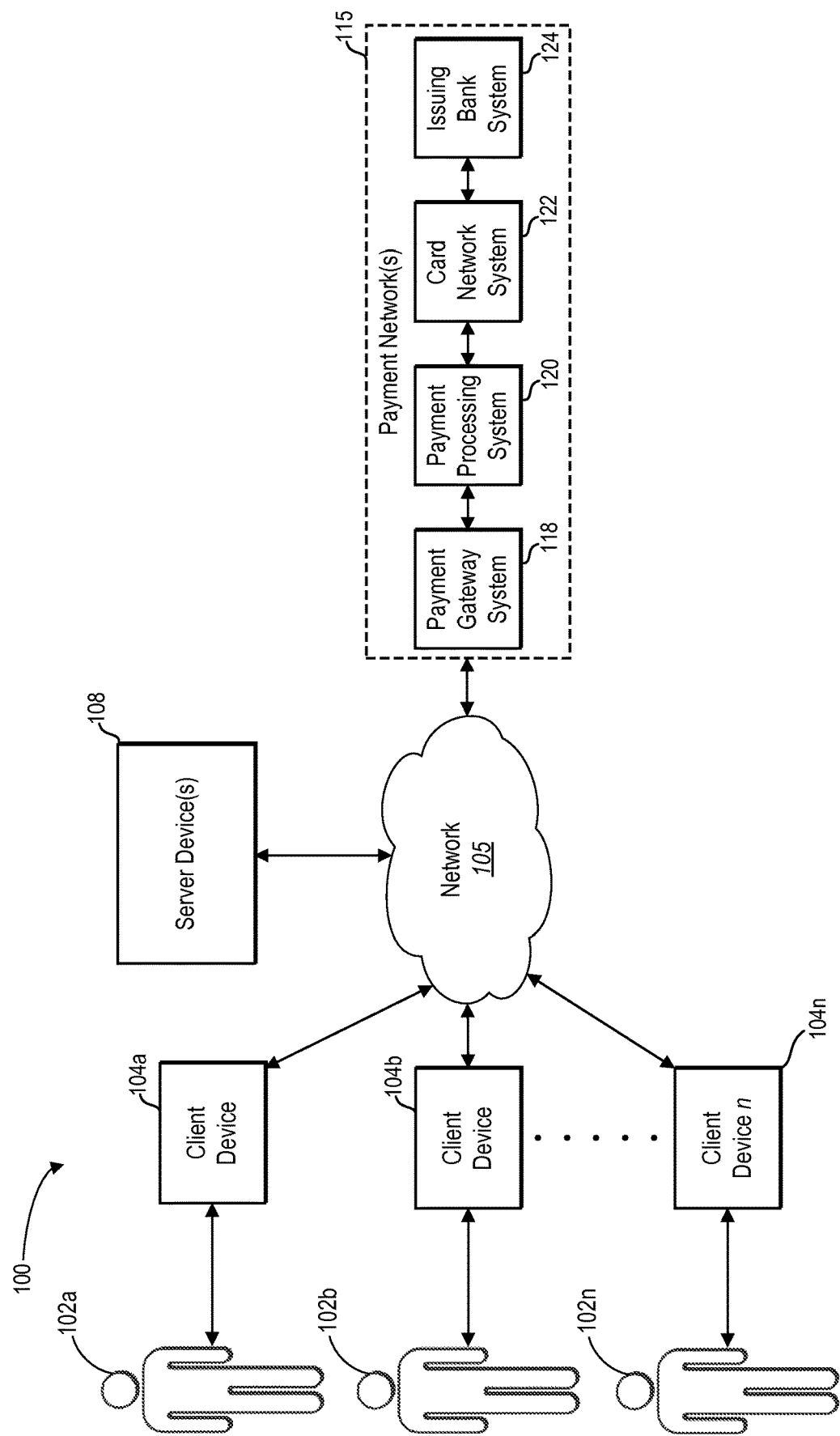
FIG. 1 illustrates a schematic diagram of an example system that facilitates the sending of messages and payments in accordance with one or more embodiments.

Embodiments of the present disclosure provide an integrated message and payment system that increases the ease and efficiency of sending and receiving payments. In particular, one or more embodiments provide an integrated message and payment system that integrates an electronic payment system and an electronic messaging system. The integrated message and payment system can allow two or more users to send and receive messages as well as electronic payments. For example, the integrated message and payment system can allow a user to send a co-user(s) an electronic payment via a messaging interface that also allows for the exchange of electronic messages with the co-user(s).

By integrating an electronic payment system and a messaging system, the system can provide users with the ability to send and receive electronic payments within the flow of a conversation. Thus, the system can allow users to communicate about a payment transaction and conduct the transaction without having to open a separate application dedicated to electronic payments. The increased ease and efficiency of sending payments seamlessly during the exchange of messages provided by one or more embodiments of the system can lead to greater use of, and satisfaction with, electronic payments.

The integrated message and payment system can provide flexibility in the initiation of payment transactions. In other words, by integrating an electronic payment system and a messaging system, the system can allow users to initiate payments in a variety of ways. In particular, the integrated message and payment system can allow user to initiate payments based on the context of a conversation rather than limiting payment initiation to a rigid predetermined process. For example, the integrated message and payment system can infer payment events based on electronic messages exchanged between users. Specifically, the integrated message and payment system can analyze electronic messages exchanged between two or more users to determine whether a payment event has likely occurred. After inferring the payment event, the integrated message and payment system can provide an option to initiate a payment transaction between the users based on the inferred payment event. Thus, in one or more embodiments, the integrated message and payment system can allow users to initiate payment transactions with other users based on messages exchanged between the users without interrupting the natural flow of an exchange of messages between the users.

Specifically, the integrated message and payment system can identify certain phrases or character strings that indicate or infer a payment event. For example, the network system can identify the string "you owe me $15 for the movie ticket." Based on the inferred payment, the integrated message and payment system can provide an option to initiate a payment or otherwise suggest one or more of the users to send a payment. For instance, the network system can configure the "$15" as a selectable element that a user can select to initiate a payment.

In one or more additional embodiments the integrated message and payment system can provide options to request payments from a group of users. In particular, the integrated message and payment system can detect that user may desire to receive a payment from a group of users. For example, the integrated message and payment system can detect that a group of friends are at a restaurant together or otherwise engaging in an event where one user may pay for the other users. The integrated message and payment system can identify the users in the group and provide an option to a user to request payment from each of the users in the group in a single transaction.

Additionally, one or more embodiments of the integrated message and payment system described herein can allow a user to initiate a payment transaction without having to first provide a payment credential. Thus, a user can determine whether a desired recipient is a user of the integrated message and payment system prior to providing sensitive financial information. If the desired recipient is not a user of the integrated message and payment system, the integrated message and payment system can allow the user to request that the desired recipient enroll. Thus, the integrated message and payment system can allow a user to ensure that a recipient will receive funds before providing sensitive financial information.

Once the recipient enrolls or provides a credential payment, the integrated message and payment system can prompt the sender to provide a payment credential to complete the payment. Along related lines, the integrated message and payment system can allow a recipient to send reminders or apply other types of social pressure to prompt the sender to provide a payment credential. Social pressure may encourage the sender to complete the payment transaction by providing payment information.

In addition to the foregoing, one or more embodiments provide a user interface that provides for more efficient and/or more pleasing user experiences when sending or receiving payments. For example, one or more embodiments include tailored graphical user interface objects that enhance a user's experience. Specifically, a messaging user interface can include icons, stickers, or other selectable objects tailored to a user. For instance, the integrated message and payment system can detect a location of a user and provide stickers or other graphical objects corresponding to common currency that the user can select to enter a payment amount. The integrated message and payment system can detect each selection of the stickers/objects and increment a payment amount. As such, the integrated message and payment system can provide the user with an experience similar to pulling currency from a wallet or purse to arrive at a payment amount.

Along related lines, the integrated message and payment system can detect or infer a payment amount and provide the user with a sticker or other selectable icon or object corresponding to the detected or inferred amount. Thus, the integrated message and payment system can increase efficiency by reducing a need of the user to enter a payment amount.

As used herein, the term "message" or "messages" refers to any form of electronic communication between two or more computing devices. Messages can include text messages, photos, stickers or other icons, videos, voice recordings, music, voice mails, etc. In one or more embodiments, a message is an instant message communicated in real-time or near real-time. In alternative embodiments, however, a message can refer to any from of electronic communication, such as an SMS message, an email, or a social network post or comment.

In addition, the term "payment message" refers to a message that indicates payment information that allows the system to initiate a payment transaction. For example, a payment message can include a data package that includes a payment amount, a sender, a recipient, a payment method, as well as additional information such as user provided text for a message.

As used herein, the term "payment transaction" refers to any type of electronic transaction exchanging currency or credits between two or more entities. For example, a payment transaction can be a financial electronic transaction between two users of the integrated message and payment system. In another example, a payment transaction can be a financial electronic transaction between a user and a financial institution or other multi-person entity. Additionally, a payment transaction can represent a monetary gift, a payment of a debt, a funding of a loan, a payment in consideration for a purchase of goods and/or services, or any other type of monetary transfer. In addition, a payment transaction can be made in one or more currencies and converted, based on an exchange rate for example, to one or more additional currencies.

As used herein, the terms "event" and "payment event" refer to any operation associated with a payment transaction. Specifically, an event refers to an operation by the integrated message and payment system or a user that initiates, attempts to initiate, completes, or is otherwise associated with a payment transaction between two or more entities. For example, the payment system can infer, from electronic messages by users of the integrated message and payment system, events indicating a desire to initiate a payment transaction (e.g., a request for payment or a request to pay), to complete a payment transaction or to perform another operation associated with a payment transaction.

As used herein, the term "natural language phrase" refers to text including ordinary language employed by a user. Specifically, a natural language phrase can include text without a special syntax or formal construction configured specifically for interacting with a computing device. For example, a natural language phrase can include conversational language between two users of the integrated message and payment system. To illustrate, users can use natural language when communicating with each other by way of a messaging graphical user interface (e.g., text messages, emails or chat messages).

As used herein, the term "account" or "payment credential" can refer to a user's bank account, credit card account, messaging account, gift card, or any other account from which money can be deducted or to which money can be deposited. The meanings of the above terms, as well as additional terms, will become more apparent in light of the disclosure below with respect to the figures.

FIG. 1 is a schematic diagram illustrating an integrated messaging and payment system 100 in accordance with one or more embodiments. An overview of the system 100 is described in relation to FIG. 1. Thereafter, a more detailed description of the components and processes of the system 100 are provided in relation to the remaining figures.

As illustrated by FIG. 1, the system 100 can allow user 102a, user 102b, and up to any number of users 102n (collectively "users") to interact using a corresponding number of client devices 104a, 104b, 104n. As further illustrated in FIG. 1, the client devices can communicate with server device(s) 108 via a network 105. In addition, the system 100 can include a payment network 115 communicatively coupled with the server device(s) 108 via the network 105. Although FIG. 1 illustrates a particular arrangement of the users, the client devices, the network 105, the server device(s) 108, and the payment network 115, various additional arrangements are possible. For example, the client devices 104a, 104b, 104n may directly communicate with the server devices 108, bypassing network 105.

As briefly mentioned above, FIG. 1 shows that user 102a and user 102b can use client devices 104a and 104b, respectively, to communicate with one another via the server device(s) 108. For example, user 102a and user 102b can exchange electronic messages containing text, digital content (e.g., audio, images, video), location information, and other forms of data and information. For instance, the user 102a, using client device 104a, can compose a message intended for the user 102b. After composing the message, the user 102a can cause the client device 104a to send the message intended for the user 102b via the network 105 to the server device(s) 108. The server device(s) 108 can identify the user 102b as the intended recipient, and forward the message to the client device 104b associated with the user 102b.

In addition allowing the users to exchange electronic communications, the system 100 can allow the users to send and receive monetary payments to and from one another. In one or more embodiments, the system 100 allows users to define and send a payment message to another user. For instance, the system 100 can allow the user 102a to send a payment to user 102b via the server device(s) 108 and the payment network 115. Likewise, user 102b can receive notice of the payment, and accept or decline the payment. As will be explained in more detail below, the server device(s) 108 can communicate with the payment network 115 to coordinate a transaction that facilitates the payment between the users (i.e., their accounts).

While the system 100 can facilitate a payment between users 102a and 102b, the system 100 can also facilitate a payment between more than two users, such as a group of users. For example, the user 102a may send a payment to users 102b, 102n. In one or more embodiments, the user 102a can send payments to multiple users within the same payment transaction, as will be discussed in further detail below. Furthermore, in one or more embodiments, a group of users may be provided with the ability to send and/or receive payments through the system 100, either to or from other groups or individual users.

While FIG. 1 illustrates the users as people, the users may include other entities, such as business, government, or other entities. For example, the user 102a can use the system 100 to provide a payment to a business for services or products. For instance, the user 102a can communicate with a business via the system 100, and ultimately decide to make a purchase of a product or service from the business. Using the same system 100, the user 102b can then send a payment for the product or service to the business. Similarly, a business may send a payment to other businesses or vendors, whether an individual or a business entity.

Figure 18:
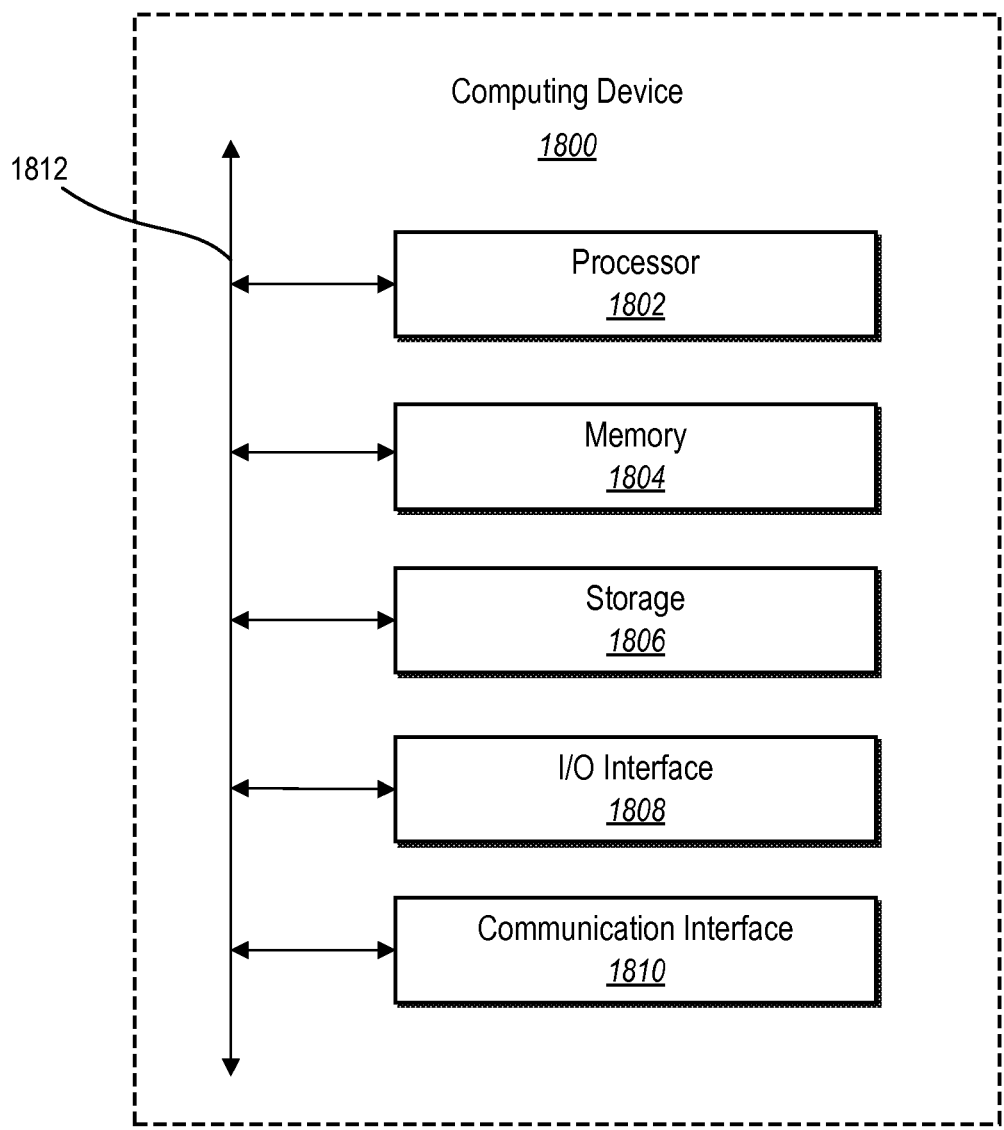
FIG. 18 illustrates a block diagram of an example computing device in accordance with one or more embodiments.

As mentioned above, and as FIG. 1 illustrates, the users 102a and 102b can interact with the client devices 104a and 104b, respectively. Examples of client devices include computing devices such as mobile devices (e.g., smartphones, tablets), laptops, desktops, or any other type of computing device. FIG. 18 and the corresponding description provide additional information regarding computing devices. Moreover, and as mentioned above, the client devices can communicate with the through the network 105. In one or more embodiments, the network 105 includes the Internet or World Wide Web. The network, however, can include one or more private and/or public networks that use various communication technologies and protocols, as further described below with reference to FIG. 19.

As briefly discussed above, the system 100 can coordinate the sending and receiving of payments between the users. For example, the user 102a can compose and send a payment message to the user 102b. For instance, the user 102a can provide input to via the client device 104a to define the payment method (e.g., the sender user's 102a credit card, debit card, account balance), payment amount, payment currency, payment description, and/or various other payment details.

From the user's 102a perspective, for example, the sender user 102a can compose and send a payment message in a similar manner as sending a communication message (e.g., text). For example, in one or more embodiments, the user 102a can compose a payment message that indicates an amount of payment the user 102a desires to send to user 102b. After composing the payment message, the sender user 102a can then send the payment message to the user 102b via the server device(s).

In one or more embodiments, the system 100 can coordinate a transaction between one or more accounts of the sender user 102a and one or more accounts of the recipient user 102b via the payment network 115. For example, in response to receiving a payment message from the sender user 102a, the server device(s) can communicate transaction information to process a payment using one or more components within the payment network 115. Alternatively, or additionally, the system 100 can maintain one or more user accounts directly, and therefore, the system 100 can coordinate a transaction, or a portion of a transaction.

As illustrated in FIG. 1, the payment network 115 can include a payment gateway system 118, a payment processing system 120, a card network system 122 and an issuing bank system 124. In alternative embodiments, however, the payment network 115 can include more or fewer components depending on a particular embodiment of system 100.

In one or more embodiments, for example, the system 100 can communicate with the payment network 115 to authorize and process a transaction. For example, the system 100 can send a transaction to the payment gateway system 118, as shown in FIG. 1. Once the payment gateway system 118 receives the transaction, the payment gateway system 118 can send the transaction to the processor (e.g., payment processing system 120) used by a payment recipient user's acquiring bank. Based on the method of the payment (e.g., sender user's account), the payment processing system 120 can transmit the transaction to an appropriate card network system 122. In many instances, the card network system 122 then sends the transaction to an issuing bank system 124.

The issuing bank system 124 either approves or declines the transaction, and sends the decision back to the card network system 122. The card network 122 then sends the decision to the payment processing system 120. The payment processing system 120 can then forward the decision to the payment gateway system 118, and in one or more embodiments, the payment gateway system 118 can maintain the details related to the transaction and the decision. The payment processing system 120 also sends the decision to the system 100.

In addition to authorizing a transaction, the payment network 115 can also perform settlement tasks. For example, the system 100 can coordinate with the payment gateway system 118 to submit a daily settlement batch including one or more captured transactions to an acquiring bank via the acquiring bank's preferred payment processing system 120. The payment processing system 120 then sends the settlement batch to a server of the acquiring bank (not illustrated), which records a deposit in the amount of each transaction within the settlement batch to an account associated with a payment recipient user.

The acquiring bank can then send a funding request in satisfaction of the deposit amount to the payment processing system 120, which passes the funding request to the appropriate card network system 122. The card network system 122 then sends the funding request to the issuing bank system 124. The issuing bank system 124 can post the transaction to the sender user's account and pass a release of the funds to the card network system 122, which are then passed to the payment processing system 120, and then the acquiring bank. Additional details relating to the specific systems, methods, components and process of system 100 are described below.

Figure 2:
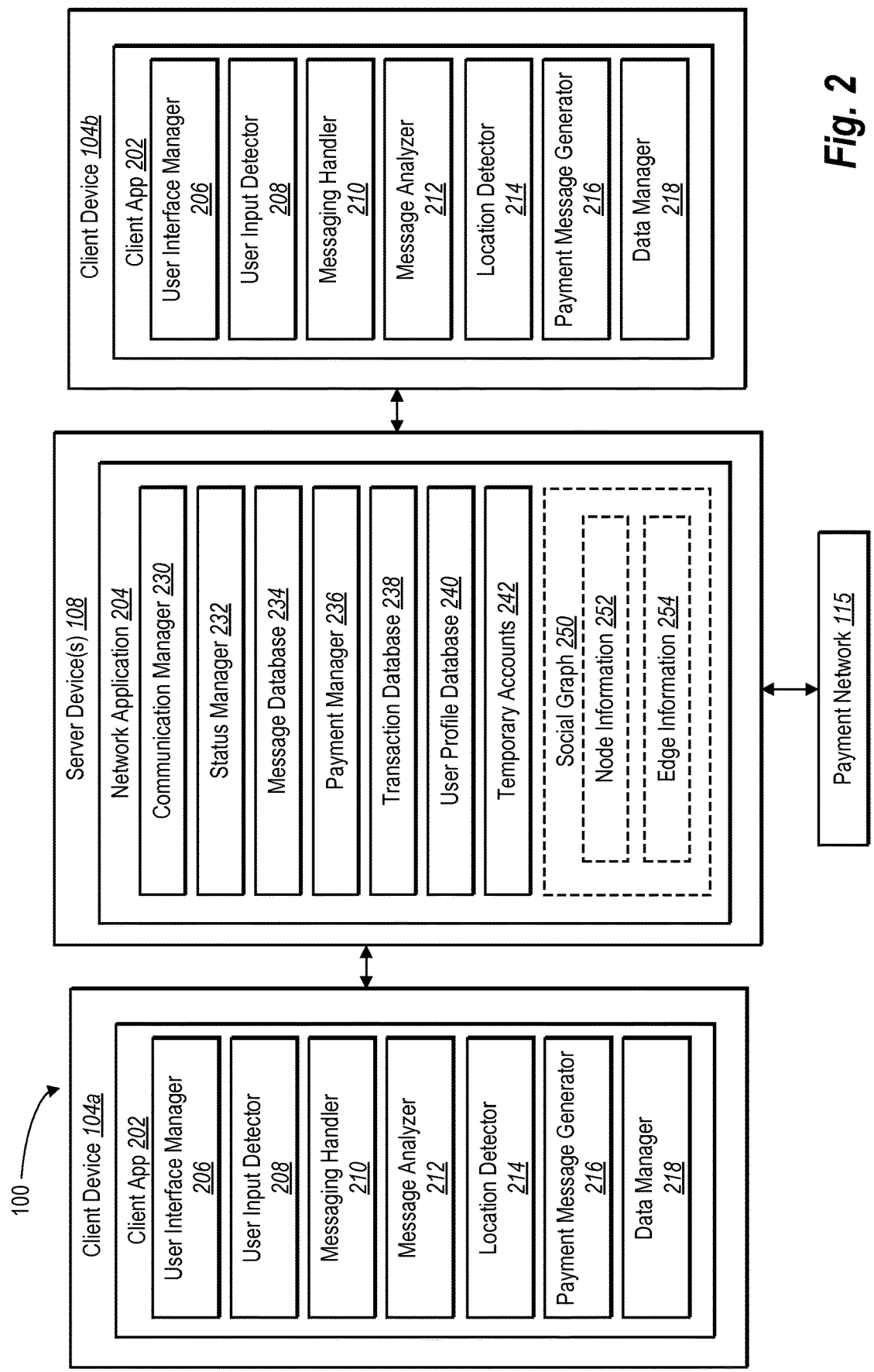
FIG. 2 illustrates a detailed schematic diagram of the system of FIG. 1 in accordance with one or more embodiments.

FIG. 2 illustrates a schematic diagram illustrating additional details of the system 100. As shown, the system 100 can include client devices 104a, 104b, server device(s) 108, and payment network 115. In general, the system 100 can allow a user of the client device 104a to send a payment to or receive a payment from a recipient of client device 104b. Additionally, the system can allow the user of the client device 104a to exchange messages with a user of the client device 104b.

As shown, the system 100 can include various components on the client devices 104a, 104b and the server device(s) 108. For example, FIG. 2 illustrates that the client devices 104a, 104b can each include a client application 202 with various components and the server device(s) 108 can include a network application 204 with various components. The components of the client applications 202 and the network application 204 can work together to allow the users to send payments, receive payments, and exchange messages as described in greater detail below.

As shown, the client application 202 can include a user interface manager 206, a user input detector 208, a messaging handler 210, a message analyzer 212, a location detector 214, a payment message generator 216, and a data manager 218. FIG. 2 illustrates that the network application 204 can include a communication manager 230, a status manager 232, a message database 234, a payment manager 236, a transaction database 238, a profile database 240, and temporary accounts 242. As described below, the network application 204 can also optionally include a social graph 250, which includes node information 252 and edge information 254. Each of the components 206-218, 230-240, and 236-254 can communicate with each other using any suitable communication technologies. It will be recognized that although components 206-218, 230-240, and 236-254 are shown to be separate in FIG. 2, any of components 206-218, 230-240, and 236-254 may be combined into fewer components, such as into a single facility or module, or divided into more components as may serve a particular embodiment. While FIG. 2 describes certain components as part of the client applications 202 and other components as part of the network application 204, the present invention is not so limited. In alternative embodiments, one or more of the components shown as part of the client application 202 can be part of the network application 204 or vice versa.

The components 206-218, 230-240, and 236-254 can comprise software, hardware, or both. For example, the components 206-218, 230-240, and 236-254 can comprise computer instructions stored on a non-transitory computer-readable storage medium and executable by at least one processor of the client devices 104a, 104b or the server device(s) 108. When executed by the at least one processor, the computer-executable instructions can cause the client device(s) 104a, 104b or the server device(s) 108 to perform the methods and processes described herein. Alternatively, the components 206-218, 230-240, and 236-254 can comprise hardware, such as a special purpose processing device to perform a certain function or group of functions. Additionally or alternatively, the components 206-218, 230-240, and 236-254 can comprise a combination of computer-executable instructions and hardware.

In one or more embodiments, the client application 202 can be a native application installed on the client device

104a, 104b. For example, client application 202 may be a mobile application that installs and runs on a mobile device, such as a smart phone or a tablet. Alternatively, the client application 202 can be a desktop application, widget, or other form of a native computer program. Alternatively, the client application 202 may be a remote application that the client device 104a, 104b accesses. For example, the client application 202 may be a web application that is executed within a web browser of the client device 104a, 104b.

As mentioned above, and as shown in FIG. 2, the communication application 202 can include a user interface manager 206. The user interface manager 206 can provide, manage, and/or control a graphical user interface (or simply "user interface") that allows a user to compose, view, and send messages as well as send payments. For example, the user interface manager 206 can provide a user interface that facilitates the composition of a message, such as an instant message. Likewise, the user interface manager 206 can provide a user interface that displays messages received from other users.

More specifically, the user interface manager 206 may facilitate the display of a user interface (e.g., by way of a display device associated with the client device 104a, 104b). For example, the user interface may be composed of a plurality of graphical components, objects, and/or elements that allow a user to compose, send and receive messages or payments. More particularly, the user interface manager 206 may direct the client device 104a, 104b to display a group of graphical components, objects and/or elements that enable a user to view a communication thread (e.g., FIG. 4A).

In addition, the user interface manager 206 may direct the client device 104a, 104b to display a one or more graphical objects or elements that facilitate user input for composing and sending a message. To illustrate, the user interface manager 206 may provide a user interface that allows a user to provide user input to the communication application 202. For example the user interface manager 206 can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

As discussed above, one example of content that can be included in a message is a payment from a sender user to a recipient user. In one or more embodiments, the user interface manager 206 can provide a user interface to allow a user to easily and efficiently define and send a payment to one or more other users. For example, the user interface manager 206 can provide one or more input fields and/or one or more user selectable elements with which a user can interact to create and send a payment.

In addition to the forgoing, the user interface manager 206 can receive instructions or communications from one or more components of the communication application 202 to display updated message information, updated status of the payment, and/or updated available actions. The user interface manager 206 can update an available option based on whether a particular options is available at a particular point within the transaction process. The user interface manager 206 can add, remove, and/or update various other selectable actions within the sender and/or receiver status messages, as will be discussed below.

The user interface manager 206 can facilitate the input of text or other data to be included in an electronic communication or message. For example, the user interface manager 206 can provide a user interface that includes a keyboard. A user can interact with the keyboard using one or more touch gestures to select text to be included in an electronic communication. For example, a user can use the keyboard to enter a message to accompany and/or describe one or more other content items in an electronic communication. In addition to text, the user interface, including the keyboard interface, can facilitate the input of various other characters, symbols, icons, or other character information.

Thus, the user interface manager 206 can provide a user interface that provides for more efficient and/or more pleasing user experiences when sending or receiving payments. The user interface manager 206 can provide a messaging user interface can include icons, stickers, or other selectable objects tailored to a user. For instance, the user interface manager 206 can provide stickers or other graphical objects corresponding to common currency that the user can select to enter a payment amount. As such, the user interface manager 206 can provide the user with an experience similar to pulling currency from a wallet or purse to arrive at a payment amount. Along related lines, the user interface manager 206 can provide a sticker or other selectable icon or object corresponding to the detected or inferred amount. Thus, the user interface manager 206 can increase efficiency by reducing a need of the user to enter a payment amount.

As further illustrated in FIG. 2, the communication application 202 can include a user input detector 208. In one or more embodiments, the user input detector 208 can detect, receive, and/or facilitate user input in any suitable manner. In some examples, the user input detector 208 can detect one or more user interactions with respect to the user interface. As referred to herein, a "user interaction" means a single interaction, or combination of interactions, received from a user by way of one or more input devices.

For example, user input detector 208 can detect a user interaction from a keyboard, mouse, touch pad, touch screen, and/or any other input device. In the event the client device 104a, 104b includes a touch screen, the user input detector 208 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 208 may additionally, or alternatively, receive data representative of a user interaction. For example, user input detector 208 may receive one or more user configurable parameters from a user, one or more user commands from the user, and/or any other suitable user input. The user input detector 208 may receive input data from one or more components of the communication application 202, from the storage on the client device 104a, 104b, or from one or more remote locations (e.g., the network application 204).

The communication application 202 can perform one or more functions in response to the user input detector 208 detecting user input and/or receiving other data. Generally, a user can control, navigate within, and otherwise use the communication application 202 by providing one or more user inputs that the user input detector 208 can detect. For example, in response to the user input detector 208 detecting user input, one or more components of the communication application 202 allow a user to select a recipient for a message, compose a message, select content to include in a message, and/or send a message to the recipient. In addition, in response to the user input detector 208 detecting user input, one or more components of the communication application 202 allow a user to navigate through one or more user interfaces to review received messages, contacts, etc.

In one or more embodiments, in response to the user input detector 208 detecting one or more user inputs, the communication application 202 can allow the user to create a payment to send to one or more other users. For example, a user wanting to send a payment can interact with a payment element provided on a menu within a user interface. Upon detecting the user interaction with the payment element, the user input detector 208 can cause the user interface manager 206 to provide a user interface for creating a payment. Therefore, in response to the user input detector 208 detecting one or more user inputs, the communication application 202 can allow a user to create a customized payment that defines a payment to be sent to another user, as will further be described below.

As further illustrated in FIG. 2, the communication application 202 can include a message handler 210 that manages messages provided to or sent from the communication application 202. For example, the message handler 210 can interact with the user interface manager 206 and the user input detector 208 to coordinate the sending and receiving of messages using the communication application 202. The message handler 210 may direct the sending and receiving of messages to and from the network application 204 over the course of an electronic messaging session among a plurality of participants. The message handler 210 may organize incoming and outgoing messages and direct the user interface manager 206 to display messages.

In one or more embodiments, the message handler 210 can facilitate receiving and sending data via the communication application 202. In particular, message handler 210 can facilitate sending and receiving messages. For example, the message handler 210 can package content to be included in a message and format the message in any necessary form that is able to be sent through one or more communication channels and using an appropriate communication protocol, as described herein. Likewise, the message handler 210 can process messages the client device 204 receives from other users.

In addition to providing communication functions for the communication application 202, the message handler 210 can provide access to message data. For example, the message handler 210 can access data that represents a list of contacts, or one or more groups of contacts, to include and recipients to a message. To illustrate, the message handler 210 can obtain and provide data representing a contact list to the user interface manager 206 to allow the user to search and browse a contact list, and ultimately select an individual contact or group of contacts to include as recipients of a message. In one or more embodiments, a social-networking system can maintain remote contact list data (e.g., a "friends list"), and the message handler 210 can access the contact list data on the social-networking system for use within the communication application 202.

The message handler 210 can also provide access to other local or remote data that the communication application 202 can use to compose, send and receive messages. For instance, the message handler 210 can obtain access to files, images, audio, video and other content that a user can include in a message. Moreover, the message handler 210 can provide access to one or more functions of the sender client device 204 to provide the user the ability to capture or create content to include within a message. For example, the message handler 210 can activate a camera, a microphone, or other function that allows the user to capture content to include in a message.

In addition, the message handler 210 can facilitate the sending of a payment. In particular, FIG. 2 illustrates that the communication application 202 can include a payment message generator 216 that can generate a payment message that the message handler 210 can send to the network application 204 to initiate a payment process/transaction. For example, upon a sender selecting a payment element on a user interface, the payment message generator 216 can create a data package that includes payment information received from the sender. A payment message can include an indication of an amount of money to be sent as part of the payment transaction as well as any necessary information to allow the network application to perform a payment transaction.

In one or more embodiments, the payment message generator 216 can create a data package that includes the payment amount, one or more sender identifiers, one or more recipient identifiers, one or more payment methods or sender account information, authorization information, currency information, a message or payment description, and/or any other data that may be helpful to facilitating a payment form the sender to the recipient. Alternatively, a payment message can simply identify a recipient and an amount of a payment. The payment message generator 216 can pass the payment message (e.g., the data package that includes the payment information) to the message handler 210 to send to the network application 204.

The payment message generator 216 can also obtain payment information from various sources. For example, the payment message generator 216 can obtain payment information directly from the sender via the user input detector 208. Additionally, or alternatively, the payment message generator can gain access to payment information maintained on the client device 104a, 104b by the data manager 218. For example, the communication application 202 can allow a sender to input and save various payment methods and/or identify a default payment method, default currency, and otherwise specify other user preferences related to sending and/or receiving a payment.

In one or more embodiments, the payment message generator 216 can access and provide a token within a payment message. The token can reference a payment credential stored by the network application 204. For example, the payment message generator 216 can retrieve a token to include in, or with, the payment message that verifies the sender and/or sender client device 104a as authorized to make the payment using a payment credential stored by the network application 204.

As mentioned above, the client application 202 can further include a message analyzer 212. The message analyzer 212 can analyze messages sent from and received by the client application 202 for potential payment events. In one or more embodiments, the message analyzer 212 can infer the payment events from the electronic messages exchanged between users based on contextual content in the exchanged messages. Specifically, the message analyzer 212 can identify certain phrases or character strings that indicate an opportunity for a payment. For example, the character strings can include predetermined character strings from electronic messages in a conversation between two or more users. Identifying the predetermined character strings indicating the payment event in the messages, allows the message analyzer 212 to infer payment events without requiring users to follow rigid requirements for initiating payment transactions with one or more other users.

According to some embodiments, the message analyzer 212 can analyze natural language. In particular, a user can communicate with one or more other users using natural language phrases in electronic messages. By using natural language detection, the message analyzer 212 can interpret the content of the messages to the other users. If the user sends a request to initiate a payment transaction using natural language, the message analyzer 212 can infer the request from the natural language and provide the option to initiate the payment transaction. Additionally or alternatively, the message analyzer 212 can provide an option to complete an initiated payment transaction.

According to one or more additional or alternative embodiments, the message analyzer 212 can provide a way for users to initiate group payments based on messages associated with users of the system 100. Specifically, the message analyzer 212 can identify a group event associated with two or more users by analyzing electronic messages from and/or to one or more of the users, locations of the user, social network data, or other data. For example, the message analyzer 212 can analyze messages in information feeds associated with the users, social network data (check-ins, user profiles, posts, likes, info about friends, etc.) messages in conversations between two or more of the users, text messages associated with the users, or any other electronic messages associated with the users to identify natural language or character strings associated with an event. Additionally, the message analyzer 212 can determine a number of users in the group based on the electronic messages.

The message analyzer 212 can use the inferred event and determined users in the group to provide an option to one or more of the users in the group to request payment from other users in the group. In particular, the message analyzer 212 can identify one or more group leaders for providing the option to request a payment. The one or more group leaders can then request a payment from one or more of the identified users in the group to pay for the event or for a transaction related to the event. The users receiving the request can then use the payment system to pay the one or more group leaders.

After inferring the payment event, the message analyzer 212 can provide an option to initiate a payment transaction between the users based on the inferred payment event. Thus, in one or more embodiments, the system 100 can allow users to initiate payment transactions with other users based on messages exchanged between the users without interrupting the natural flow of an exchange of messages between the users. Specifically, the message analyzer 212 can identify certain phrases or character strings that indicate or infer a payment event. For example, the message analyzer 212 can identify the string "you owe me $15 for the movie ticket." Based on the inferred payment, the message analyzer 212 can instruct the user interface manager 206 to provide an option to initiate a payment or otherwise suggest one or more of the users to send a payment. For instance, the user interface manager 206 can configure the "$15" as a selectable element that a user can select to initiate a payment.

The client application 202 can further include a location detector 214. The location detector 214 can access or identify a location of the client device 104a, 104b based on GPS information from the client device 104a, 104b, cell tower triangulation, WIFI received signal strength indication, WIFI wireless fingerprinting, radio-frequency identification, near-field communication, by analyzing messages, or based on data from other sources. The location detector 214 can then provide the location of the client device 104a, 104b to the message analyzer 212 or the network application 204. Additionally, the location detector 214 can receive indications of the location of other client devices from the network application 204 and provide them to the message analyzer 212.

As discussed above, the client device 104a can include a data manager 218, as illustrated in FIG. 2. The data manager 218 can maintain message data representative of data used in connection with composing, sending, and receiving messages between a user and one or more other users. For example, message data can include message logs, contact lists, content, past communications, and other similar types of data that the communication application 202 can use in connection with providing the ability for users to communicate using the communication application 202.

The data manager 218 may also maintain payment data representative of information used to generate payment messages. For example, payment data may include a payment method data (i.e., a credential) such account data (e.g., bank or credit card account data). Furthermore, payment data can include payment preferences (e.g., a default payment method). In general, payment data can include any data that the payment message generator 216 can use in connection with generating a payment.

As briefly mentioned above, in addition to the client devices 104a, 104b, the system 100 can further include a network application 204 that is implemented in whole or in part on the server device(s) 108. In one or more embodiments of the invention, the network application 204 comprises a social-networking system (such as but not limited to FACEBOOK™), but in other embodiments the network application 204 may comprise another type of application, including but not limited to an e-mail application, search engine application, banking application, or any number of other application types that utilizes user accounts.

In one or more embodiments where the network application 204 comprises a social-networking system, the network application 204 may include a social graph 250 for representing and analyzing a plurality of users and concepts. Node storage 252 of the social graph 250 can store node information comprising nodes for users, nodes for concepts, nodes for transactions, and nodes for items. Edge storage 254 of the social graph 250 can store edge information comprising relationships between nodes and/or actions occurring within the social-networking system. Further detail regarding social-networking systems, social graphs, edges, and nodes is presented below with respect to FIG. 19.

The communication manager 230 can process messages received from client applications 202. For example, the communication manager 230 can interact with a message handler 206 of a client application 202. The communication manager 230 can act as a director for messages sent back and forth among users in an electronic messaging conversation. The communication manager 230 may receive a message from client application 202, detect the intended recipient of the message, and send the message to the client application 202 (or device) associated with the intended recipient. One will appreciate that the communication manager 230 can direct a message for a recipient to multiple client devices associated with the recipient (i.e., each device upon which the user has installed a version of the client application 202).

Additionally, the communication manager 230 can also re-format or otherwise modify the content or format of a message based on the messaging protocol used by a destination communication device or a type. As such, in one or more embodiments the system 100 can allow participants using different communication platforms to exchange messages. For example, the communication manager 230 can receive a message in a first protocol (SMS, IM, XMPP, APNS, etc.), re-format the message into a second protocol, and send the reformatted message to the intended recipient(s).

The status manager 232 can track the status of users of the client applications 202 and/or the client devices 104*a*, 104*b*. For example the status manager 232 can identify when a user is logged into the client application 202, when a user is active on the client application 202, when a client device 104*a*, 104*b* associated with a user or user account is online or active. The status manager 232 can send indications (such as push notifications) to the client application 202 to notify the client application 202 of the status of users, device, messages, or payments. The user interface manager 206 can add, modify, or otherwise change or update status notifications based on indications received from the status manager 232. For example, the status manager 232 can send an indication to the client application 202 indicating that another user has accessed a message, received a payment, sent a payment, is active, a device or device type a co-user is active on (e.g., mobile vs. web), etc. The user interface manager 206 in turn an update a user interface to notify a user of the status.

The network application 204 may also include a message database 234. The message database 234 can maintain message data representative of content of messages from electronic messaging sessions among a plurality of participants. The message database 234 may maintain status data representative of the information mentioned above that the status manager 232 tracks. The message database 234 can thus provide an archive of messaging threads, which the network application 204 can provide to a user on demand or once a user logs into the client application 202 using a new computing device.

The payment manager 236 of FIG. 2 can integrate the sending and receiving of payment messages and initiate payment transactions, and may employ one or more application programming interfaces (APIs). For example, upon the communication manager 230 can receiving a payment message, the communication manager 230 can send any payment details to the payment manager 236. The payment manager 236 can then user the payment details retrieved from the payment message to initiate a payment transaction using the payment network 115.

The payment manager 236 can coordinate a transaction corresponding to a payment defined in a payment message. As generally explained above, the payment manager 236 can coordinate a transaction via the payment network 115 that corresponds to a payment message, monitor the status of the transaction, and provide status information regarding the transaction. More specifically, the payment network 115 can authorize a transaction, fund a transaction, and/or settle an individual transaction or batch of transactions as described above with reference to FIG. 1. In one or more embodiments, the payment manager 236 can use one or more application programming interfaces (API) to communicate relevant information with the payment network 115.

To complete a transaction, the payment manager 236 can access or obtain a payment credential for the recipient (such as deposit account information, debit card, credit card, gift card, electronic wallet). The payment manager 236 can obtain a recipient's payment credential using a variety of methods. In one example embodiment, a recipient can register one or more deposit accounts or other payment credentials with the network application 204. Upon a user registering a deposit account or other payment credential, the user profile database 240 can maintain the payment credential.

After the payment manager 236 receives the payment information, the payment manager 236 can identify the recipient. The payment manager 236 can lookup the recipient in the user profile database 240 to determine if the recipient has registered a payment credential. At this point, the payment manager 236 can initiate the transaction.

In the event that the recipient's user profile does not include a payment credential, the payment manager 236 can direct the communication manager 230 to send the recipient a message prompting the recipient to provide a payment credential. The message may prompt the recipient to register a payment credential by providing one or more interactive fields that allows the recipient to provide payment credential details. Additionally, or alternatively, upon determining that a recipient does not have a registered payment credential, the payment manager 236 can generate a temporary deposit 242. In particular, the payment manager 236 can generate an account number and associate the account number with the recipient's user profile. In one or more embodiments, the recipient may already have a temporary account 242, and therefore, the payment manager 236 can use the previously created temporary account to complete the transaction. In particular, the temporary account 242 allows the payment manager 236 to proceed immediately to process a transaction without delaying the payment process from the perspective of either the sender or the recipient.

Upon completion of the payment, the payment manager 236 deposits the payment amount to the temporary account 242. In one or more embodiments, the payment manager 236 can cause the communication manager 230 to send the recipient a message providing a hyperlink and/or instructions to transfer the money from the temporary account to a registered deposit account. Alternatively, if the recipient does not want to register a deposit account, the message system can provide the recipient instructions to withdraw the money from the temporary account.

In addition to coordinating a transaction via the payment network 115, the payment manager 236 can also coordinate a transaction with respect to one or more system user accounts. In one or more embodiments, the network application 204 can support user cash accounts, such as gift card accounts, cash card accounts, or similar types of user accounts. The sender can specify the sender's user cash account as the method of payment, and likewise, the recipient can set the recipient's user cash account as the registered deposit account. Therefore, in at least some embodiments, the entire transaction, or substantially the entire transaction, can be processed within the network application 204.

In one or more embodiments, the system 100 can also allow a recipient to register a credit card account as a payment credential to receive funds. In order to send funds to a user's credit card, the payment manager 236 can send a refund request to credit a payment amount to a recipient's credit card account. In one or more embodiments, the refund request can comprise an unreferenced refund request. An unreferenced refund request is a refund request that is not attached to a previous funding transaction with the user's credit card account. Most credit card providers allow for unreferenced refunds requests to be processed, which results in applying a credit in the amount of the refund request to a recipients credit card account. For example, in the event that a recipient has a negative balance on a credit card account, the refund request amount may be applied to the negative balance. Likewise, in the event that a recipient has a zero balance on a credit card account, the refund request amount would result in a positive credit card account balance that the recipient can spend against.

In one or more embodiments, the payment network coordinator 256 can organize and process batches of credit card funding requests and batches of credit card refunding requests. In particular, due to a variety of fee structures associated with credit card transactions, the payment network coordinator 256 can process batches of credit card funding and refunding requests to minimize potential fees.

The payment manager 236 of FIG. 2 may perform various functions with relation to coordinating the information received from the communication manger 230 to request and accept payment requests, and to coordinate the payment process. For example, the payment manager 236 can create and store payment credentials. More specifically, a user (e.g., senders and recipients) may already have accounts with the network application, and thus already be registered users, or may still need to set up an account. In one embodiment, at least some of the users can also be members of a social-networking system and already have identifiers ("IDs") and user profiles associated with social-networking accounts that are also used when messaging using the system 100. Alternatively, other users may not be members of the social-networking system and need to create an account to become a registered member of the system 100. In this example, the payment manager 236 can receive date from these users (via the client application 202) and create an account, and then create a unique ID and user payment profile for these users, which will be referenced later during the payment process. In some cases, the payment manager 236 may also augment user profiles of previous social-networking users to include payment profile features that may have been absent.

In setting up or augmenting the account, a user can submit one or more payment credentials, such as a credit card, a debit card, a deposit account or other bank accounts, gift card accounts, store credit accounts, etc. When adding methods of payment, the user can be required to submit card and/or account numbers, expiration dates, security codes, transfer or routing identification numbers, and bank information required for money transfers. The user can also create an authorization code such as a personal identification number (PIN), or use a security code of a credit card, e.g., when providing only a single payment method, or provide some other authorization code. The user can also select a default method of payment.

The user payment profiles stored by the user profile database 240, accordingly, can include user (or group) IDs created uniquely for each registered user (whether as a social-networking user and/or as a messaging user). The user profile database 240 can provide storage for payment credentials of users of the network application 204. For example, the user can create an "account" with the network application 204, which allows a user to provide the payment information to the network application 204. The network application 204 can then save that payment information in the user profile database 240. In one or more embodiments user profile database 240 can store in relation to the user one or more of: a first name, a middle name, a last name, a payment card number (e.g., a credit card, debit card), an expiration date (year and/or month) of the payment card, a card security code of the payment card (e.g., a Card Verification Value (CVV or CVV2)), a billing address (including street name, house number, city, state or province, zip code, country, etc.) associated with the credit card, a phone number associated with the credit card, one or more shipping addresses (including similar fields as the billing address). When the payment card comprises a debit card, the profile storage module can also store a personal identification number (PIN) for the debit card. In an embodiment where the network application 204 comprises a social-networking system, the payment information stored in the user profile database 240 may be associated with a node of the node storage 252 that represents the user.

In any event, upon receipt of a payment message from a sender, the payment manager 236 can detect the user (or group) ID of the sender and retrieve the payment profile for that user (or entity). The payment manager 236 can then generate a transaction package that includes a transaction ID associated with a payment amount, the sender, and the recipient. The transaction package can also include a default payment method, and related information, unless the sender selected to send a payment to the recipient with an alternative payment method, in which case the transaction package can include payment information for the alternative payment method. The payment manager 236 may then send the transaction package to the payment network 115 to initiate the payment authorization process.

The transaction database 238 of FIG. 2 can provide storage for each transaction (such as in the form of a graph object), attempted or completed, the transaction ID, a date, an amount of the transaction, the payment method used, associated messages interchanged between sender and recipient related to the transaction, and any other information gathered on the transaction. With this information, the payment manager 236 can provide, upon request, a summary of one or more transactions to users as a history of payments requested, payments declined and payments completed.

The payment manager 236 can perform various other additional steps and methods in order to effectively manage the payment process. In one or more embodiments, for example, upon receiving a payment message the payment manager 236 can generate a transaction identifier (or simply "transaction ID") and associate the transaction identifier with the payment message and/or the payment information within the payment message. For instance, upon generating a transaction ID, the payment manager 236 can send the transaction ID and the payment information to a transaction database 238. The transaction database 238 can include a data table or similar data matrix that stores transaction information according to transaction ID.

In one or more embodiments, after a transaction ID is associated with a particular payment message, the transaction ID can be included or embedded within substantially all communications within system 100 relating to the particular payment. As such, the transaction ID allows the payment manager 236 to manage and process a large number of payments in an organized fashion. For example, the payment manager 236 can include instructions to include the transaction ID in any information sent to the client devices 104a, 104b. In return, the messaging handlers 210 can also include the transaction ID in any information sent from the client devices 104a, 104b to allow the payment manager 236 to efficiently and reliably identify a particular transaction to which the information corresponds.

As previously mentioned, the network application 204 can include a transaction database 238 that maintains transaction information for each payment message received via a client device 104a. For example, transaction information can include a transaction ID associated with one or more sender identifiers, recipient identifiers, payment amounts, payment methods (e.g., sender accounts), deposit methods (e.g., recipient accounts), transaction history, current transaction status, as well as other transaction information. In one or more embodiments, the transaction information is maintained in the form of one or more graph objects that are updated with any updates or actions with respect to a transaction.

Also, as previously mentioned, the network application can maintain one or temporary accounts 242. The temporary accounts 242 can function as a type of "hot account" that provides funding for a deposit to be made into a recipient account prior to the settlement or actual funding of the payment from the sender's account. For instance, with some payment methods, the funding of the payment may take several hours or even days for money to be debited from the sender's account. However, a payment authorization request can verify and reserve funds to satisfy a payment. Thus, upon receiving a successful response from a payment authorization request, the payment manager 236 can fund the payment amount from the temporary accounts 242 to provide a shorter time for the payment to arrive in the recipient's account. Once the payment funds from the sender's account, the temporary account is renewed for the amount of the payment.

As discussed, the systems and components discussed above with reference to FIGS. 1-2 can allow users of a message system to easily, effectively, and securely send and receive payments via an integrated messaging and payment system 100. FIGS. 3A-3D illustrate example process diagrams of one or more example embodiments of processes implemented by system 100 discussed above. Consistent with system 100 illustrated in FIGS. 1 and 2, FIGS. 3A-3D illustrate a sender client device 104a with a client application 202, a recipient client device 104b with a client application 202, server device(s) 108 that supports a network application 204, and a payment network 115.

Figure 3A:
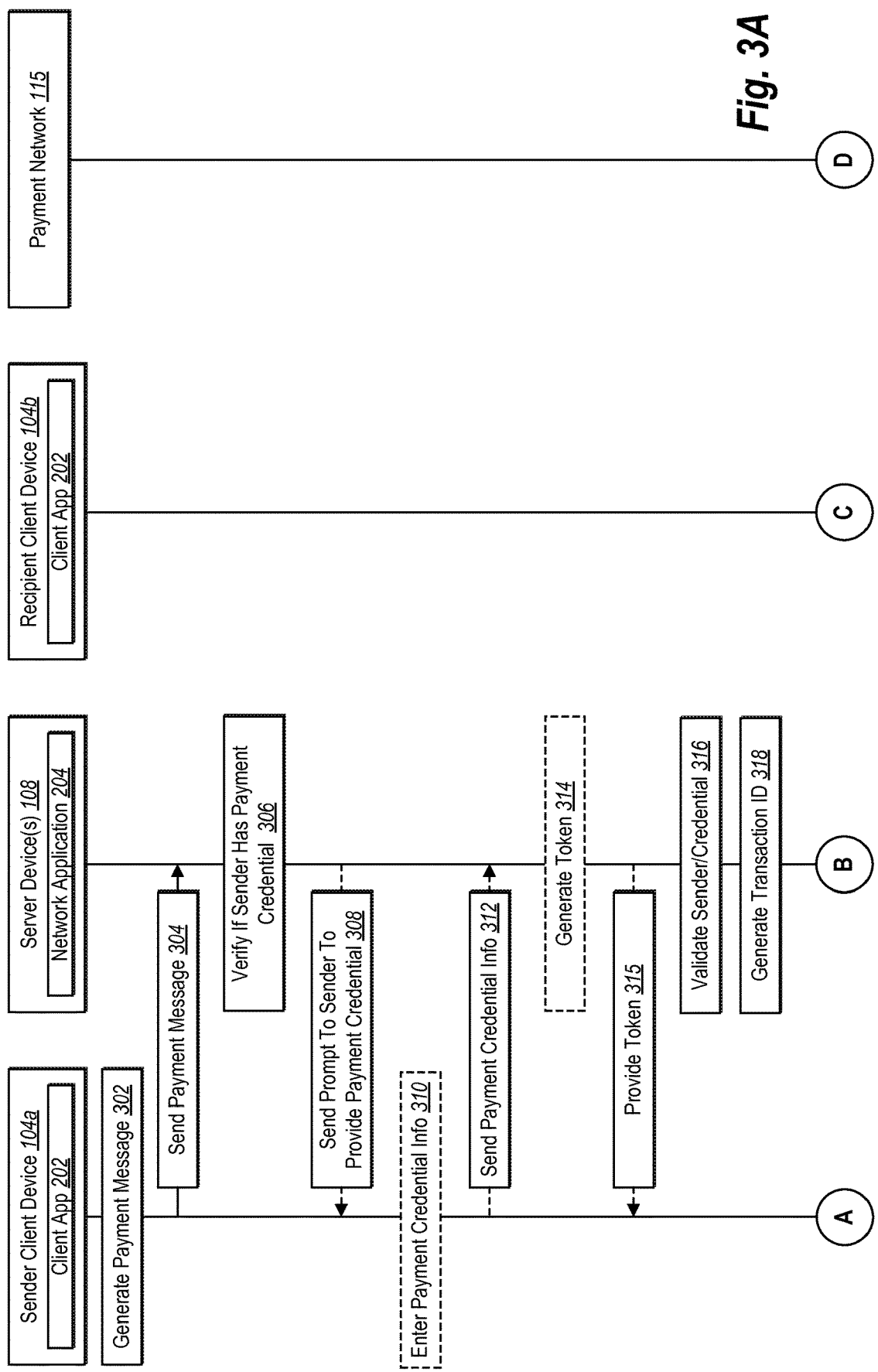

In one or more embodiments, a process for a user sending a payment to another user via the system 100 can begin with a sender user (or simply "sender") associated with the sender client device 104a providing user input to the client application 202 to generate a payment message 302. In particular, and as described above, the sender can access one or more user interfaces that allow the sender to define a payment to be made to a recipient user (or simply "recipient"). In addition, the client application 202 can cause the sender client device 104a to send the payment message 304 to the network application 204, as shown in FIG. 3A.

The network application 204 can receive the payment message 302 and use information provided by the payment message 302 to determine if the sender has a payment credential 306 on file. For example, the network system 204 can use a network identifier (e.g., username or other ID) to lookup a user profile for the user in the user profile database 240 to determine if the user profile has a payment credential associated therewith. If the sender has a payment credential 306, the network application 204 can validate the sender and/or the payment credential 306 as described in relation to act 316 and skip acts 308-315.

In the event that the user does not have a payment credential 306, the network application 204 can request that the user provide a payment credential 306. In particular, the communication manager 230 can send a prompt 308 to the sender client device 104a to prompt the sender to provide a payment credential 306. The network application 204 can cause the communication manager 230 to send the prompt 308 prior to proceeding with the payment transaction as shown in the flow of FIG. 3A-3D. Alternatively, the network application 204 can cause the communication manager 230 to send the prompt 308 for a payment credential 306 after the network application 204 has been verified that the recipient has a payment credential on file as described below in relation to FIGS. 5A-5D.

Upon receiving the prompt 308 to provide a payment credential, the user can ignore or close the prompt 308, which can cause the network application 204 to resend the prompt 308 after a predetermined amount of time, in response to a request from another user, or in response to a predetermined trigger (e.g., the next time the sender logs into the client application 202). In any event, the sender can enter payment credential information 310 using the sender client device 104a. The sender client device 104a can send 312 the payment credential information 310 to the network application 204.

Upon receiving the payment credential information 310, the network application 204 can associate one or more payment credentials 306 with the sender based on the payment credential information 310. Optionally, the network application 204 can generate a token 314. The token 314 can map to the payment credential details and allow the network application 204 to retrieve the payment credential in response to subsequent payment requests. In particular, the network application 204 can return a random string called a "token" as a pointer to the stored payment credential. The token 314 preferably has no algorithmic relationship with the payment credential, so that the payment credential cannot be derived based on the token itself (such as by merely applying a decryption algorithm to the token). Accordingly, this token 314 is not considered cardholder data, because it is a random string from which it is not possible to extrapolate any sensitive data without the use of the network application 204, which contains a list of payment credentials and the tokens to which they correspond. Payment tokens generated by the network application 204, can allow for validation of a payment request as explained in greater detail below. The network application 204 can provide the token 314 to the sender client device 202.

At this point, or before depending upon whether the sender already had a payment credential 306 on file, the network application 204 can perform a validation step 316 to validate the sender and/or the payment credential 316. For example, the network application 204 can verify that the payment message 302 included a valid token 314 that references a stored payment credential 306.

Alternatively to validate the user, the client application 202 can obtain, identify, or otherwise discover a user identifier for the sender for the network application 204. For example, the client application 202 can access an obfuscated (e.g., hashed, encrypted, or otherwise algorithmically transformed) user identifier of the user existing on the computing device 104a of the sender. This user identifier can identify a user profile/account for that user of the network application 204 (e.g., a social networking application). In one or more embodiments of the invention, the user identifier is accessed from a portion of shared memory accessed by or reserved by the network application 204, and may only exist if the user is currently "logged on" to the network application 204. In one or more other embodiments, the user identifier is accessed from a cookie (e.g., HyperText Transfer Protocol (HTTP) cookie) or from application cache (e.g., a HyperText Markup Language version 5 (HTML5) application cache) on the user's computing device 104a.

The client application 202 can send the obfuscated user identifier with the payment message 302. The network application 204 can then verify that the obfuscated user identifier is valid. This process may serve as the authentication for the sender, as the existence of a proper obfuscated user identifier for the network application 204 on the user's computing device 104a indicates that the sender has already been authenticated by the network application 204.

In the event that the network application 204 does not validate the sender or the payment credential, the network application 204 can send a communication to the sender client device 104a to cause the client application 202 to present an error message to the sender that indicates the payment could not be authorized. In one or more embodiments, the error message can include a prompt for the sender to provide additional authorization information, agree to terms and conditions, or otherwise verify their identify. After which the sender client device 104a can send a revised payment request to the network application 204. The network application 204 can then attempt to validate the sender/payment credential. If the network application 204 cannot validate the sender/payment credential, then the network application 204 may terminate the payment transaction based on the payment message 302.

Upon the network application 204 validating the sender/payment credential, the network application 204 can generate a transaction ID 318, as illustrated in FIG. 3A. As described above, the network application 204 can associate a unique transaction ID to each payment message received. The network application 204 can include the transaction ID within various files, objects, messages, and other information to allow the network application 204 to efficiently identify and process messages, status updates, and other information with respect to each payment made via the network application 204. For example, and as described above, the network application 204 can associate the transaction ID with a graph object that maintains information that corresponds to processing a payment message.

Optionally, as indicated by 320, the network application 204 can send an authorization request against the sender's payment credential (e.g., payment card of the sender) for the amount of the payment or another amount (e.g., $0.01 or $100.00) to the payment network 115, which can approve or deny payment card authorization. The payment network 115 can then forward the payment credential authorization response to the network application 204, as indicated by 322. One will appreciate that the optional authorization request can take place earlier or later in the timeline. In alternative implementations, the network application 204 can send an authorization request against the payment credential of the sender for the amount of the payment as part of the payment transaction request 338.

In response to sending the payment message 302, in response to providing a payment credential 306, or in response to a signal from the network application 204, the client application 202 can post 324 the payment message content. For example, the user interface manager 206 can add the text of the payment message 302 to a communication thread having a message exchanged between the sender and the recipient as a sent message.

Similarly, the network application 204 can send the payment message content 328 to the recipient client device 104b so that the client application 202 of the recipient client device 104b can post 329 the payment message content 328. For example, the user interface manager 206 can add the text of the payment message 302 to a communication thread having messages exchanged between the sender and the recipient as a received message.

The network application 204 use information provided by the payment message 302 to determine if the recipient has a payment credential 326 on file. For example, the network system 204 can use a network identifier (e.g., username or other ID) to lookup a user profile for the recipient in the user profile database 240 to determine if the user profile has a payment credential associated therewith. If the recipient has a payment credential 326, the network application 204 can validate the recipient and/or the payment credential 326.

In the event that the recipient does not have a payment credential 336, the network application 204 can request that the recipient to provide a payment credential 336. In particular, the communication manager 230 can send a prompt 330 to the recipient client device 104b to prompt the recipient to provide a payment credential 326. The network application 204 can cause the communication manager 230 to send the prompt 330 prior to proceeding with the payment transaction.

Upon receiving the prompt 330 to provide a payment credential, the recipient can ignore or close the prompt 330, which can cause the network application 204 to resend the prompt 330 after a predetermined amount of time, in response to a request from another user, or in response to a predetermined trigger (e.g., the next time the recipient logs into the client application 202). In any event, the recipient can enter payment credential information 332 using the recipient client device 104b. The recipient client device 104b can send 334 the payment credential information 332 to the network application 204.

Upon receiving the payment credential information 332, the network application 204 can associate one or more payment credentials 326 with the recipient based on the payment credential information 332. Optionally, the network application 204 can generate a token 335 similar to the token 314. The token 335 can map to the payment credential details and allow the network application 204 to retrieve the payment credential in response to subsequent payment requests as described above.

At this point, or before depending upon whether the recipient already had a payment credential 326 on file, the network application 204 can perform a validation step 336 to validate the recipient and/or the payment credential 326. For example, the client application 202 can obtain, identify, or otherwise discover a user identifier for the recipient for the network application 204 as describe above in relation to validating the sender. The client application 202 on the recipient client device 104b can send the obfuscated user identifier to the network application 204 in response to receipt of the payment message content 328. The network application 204 can then verify that the obfuscated user identifier is valid. This process may serve as the authentication for the recipient, as the existence of a proper obfuscated user identifier for the network application 204 on the recipient's computing device 104b indicates that the recipient has already been authenticated by the network application 204.

In the event that the network application 204 does not validate the sender or the payment credential, the network application 204 can send a communication to the recipient client device 104b to cause the client application 202 to present an error message to the recipient that indicates the payment could not be authorized. In one or more embodiments, the error message can include a prompt for the recipient to provide additional authorization information, agree to terms and conditions, or otherwise verify their identify.

Optionally, the network application 204 can send an authorization request against the recipient's payment credential (e.g., payment card of the recipient) for the amount of the payment or another amount (e.g., $0.01 or $100.00)

to the payment network 115, which can approve or deny payment card authorization. The payment network 115 can then forward the payment credential authorization response to the network application 204. One will appreciate that the optional authorization request can take place earlier or later in the timeline. Thus, in one or more embodiments, the payment network 215 can verify that the recipient account is available to accept a payment.

Continuing with FIG. 3C, upon the network application 204 validating the sender/recipient, the network application 204 can send a payment transaction request 338 to the payment network 115 to process the funding of the payment. In particular, the payment transaction request 338 can provide payment information and instructions to charge 340 the payment amount to the sender's payment credential. Additionally, the instructions can instruct the payment network 115 to credit 342 the recipient's payment credential. Depending on the payment credentials (e.g., the payment account types) and the deposit account type, the funding of the payment may take various forms. FIG. 3D discusses additional process for funding the payment, and will be discussed below.

Upon funding the payment, the payment network 115 can send the network application 204 a payment transaction response 330, as shown in FIG. 3A. Specifically, the payment transaction response 330 can indicate the funding of the payment was successful. The network application 204 can then send a payment complete status update to the sender client device 104a. Likewise, the network application 204 sends a payment claimed status update to the recipient client device 104b.

FIG. 3D illustrates additional examples of a payment process, and in particular additional examples of funding processes to allow the network application 204 to process payments using a wide variety of payment methods and deposit accounts. FIG. 3D illustrates an example process flow that separately processes the funding request from the sender's account and depositing the payment in the recipient's account. In one or more embodiments, for example, the sender's account may be accessible on a first payment network, while the recipient's account is available on a second payment network. In such a situation, in order to process the payment, the network application 204 can act as an intermediary for processing the payment.

Figure 3B:
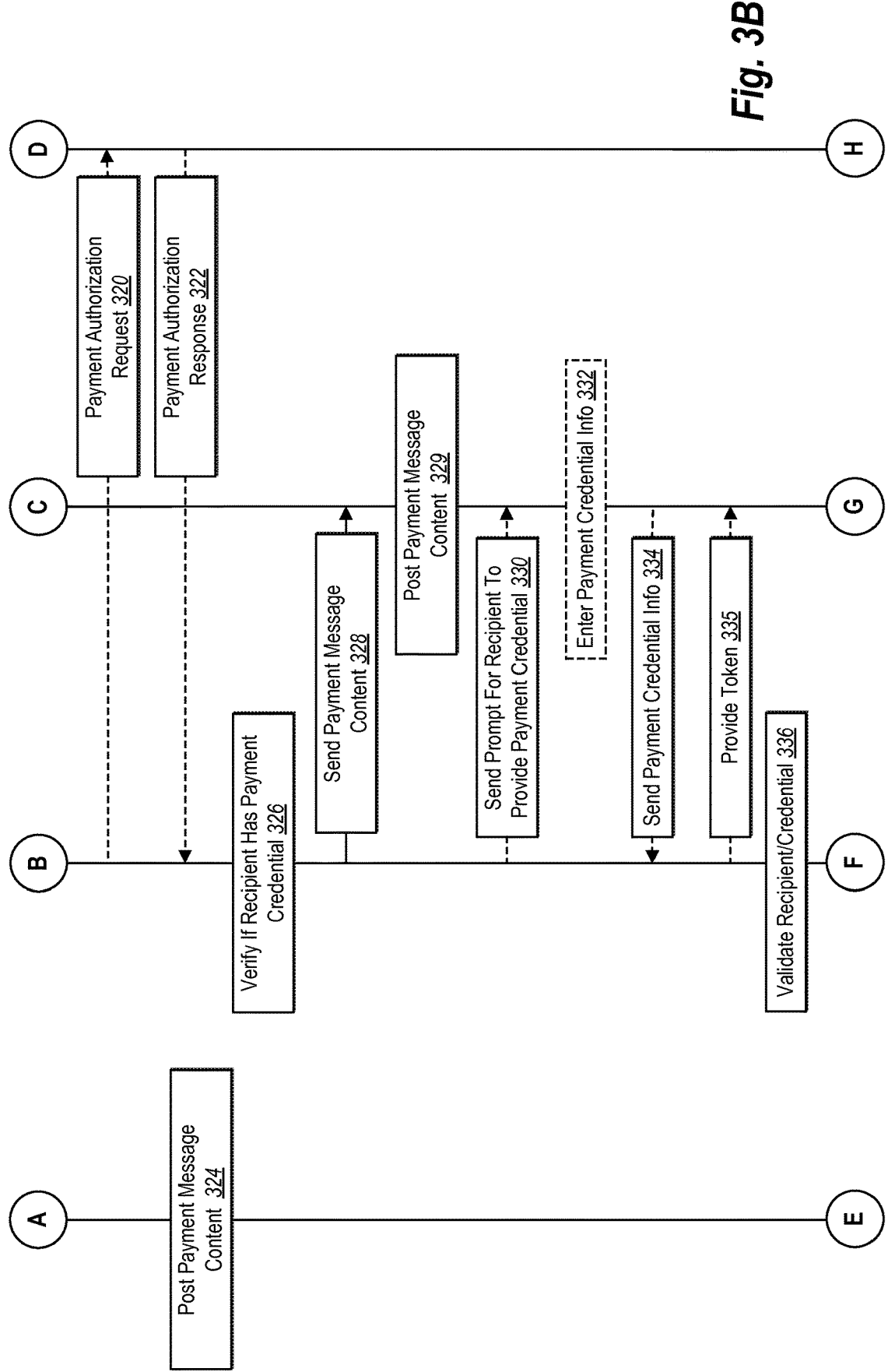
Figure 3D:
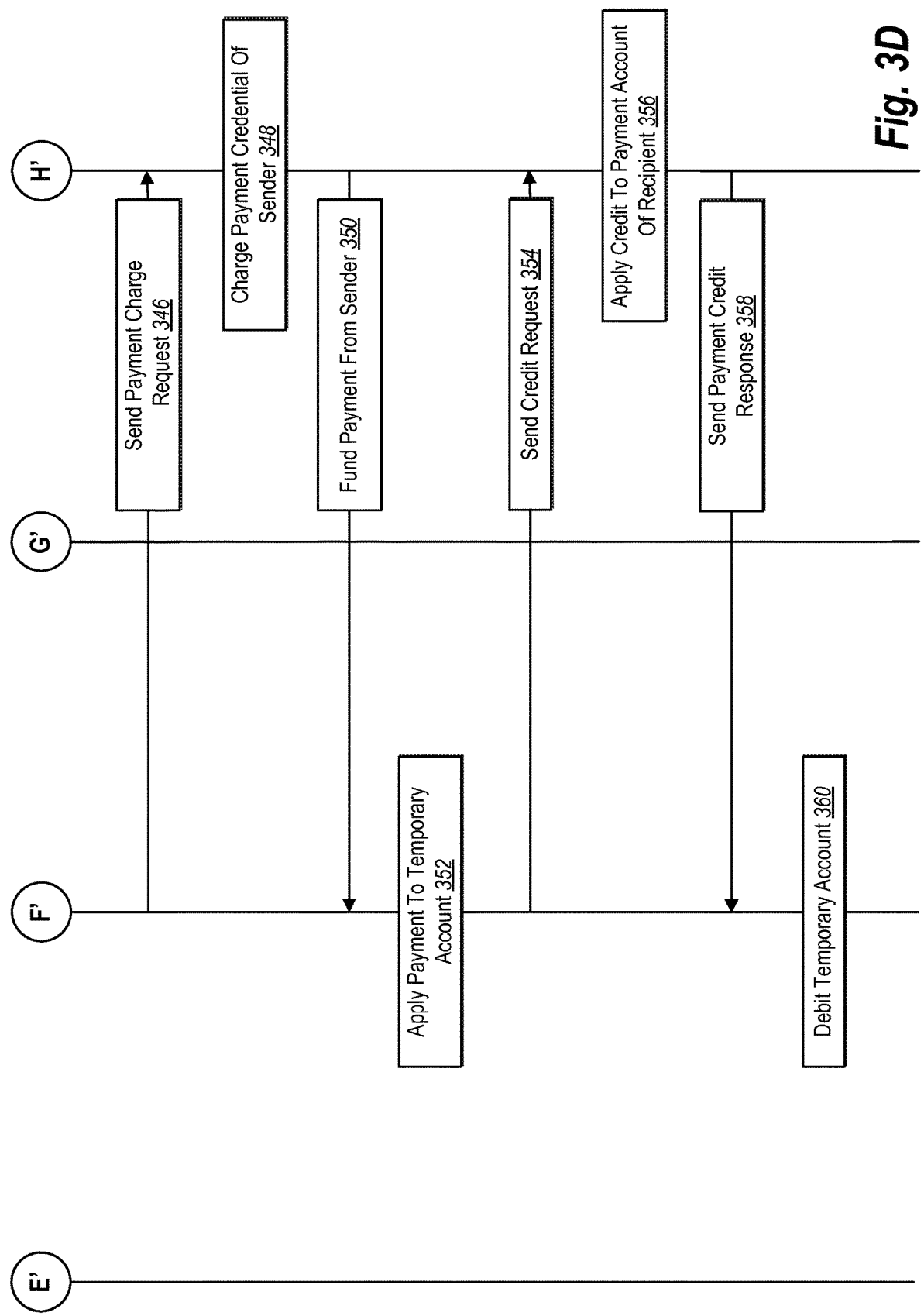

The process flow shown in FIG. 3D resumes after the after FIG. 3B, or in other words, after the network application 204 has validated the sender and the recipient. The network application 204 can send a payment charge request 346 to the payment network 115 that requests the payment amount be charged 348 to the sender's payment credential and sent to the network application 204. In response, the payment network 115 can fund 350 the payment from the sender's account by electronically transferring money from the sender's account to the network application 204. Upon receiving the electronic transfer, the network application 204 can apply the payment to a temporary account 352. In one or more embodiments, the network application 204 can create a new account to which to apply the payment. Alternatively, the network application 204 can apply the payment to a master temporary account that includes various other payments organized and identified by the unique transaction ID associated with each payment.

The network application 204 can then deposit the payment into the recipient's payment credential. In particular, and as illustrated in FIG. 3D, the network application 204 can electronically transfer the payment to the recipient's payment credential via the payment network 115, or another payment network. In particular, the network application 204 can send the funds to the payment network 115 with instructions to apply a credit 354 of the funds to the payment account of the recipient. In the case that the recipient's payment credential is not a deposit account (i.e., is a credit card), the credit request 354 can comprise a refund request. As an alternative, the network application 204 can prepare a settlement package to settle multiple payment transactions together. For example, in one or more embodiments, due to the slow nature of a payment method, the network application 204 may accumulate multiple payments of the same type to include within a settlement package that processes the multiple payments in a single settlement transaction.

The payment network 115 sends a payment credit response 358 to the network application 204 upon successfully depositing the payment into the recipient's account. After receiving the transfer confirmation 358, network application 204 then debits 360 the temporary account 352 for the payment amount, and thereby reconciles the temporary account with respect to the payment. To complete the payment process, the network application 204 can send a payment complete status update to the sender client device 104b and a payment claimed status update to the recipient client device.

As will be described in more detail below, the components of the system 100 as described with regard to FIGS. 1 and 2, can provide, along and/or in combination with the other components, one or more graphical user interfaces. In particular, the components can allow a user to interact with a collection of display elements for a variety of purposes. In particular, FIGS. 4A-4O and the description that follows illustrate various example embodiments of the user interfaces and features that are in accordance with general principles as described above.

For example, FIGS. 4A-4O illustrate various view of GUIs provided by the client application 202 to facilitate electronic messaging and sending and receiving payments. In some examples, a client device (i.e., client device 104a, 104b) can implement part or all of the system 100. For example, FIG. 4A illustrates a client device 400 that may implement one or more of the components of the client device 202. As illustrated in FIG. 4A, the client device 400 is a handheld device, such as a mobile phone device (e.g., a smartphone). As used herein, the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The client device 400 can include any of the features and components described below in reference to a computing device 1800 of FIG. 18. As illustrated in FIG. 4A, the client device 400 includes a touch screen display 402 that can display or provide user interfaces and by way of which user input may be received and/or detected. As used herein, a "touch screen display" refers to the display of a touch screen device. In one or more embodiments, a touch screen device may be a client device 104a, 104b with at least one surface upon which a user may perform touch gestures (e.g., a laptop, a tablet computer, a personal digital assistant, a media player, a mobile phone). Additionally or alternatively, the client device 400 may include any other suitable input device, such as a touch pad or those described below in reference to FIG. 18.

As noted previously, the system 100 can integrate an electronic messaging system and an electronic payment system. FIG. 4A illustrates a people or contacts user interface 404 provided by the user interface manager 206 on the touch screen 402. The contacts user interface 404 can provide a list of contacts of a user ("Donald") of the client device 400. In particular, the contacts user interface 404 can list "friends" or contacts 406 with which the user is connected or associated within the system 100.

The contacts user interface 404 can further provide one or more statuses of each of the contacts 406. For example, the contacts user interface 404 can indicate whether a given contact or co-user is active (e.g., logged into the client application 202, connected to the Internet, recently performed an action using the client application 202) by via of a first status indicator 408. The first status indicator 408 can comprise a graphical user interface object such as an icon. In one embodiment, the first status indicator 408 comprises a dot of a first color (e.g., green) next to a name of each co-user who is active. Along related lines, the first status indicator 408 can also include a dot of a second color (e.g., grey) next to users who are inactive.

The contacts user interface 404 can indicate whether a given the type of device a contact or co-user is currently using via a device indicator 410. The device indicator 410 can comprise a graphical user interface object such as an icon. For example, as shown the device indicator 410 can comprise the words "Web" indicating that a co-user is active or logged into the client application 202 using a personal computer. Along similar lines, the device indicator 410 can include the word "Mobile" to indicate that a given contact is active or logged into the client application 202 using a mobile device, such as a mobile phone. Additionally or alternatively, the device indicator 410 can indicate a brand or model of the client device of a given co-user.

Depending upon privacy settings of given co-users, the contacts user interface 404 can further include a payment status indicator 411. The payment status indicator 411 can indicate whether a given co-user is enrolled or capable of receiving or sending electronic payments using the system 100. For example, the presence of a payment status indicator 411 next to the name of a given co-user can indicate that the given co-user has a payment credential associated with their account or profile with the system 100 or network application 204. The payment status indicator 411 can comprise a graphical user interface object such as an icon. For instance, as shown by FIG. 4A, the payment status indicator 411 can comprise a dollar sign or other symbol commonly associated with payment transactions.

The client application 202 can receive notifications or indications of the statuses of the contacts associated with the user of the client device 400 from the status manager 232 of the network application 204. For example, the client applications 202 can send notifications or status updates to the network application 204 to indicate when the client applications 202 are active or online. The status manager 232 can then send the statuses of contacts associated with a given user to the client devices 104a associated with the given user. Along related lines, the status manager 232 can determine if a given user has a payment credential associated with their profile and can provide indications to the client device 400 of contacts of the user who have the ability to send and receive payments.

One will appreciate in light of the disclosure herein the integration of an electronic messaging system and an electronic payments system can provide significant advantages over conventional payment applications. In particular, a user can access a contacts user interface 404 and determine which co-users are active, and thus, available to chat about a payment transaction or even notice the receipt of a payment. Furthermore, the contacts user interface 404 can optionally allow a user to know which co-users have a payment credential. Thus, the contacts user interface 404 can inform the user whether a co-user will be able to "instantly" receive a payment or whether the user may need to invite the co-user to enroll.

As described above, the system 100 can facilitate receiving and sending data. In one or more embodiments, the communication manager 230 facilitates receiving and sending electronic communications between the computing devices 104a, 104b, 400. Also in one or more embodiments, the user interface manager 206 displays electronic communications sent and received via the communication manager 230. In one or more embodiments, the user interface manager 206 can display electronic communications sent and received via the communication manager 230 in a communication thread within the messaging graphical user interface. For example, a user can interact with a contact list in the list of contacts of the contacts user interface 404 in order to open a messaging graphical user interface that facilitates exchanging messages with the contact. For example, FIG. 4B illustrates a messaging graphical user interface 412 provided by the user interface manager 206 on the touchscreen 402 upon the user selecting the contact "Joe" from the contacts user interface 404.

As shown, the messaging graphical user interface 412 can include a communication thread 414 that includes electronic messages 416a sent from an account of a user of the communication device 400. Similarly, the communication thread 414 can include electronic messages 416b received by the account of a co-user (i.e., "Joe"). In one or more embodiments, the user interface manager 206 organizes the communication thread 414 such that new messages are added to the bottom of the communication thread 414 so that older messages are displayed at the top of the communication thread 414. In alternative embodiments, the user interface manager 206 may organize the messages 416a, 416b in any manner that may indicate to a user the chronological or other relationship between the messages 416a, 416b.

The user interface manager 206 provides a variety of electronic communication characteristics to help a user distinguish between electronic communications in the communication thread 414. For example, as illustrated in FIG. 4B, the user interface manager 206 displays the electronic messages 416a sent from an account of the user of the client device 400 pointed toward one side (i.e., the right side) of the messaging graphical user interface 412. On the other hand, the user interface manager 206 displays the electronic messages 416b received by the messaging handler 210 pointed toward the opposite side (i.e., the left side) of the messaging graphical user interface 412. In one or more embodiments, the positioning and orientation of the electronic messages 416a, 416b provides a clear indicator to a user of the client device 400 of the origin of the various electronic communications displayed within the messaging graphical user interface 412.

Another characteristic provided by the user interface manager 206 that helps a user distinguish electronic communications may be a color of the electronic communications. For example, as shown in FIG. 4B, the user interface manager 206 displays sent electronic messages 416a in a first color and received electronic messages 416b in a second color. In one or more embodiments, the first and second colors may be black and white, respectively, with an inverted typeface color. In an alternative embodiment, the user interface manager 206 may display the electronic messages 416*a*, 416*b* with white backgrounds and different colored outlines.

In yet another alternative embodiment, the user interface manager 206 may display the electronic messages 416*a*, 416*b* with backgrounds of different patterns, in different fonts, in different sizes or in any other manner that may distinguish the sent electronic messages 416*a* from the received electronic messages 416*b*. For example, in one or more embodiments, the user interface manager 206 displays sent electronic messages 416*a* with white typeface on a blue background. Likewise, in one or more embodiments, the user interface manager 206 displays received electronic messages 416*b* with black typeface on a grey background.

As mentioned above, the user interface manager 206 may also provide a message input control palette or toolbar 422. As illustrated in FIG. 4B, the user interface manager 206 displays the message input control palette or toolbar 422 as part of the messaging graphical user interface 412. In one or more embodiments, the message input control palette or tool bar 422 includes a variety of selectable message input controls that provide a user with various message input options or other options. For example, in FIG. 4B, the message input control palette or toolbar 422 includes a text input control 424*a*, a payment control 424*b*, a camera viewfinder input control 424*c*, a multimedia input control 424*d*, a symbol input control 424*e*, and a like indicator control 424*f*. In one or more alternative embodiments, the message input control palette or toolbar 422 may provide the input controls 424*a*-424*e* in a different order, may provide other input controls not displayed in FIG. 4B, or may omit one or more of the input controls 424*a*-424*e* shown in FIG. 4B.

As will be described below in greater detail, a user may interact with any of the input controls 424*a*-424*e* in order to compose and send different types of electronic communications. For example, if a user interacts with the text input control 424*a*, the user interface manager 206 may provide a touch screen display keyboard 418 in a portion of the messaging graphical user interface 412 that the user may utilize to compose a textual message 420. Similarly, if a user interacts with the multimedia input control 424*d*, the user interface manager 206 may provide a multimedia content item display area (e.g., for displaying digital photographs, digital videos, etc.) within a portion of the messaging graphical user interface 412. Likewise, if a user interacts with the camera viewfinder input control 424*c*, the user interface manager 206 may provide a digital camera interface within a portion of the messaging graphical user interface 412 that the user may utilize to capture, send, and add a digital photograph or digital video to the communication thread 306.

A user may interact with any of the message input controls 424*a*-*e* in order to compose and send a message or a payment to one or more co-users via the system 100. For example, in FIG. 4B, a user's finger is shown interacting with the payment control 424*b*. In one or more embodiments, the user input detector 208 can detect interactions (e.g., a tap touch gesture) of the user's finger or other input device with the payment control 424*b*. Upon the user input detector 208 detecting a tap touch gesture on the payment control 424*b*, the user interface manager 206 may display a payment user interface 415 within a portion of the messaging user interface 414 as shown by FIG. 4C.

In particular, as illustrated by FIG. 4C, the user interface manager 206 can provide the communication thread 411 in a first portion (i.e., the upper portion) of the messaging user interface 412. The user interface manager 206 can provide the payment user interface 415 in a second portion (i.e., the lower portion) of the messaging user interface 412. Thus, the user interface manager 206 can allow the user to view the communication thread 414 and any new messages, while also being able to initiate a payment transaction. In alternative embodiments the user interface manager 102 can arrange the communication thread 414 and the payment user interface 415 horizontally or in another arrangement other than a vertical arrangement. In still further embodiments, the payment user interface 415 can comprise an overlay over the messaging user interface 412 or a separate user interface.

As will be apparent from the description herein, the payment user interface 415 can allow a user to initiate a payment transaction (send a payment, request a payment, etc.) while simultaneously viewing messages with one or more co-users party to the payment transaction. For example, FIG. 4C illustrates that the user ("Donald") of the device 400 (hereinafter sender) has sent a message: "Hey Joe, how much was dinner the other night?" In response, the co-user ("Joe") participating in the conversation in the communication thread 414 (hereinafter recipient) has responded: "It was about $50 including the tip." In response to this conversation or messaging session, the sender can desire to send a payment to the recipient. The messaging user interface 412 can allow the sender to do so without having to navigate away from the communication thread 414 or the messaging user interface 412.

As shown, the payment user interface 415 can provide the plurality of quick send selectable elements 430*a*, 430*b*, 430*c*, 430*d* for setting a payment amount. In some implementations, the quick send selectable elements 430*a*, 430*b*, 430*c*, 430*d* include icons that allow the sender to view numerical values associated with the quick send selectable elements 430*a*, 430*b*, 430*c*, 430*d*. In one or more embodiments, the selectable elements 430*a*, 430*b*, 430*c* can have associated numerical values based on common currency values. For example, the selectable elements 430*a*, 430*b*, 430*c* can have numerical values that are determined by currency bills for a currency used by the sender. To illustrate, if the sender uses American dollars, the selectable icons can have numerical values equal to common American dollar bills (e.g., "$1," "$5," and "$10"). In one instance, the system 100 can automatically detect a currency used by the sender based on the credentials entered by the users, information entered by the user, the current location of the client device 400 as detected by the location detector 214, and/or other information associated with the sender. In additional or alternative embodiments, the selectable elements 430*a*, 430*b*, 430*c* can have numerical values other than common currency values.

In another example, the sender can customize the selectable elements by adding, removing, and/or modifying numerical values associated with the selectable elements. Specifically, the sender can choose to use larger values with one or more of the selectable elements 430*a*, 430*b*, 430*c* than the payment interface 415 provides by default. The sender can, for example, select an additional selectable element 430*d* for adding to, or modifying, the selectable elements 430*a*, 430*b*, 430*c* in the payment interface 415. Additionally or alternatively, the additional selectable element 430*d*, when selected, can cause the user interface manager 206 to present a list or menu of all possible selectable elements for incrementing the payment amount, some of which may not fit into the graphical user interface due to the size of the client device 400. Alternatively, selection of the additional selectable element 430d can cause the user interface manager 206 to provide a numerical keypad such as that shown in FIGS. 4E and 4H.

In additional or alternative embodiments, the client application 202 can allow the sender to customize the appearance of the selectable elements 430a, 430b, 430c. Specifically, the icons can be configurable by shape, size, color, and/or other visual characteristics. For example, the sender can select from a pre-loaded selection of icons for the selectable elements 430a, 430b, 430c (e.g., each selectable element 430a, 430b, 430c can be represented by a miniature bill replica of the corresponding currency value). In another example, the sender can upload user-created icons for the selectable elements 430a, 430b, 430c.

When the sender selects one of the quick send selectable elements 430a, 430b, 430c, 430d by tapping or otherwise selecting the selected element, the user input detector 208 can detect the selection. Upon detecting a selection of a first quick send selectable element (e.g., element 430c as shown in FIG. 4C), the user input detector 208 can instruct the user interface manager 206 to enter a preliminary or initial payment amount 432 in the communication thread 414 of the messaging user interface 412. Upon a user selecting additional quick send selectable elements, the user interface manager 206 can increment the payment amount 432 in the communication thread 414. For example, FIG. 4D illustrates that upon the sender selecting the quick send selectable element 430c a second time and the quick send selectable element 430b, the user interface can add the amounts corresponding to each quick send selectable element (i.e., $10+$10+$5) to reach an updated payment amount 432 as shown in FIG. 4D.

In one or more embodiments, the system 100 can present the payment amount 432 within the communication thread 414 of both the sender and the recipient involved in the conversation. Specifically, the system 100 can update, in real time, the messaging interface 414 for both the sender and recipient involved in the conversation to indicate that the sender has initiated and is selecting a payment amount. For example, if the sender selects a selectable element 430c with a represented value of $10, the system 100 can update the communication thread 414 for both the sender and the recipient to include the current payment amount of as a message within a time-dependent flow of the conversation. As the sender selects additional selectable elements, the system 100 updates the payment amount 432 by incrementing the initial or previous payment amount by the corresponding values of the selected elements. Incrementing the payment amount can include aggregating the numerical values for two or more selected elements.

In some embodiments, the system 100 provides a timer for incrementing the payment amount 432. Specifically, the user input detector can monitor a period of time since a selection of a selectable element 430a, 430b, 430c and determine that the payment amount 432 is final and process the transaction if the sender has not selected a selectable element 430a, 430b, 430c within an inactivity threshold amount of time. For example, the inactivity threshold amount of time can be three seconds (or any amount of time, including a user-configurable time), such that if the sender has not selected any selectable elements 430a, 430b, 430c within three seconds, client application 202 can finalize the payment amount 432 and the payment message generator 216 can prepare and send a payment message based on the payment amount 432. Alternatively, the payment interface 415 can include a "send" icon or other selectable option or graphical user interface that the sender can select to indicate that the payment amount 432 is final.

In addition to the forgoing, the user interface manager 206 can provide various animations with respect to the payment amount 432 and an associated payment message. For example, rather than tapping a selectable element 430a, 430b, 430c to select the element, a user can perform a swipe touch gesture upward toward the communication thread 414. The user interface manager 206 can then animate the various "bills" floating into the payment amount 432. When viewed in a communication thread 414 of a recipient, the animation of the bills and the augmenting payment amount can appear to the recipient that the sender is "making it rain." In alternative embodiments, the user interface manager 206 can provide alternative or additional animations. Furthermore, in one or more embodiments a sender or a recipient can select one or more animation options.

One will appreciate in light of the disclosure herein that the payment interface 415 of FIGS. 4C and 4D is one implementation of a payment interface. FIG. 4E illustrates an alternative embodiment of a payment interface 415a. As shown, the payment interface 415a can include a numerical keypad 438 that can allow a user to select a payment amount 432 by entering the desired digits in sequence (i.e., 2 then 5 to arrive at $25). In one or more embodiments, a user can select the payment interface 415, 415a they desire to use.

In another alternative embodiment of a payment interface 415b, as shown in FIG. 4F, the payment interface 415b can provide an option to enter a payment amount using one of a plurality of "quick send" amounts. As shown, the payment interface 415b can include a plurality of selectable elements 430e, 430f, 430g, 430h that correspond to different "quick send" amounts. Specifically, each of the selectable elements 430e, 430f, 430g, 430h has a corresponding currency value that the system 100 treats as a discrete payment amount, which, when selected by a user, is a final payment amount entered by the system 100. To illustrate, when a user selects the selectable element 430f, the system 100 can enter the corresponding "quick send" amount ($10) into the payment interface 415b and removes the selectable elements 430e, 430f, 430g, 430h from the payment interface 415b. Thus, according to one embodiment, "quick send" amounts may not be aggregated with other payment amounts before completing a payment transaction.

In one or more embodiments, the system 100 can intelligently populate the "quick send" amounts associated with the selectable elements 430e, 430f, 430g, 430h with amounts likely to be chosen by the sender. For example, the system 100 can select the "quick send" amounts based on a transaction history of a sender. To illustrate, the system 100 can populate the selectable elements 430e, 430f, 430g, 430h with the payment amounts previously used by the sender in general or specifically used in previous payments sent by the sender to the recipient. In an additional or alternative implementation, the system 100 can populate at least some of the selectable elements 430e, 430f, 430g, 430h with common currency values based on a location of the user, as previously described.

In another implementation, the system 100 can detect amounts to include in the "quick send" amounts by analyzing one or more messages exchanged between the sender and the recipient. Specifically, the system 100 can analyze messages in the communication thread 414 and infer "quick send" amounts based on the content of one or more of the messages. For example, the system 100 can determine that one or more of the messages in the communication thread 414 indicate that a user owes another user a certain amount.

To illustrate, as shown by FIG. 4F, the recipient send a message stating: "It was about $50 including the tip." In response to detecting the amount of "$50," the system 100 can populate one of the selectable elements 430h with a $50 "quick send" amount as shown by FIG. 4F. The system 100 can additionally or alternatively populate one or more of the other selectable elements 430g with related amounts. For example, the system 100 can detect a number of users in the conversation (in this case 2) and dividing the inferred amount (i.e., $50) by the number of participants in the communication thread 414, or by a number of participants of the event inferred from the one or more electronic messages, and include the amount (i.e., $25) as quick send amount 430g.

Figure 4H:
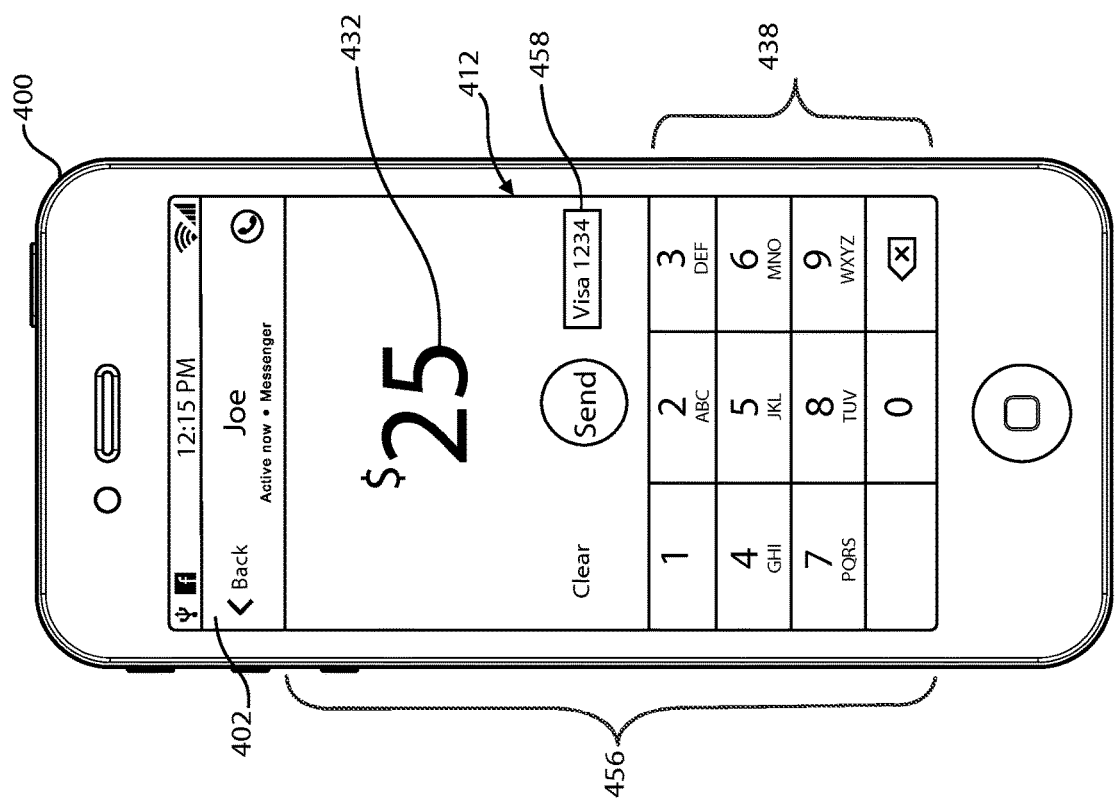
FIGS. 4A-4O illustrate user interfaces for completing a payment transaction as described in reference to FIGS. 3A-3C.
Figure 4G:
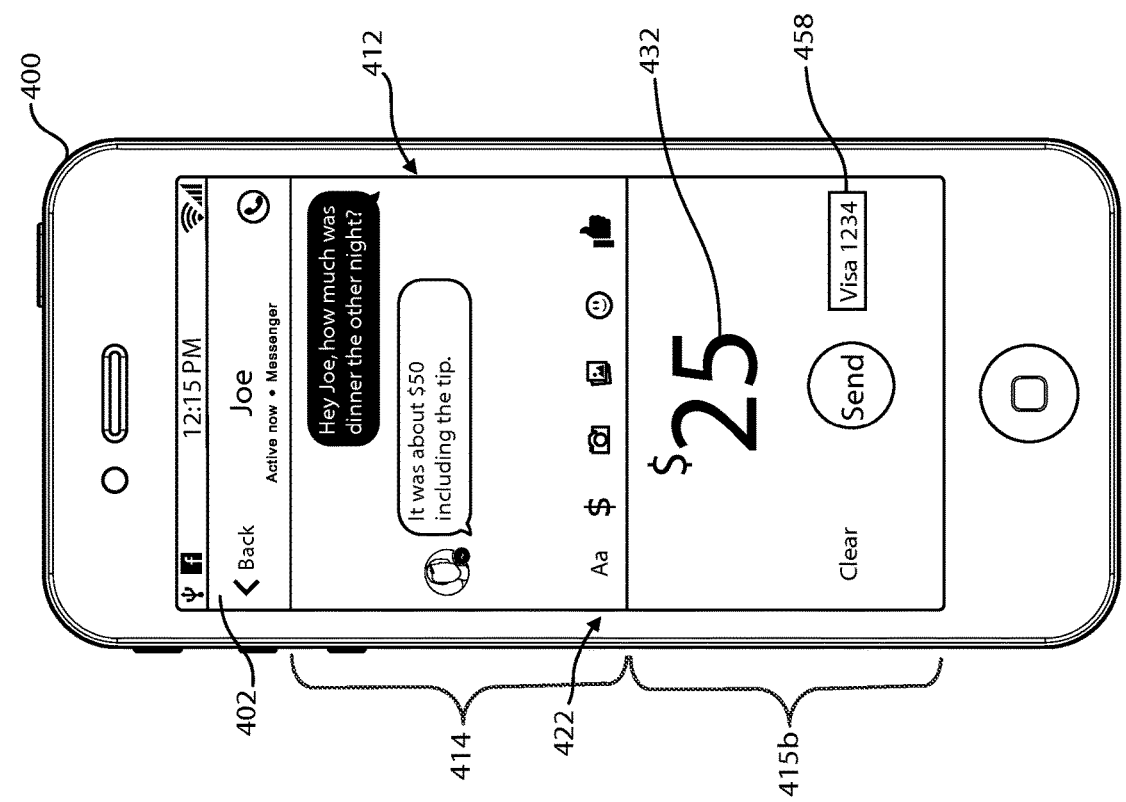
Figure 40:
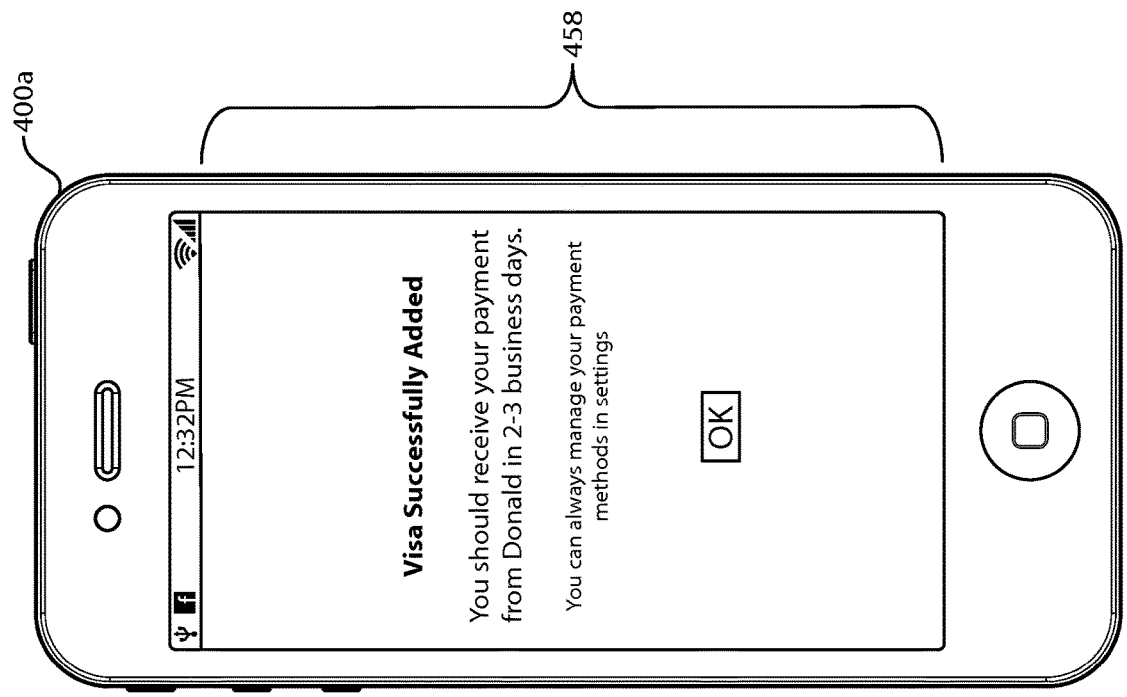

Upon a selection of a quick send amount 430g, the user interface manager 206 can display a payment amount 432 based on the "quick send" amount within the payment interface 415b as shown by FIG. 4G. This can allow the user to review the amount and confirm they wish to send the amount by selecting a "Send" option. As shown by FIG. 4G, the payment interface 415b can occupy a lower portion of the touch screen 402 thereby allowing the user to see the communication thread 414 while entering or confirming a payment amount 432.

In one or more alternative embodiments, upon selection of a quick send amount, the user interface manager 206 can provide a payment interface that does not include the communication thread. For example, as shown FIG. 4H, the payment interface 456 includes the features of the payment interface 415b of FIG. 4G as well as a keypad 438. The keypad 438 can allow the sender to modify or change the payment amount 432 entered upon selection of the quick send selectable element 430g.

In addition to presenting the payment interface 456 of FIG. 4G upon a user selecting a quick send selectable element 430e-430h, the user interface manager 206 can also provide the payment interface 456 of FIG. 4G in response to a user selection of an option to manually enter a payment amount. For example, referring again to FIG. 4F, the payment interface 415b can include a payment entry selectable element 454 that allows a user to manually enter a payment amount 432. If a user desires to enter an amount not included in the quick send selectable elements 430e-430h, the user can select the payment entry selectable element 454 to navigate to the payment interface 456 of FIG. 4G.

In addition to the foregoing, in one or more embodiments the user interfaces that make up the payment process flow may not include quick send selectable elements 430a-430g. In such embodiments, upon a user selecting the payment control 424b of FIG. 4B, the user interface manager 206 can provide the payment interface 456 of FIG. 4G. The user can then manually enter the payment amount 432 using the keypad 438. Once the user has entered the desired payment amount 432, the user can select a pay selectable element 437 or a send selectable element 437.

Referring again to FIG. 4H, according to one or more embodiments, the payment interface 456 or the other payment interfaces 415, 415a, 415b can include a payment credential element 458. The payment credential element 458 can indicate a payment credential of the user from which the payment will be made. For example, the payment credential element 458 can include the last four digits of a credit or debit card number along with a brand of the card, as shown in FIGS. 4G and 4H.

If a user desires to use another payment credential or add a payment credential, the user can select the payment credential element 458. In response to a selection of the payment credential element 458, the user interface manager 206 can provide a selection interface that allow the user to select other payment credentials on file. Alternatively, if the user does not have a payment credential on file, the payment credential element 458 can allow a user to enter a new payment credential. Specifically, upon selection of the payment credential element 458, the user interface manager can provide the credential user interface 434 as described in relation to FIG. 4I.

In additional or alternative embodiments, in response to the sender selecting a pay selectable element 437 (see FIG. 4E) or a send element, the client application 202 can send a request to the network application 204 to determine if the sender has a registered payment credential. In the event the sender is not associated with a registered payment credential, the user interface manager 206 can present a credential user interface 434 that allows the sender to register a payment credential (e.g., provide payment information as described in detail above), as shown in FIG. 4I. Alternatively, or additionally, a graphical interface can present a one-time payment option that allows a user to input payment information to facilitate a one-time payment (e.g., enter a debit card or credit card number), without requiring the sender to create an account or save the payment credential. In another alternative implementation, the user interface manager 206 can present the credential user interface 434 in response to a selection by the sender to enter a new payment credential via the credential element 458, as shown in FIGS. 4G and 4H.

One will appreciate that the credential user interface 434 can vary depending upon which type of payment credential the sender selects to enter. In or more embodiments, the user interface manager 206 can provide a list of acceptable payment credentials (e.g., credit card, debit card, gift card, bank account). Upon a user selecting a type of payment credential, the user interface manager 206 can provide an applicable credential user interface 434. For example, FIG. 4I illustrates a credential user interface 434 for entering a credit or debit card. As shown, a user can input, via a numerical keypad 438, a credit card number, an expiration date, a security code, and a billing ZIP code associated with the credit card. Upon selecting entering the payment information, the messaging handler 212 can send the payment credential information to the network application 206 for storage a payment credential as described above in relation to FIGS. 3A-3D.

After the sender has entered the payment credentials details (whether by way of an automatic reminder, a manual reminder from the recipient, or by the sender's own choice), the system 100 can continue processing the payment transaction. In one or more embodiments, the client application 202 can provide to the sender an option to use a PIN or other shortcut for processing future payment transactions. For example, the client application 202 can present to the sender a pop-up window 440 or other notification in the messaging interface 412 asking the sender whether the sender wants to create a PIN for sending money for added security, as shown in FIG. 4J.

If the sender selects to enter a PIN for processing future payment transactions, the client application 202 can present a PIN creation interface 442 for creating a PIN, as shown in FIG. 4K. Specifically, the PIN creation interface can allow the sender to create a unique PIN associated with the sender's stored credentials. For example, the PIN can be a 4-digit number (or string of any length) that the sender is can input via the numerical keypad 438 before being able to process a future payment transactions. In some instances, the system 100 can also request that the sender confirm the PIN by re-entering the PIN in order to create the PIN and associate the PIN with the stored credentials.

For future payment transactions, the system 100 can present a PIN input interface by which the sender can input the PIN. Inputting the PIN can allow the system 100 to process the payment transaction using the credentials stored for the user in association with the PIN. Thus, entering the PIN will allow the sender to initiate and complete payment transactions without remembering the credentials every time the sender wishes to send money to another user via the system 100.

When the sender has finished incrementing the payment amount 432 and the payment message has been sent, the user interface manager 206 can update the payment amount 432 (and any other text of the payment message) in the communication thread 414 on the sender client device 400 and/or the communication thread 414 of the recipient to reflect that the payment amount 432 is final and has been sent. For example, the user interface manager 206 can change certain characteristics of the payment message (which in this case comprises only the payment amount 432) in the communication thread 414 to reflect that the payment message has been sent as a message and a payment transaction has been initiated. For example, in one or more embodiments, the user interface manager 206 may change the position of the payment message, the border width of the payment message, the background color of the payment message, the size and font of the payment message, or any other characteristic of the payment message suitable for this purpose. For example, in FIG. 4L after the payment message has been sent, the user interface manager 206 changes the background of the payment message from white as shown in FIG. 4D to black as shown in FIG. 4L and changes the text color of the payment message from black in FIG. 4D to white in FIG. 4L.

In one example, the user interface manager 206 can animate the payment amount when the payment amount is finalized, for example, by causing the payment amount to "bounce" within the messaging interface 412. When animating the payment amount, the user interface manager 206 can animate characters and/or images in the payment amount individually or collectively.

Additionally or alternatively, the user interface manager 206 can modify the appearance (e.g., animate the payment amount) until the one or more operations associated with the payment transaction are completed. For example, the user interface manager 206 can animate the payment amount until the recipient accepts the payment amount, the sender and/or the recipient enters credentials, or the system 100 completes the payment transaction and transfers the funds from the sender to the recipient. In additional or alternative embodiments, the user interface manager 206 can apply the modifications to the appearance of the payment amount for an amount of time once the payment amount is final. Additionally or alternatively, the user interface manager 206 can apply modifications to the appearance of the payment amount based on other criteria, such as when the payment transaction is complete.

FIGS. 4M-4O illustrate a graphical user interface for the recipient client device 400a. FIG. 4M illustrates the messaging interface 412a at the recipient client device 400a after the sender has initiated the payment transaction to send a payment amount to the recipient. In one or more embodiments, the system 100 can notify the recipient that the sender has initiated the payment transaction. For example, the user interface manager 206 can show the payment amount in the communication thread 414a of the messaging interface 412a and the sender's identity (e.g., "Donald has sent you money") in a payment message 432a. To illustrate, the user interface manager 206 can insert the payment amount into a conversation thread 414a with other messages exchanged between the sender and the recipient. Additionally or alternatively, the user interface manager 206 can present the payment amount in another manner (e.g., by providing a notification in a notification area of the recipients client device 400a).

Additionally, or alternatively, the user interface manager 206 can show a dropdown overlay 450 or other notification over or in the messaging interface 412a indicating that the sender has sent a payment to the recipient. In one example, the dropdown overlay 450 can provide a confirmation request to the recipient to allow the recipient to accept the payment transaction (i.e., by selecting the dropdown overlay 450 or an element in the dropdown overlay 450 such as accept element 452). After the recipient accepts the payment transaction, the system 100 can complete the payment transaction and begin the process of transferring funds from the sender to the recipient. In an alternative example, the dropdown overlay 450 can merely bring attention of the payment transaction to the recipient while the system 100 automatically processes and completes the payment transaction.

In one or more embodiments, when the recipient selects to accept the payment, the system 100, the client application 202 can send a request to the network application 204 to determine if the recipient has a registered payment credential. In the event the recipient is not associated with a registered payment account, a user interface manager 206 can present a credential user interface 434 that allows the recipient to register a payment credential (e.g., provide payment information as described in detail above), as shown in FIG. 4N. Alternatively, or additionally, a graphical interface can present a one-time payment option that allows a recipient to input payment information to facilitate a one-time payment (e.g., enter a debit card or credit card number), without requiring the sender to create an account.

One will appreciate that the credential user interface 434 can vary depending upon which type of payment credential the recipient selects to enter. In or more embodiments, the user interface manager 206 can provide a list of acceptable payment credentials (e.g., credit card, debit card, gift card, bank account). Upon a recipient selecting a type of payment credential, the user interface manager 206 can provide an applicable credential user interface 434. For example, FIG. 4N illustrates a credential user interface 434 for entering a credit or debit card. As shown, a user can input, via a numerical keypad 438, a credit card number, an expiration date, a security code, and a billing ZIP code associated with the credit card.

After the recipient enters a payment credential, the system 100 can complete the payment transaction. Specifically, the system 100 can complete the payment transaction by transferring funds from the sender to the recipient. In some instances, transferring funds from the sender to the recipient can include transferring funds into a temporary account associated with the recipient until the transaction is approved by the corresponding financial institutions, as described previously in relation to FIGS. 3A-3D. In alternative instances, completing the payment transaction can include directly transferring the funds into the destination account entered by the recipient. As shown in FIG. 4O, after completing (or after the recipient selects to complete the payment transaction), the system 100 can display a payment completion message 458 notifying the recipient that the payment transaction is complete, and that the recipient should receive the payment within a certain timeframe.

In some embodiments, the sender and/or the recipient can set or change settings for payment transactions. Specifically, the sender and/or recipient can manage settings for payment methods (e.g., debit card, direct withdrawal/deposit, credit card). For example, when a user changes the setting for a payment method, the messaging application will process future payment transactions according to the setting set by the user. In some instances, the user can set separate settings for sent payments and received payments, such that the system 100 can process a payment sent from the user using a different payment method or account than payments received by the user.

Figures 5A, 5B:
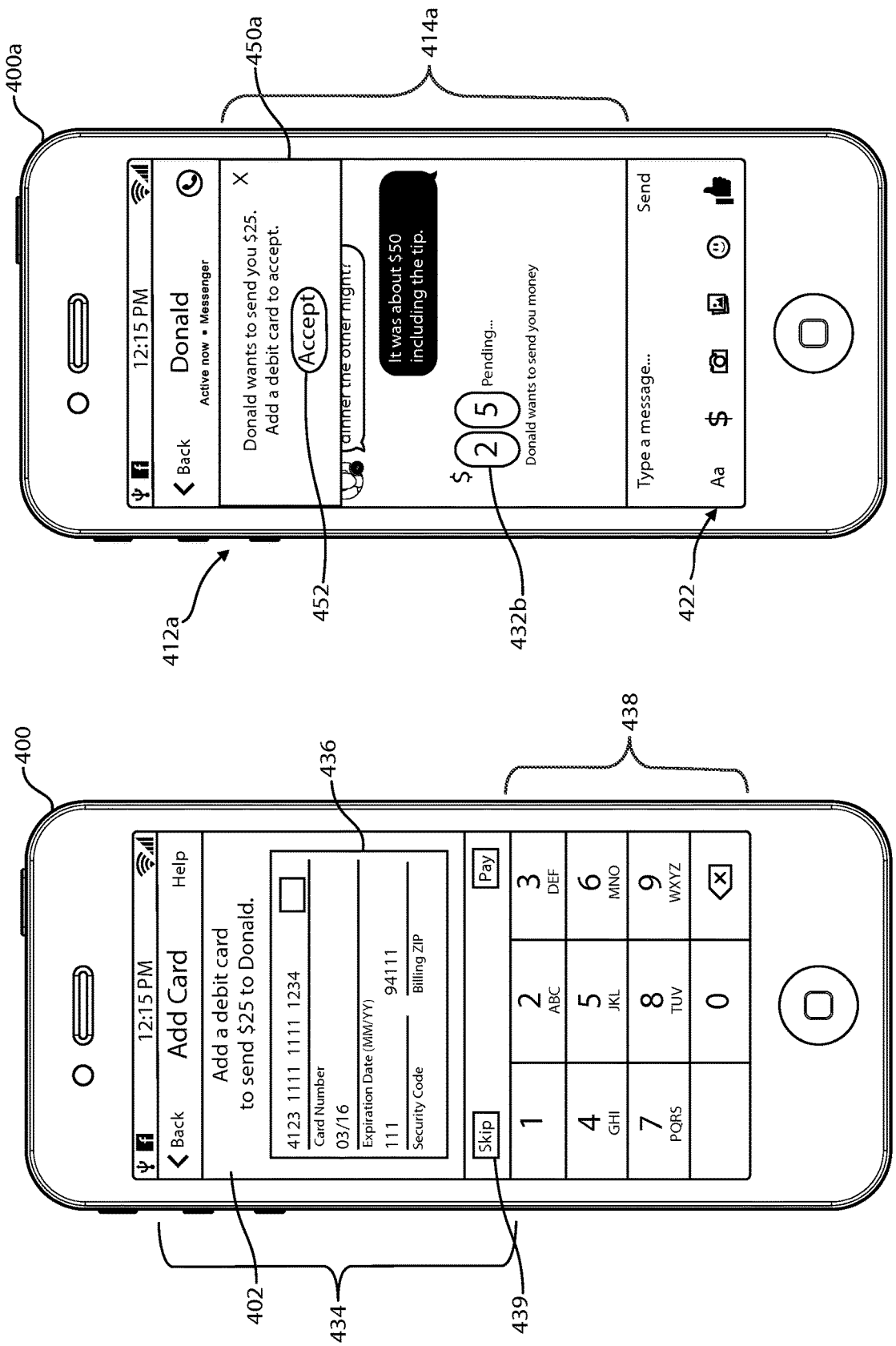

As discussed above, one or more embodiments allow a sender to initiate a payment transaction without providing a payment credential. Thus, the integrated message and payment system can allow a user to ensure that a recipient will receive funds before providing sensitive financial information. For example, FIGS. 5A-5D illustrate an alternative to the flow shown in FIGS. 4A-4O in which the sender opts to delay providing a payment credential. In particular, as mentioned above, in the event the sender is not associated with a registered payment account, a user interface manager 206 can present a credential user interface 434 that allows the sender to register a payment credential (e.g., provide payment information as described in detail above), as shown in FIG. 5A (similar to that shown in FIG. 4F). At this point, the sender may not have time or may not have the information necessary to enter the complete payment credential. Alternatively, the sender may desire to ensure that the recipient will accept the payment before providing a payment credential. In any event, the sender can select the "Skip" element 439 rather than entering payment credential information.

Upon selecting the "Skip" element 439, the system 100 can store information associated with the request to initiate the payment transaction and can generate a transaction ID. Specifically, storing the information can allow the system 100 to refer back to the stored information when the sender eventually inputs the credentials. For example, the system 100 can store identification information for the sender and the recipient, a payment amount, and other information that will allow the system 100 to quickly resume processing the same payment transaction initiated upon request by the sender, and without requiring the sender to re-enter information. In some instances, the system 100 can store the information at a server device(s) 108. In other instances, the sender client device 104*a* can store at least some of the information for later use by the system 100 in completing the payment transaction.

At this point, the system 100 can send a notification to the recipient of the payment transaction. FIG. 5B illustrates the messaging interface 412*a* at the recipient client device 400*a* after the sender has initiated the payment transaction to send a payment amount to the recipient. In one or more embodiments, the system 100 can notify the recipient that the sender has initiated the payment transaction. For example, the user interface manager 206 can show a payment message 432*a* indicating the payment amount and indicating that the sender wants to send the recipient money (e.g., "Donald wants to send you money"). To distinguish from a payment amount in which the system 100 has a valid credential from the sender, the user interface manager 206 can include "Pending . . . " or another signal to let the recipient know that the payment transaction is still pending. To illustrate, the user interface manager 206 can insert the payment amount into a conversation thread 414*a* with other messages exchanged between the sender and the recipient. Additionally or alternatively, the user interface manager 206 can present the payment amount in another manner (e.g., by providing a notification in a notification area of the recipients client device 400*a*).

Additionally, or alternatively, the user interface manager 206 can show a dropdown overlay 450*a* or other notification over, or in, the messaging interface 412*a* indicating that the sender has initiated a payment transaction. In one example, the dropdown overlay 450*a* can provide a confirmation request to the recipient to allow the recipient to accept the payment transaction (i.e., by selecting the dropdown overlay 450*a* or an element in the dropdown overlay 450*a* such as accept element 452). In one or more embodiments, when the recipient selects to accept the payment, the system 100, the client application 202 can send a request to the network application 204 to determine if the recipient has a registered payment credential. In the event the recipient is not associated with a registered payment account, a user interface manager 206 can present a credential user interface 434 that allows the recipient to register a payment credential (e.g., provide payment information as described in detail above).

If the recipient has a payment credential, the system can send a notification to the sender of the payment transaction informing the sender that the recipient has accepted the payment. FIG. 5C illustrates the messaging interface 412 at the sender client device 400 after the recipient accepted the payment. For example, the user interface manager 206 can show a payment message 432 indicating the payment amount and an indication that the transaction is still pending (i.e., "Pending . . . " or another signal). Additionally or alternatively, the user interface manager 206 can present the payment amount in another manner (e.g., by providing a notification in a notification area of the recipients client device 400*a*).

Furthermore, the user interface manager 206 can show a dropdown overlay 500 or other notification over, or in, the messaging interface 412 indicating that the recipient has accepted the payment, pending the sender providing a payment credential. In one example, the dropdown overlay 500 can provide a selectable option or element 502 that the sender can select to open the credential user interface 434 that allows the sender to register a payment credential (e.g., provide payment information as described in detail above), as shown in FIG. 4I. From this point, the payment transaction can continue as outlined above.

Alternatively, if the sender is away from their device 104*a* or otherwise engaged, the sender may not be able to provide a payment credential at this point. In such cases, the network application 202 can send a notification to the recipient indicating that the sender has yet to provide a payment credential. In response to such a notification, the user interface manager 206 can provide a reminder option 504 in a message to the recipient as shown in FIG. 5D. Specifically, the reminder option 504 can allow the recipient to apply social pressure by reminding the sender of the payment transaction. For example, selecting the reminder option 504 can cause the system 100 to send a message to the sender to complete the payment transaction by entering the credentials for the payment transaction. In some instances, the message to the sender can cause a message or notification to appear at the sender client device 104*a* and/or within the messaging interface 412 at the sender client device 104*a*. Additionally or alternatively, the system 100 can present the credential user interface 434 to the sender in response to the reminder message from the recipient. In further embodiments, the system can generate and post social network posts to the accounts of the sender and/or the recipient noting the pending payment. Such social network posts can create social pressure for the sender to provide a credential to complete the transaction.

In some implementations, the system 100 can provide safeguards to prevent the recipient from abusing the reminder message. Specifically, if the recipient repeatedly selects the reminder message 504, rapid and/or repeated reminders at the sender client device 104a may annoy the sender. Thus, the system 100 can provide a timer that allows the recipient to send an additional reminder only after a predetermined amount of time.

In other embodiments, the system 100 can automatically send reminders to the sender in response to various events. For example, the system 100 can automatically send a reminder to the sender to enter the credentials in response to detecting that the recipient has entered credentials for receiving the payment. In such an example, the system 100 can send a notification to the recipient indicating that the sender has not entered the credentials, and that the recipient cannot withdraw the funds. In another example, the messaging system 100 can send a reminder at an appropriate time after a certain amount of time has passed since the previous reminder or since some other event (e.g., a predetermined time relative to a request to initiate the payment). In an additional example, the messaging system 100 can send a reminder at an appropriate time based on an analysis of one or more electronic messages associated with the recipient (or other user).

In the instances in which the network application 204 comprises a social networking system, the network application 204 can provide social network posts in the feed of the sender, the recipient, or "friends" of the sender or the recipient. Such social network posts can indicate that a payment from the sender to the recipient has been initiated but is pending until the sender provides a payment credential. Thus, the system 100 can apply social pressure or other prompts to encourage the sender to enter a payment credential and complete the payment transaction.

In addition to providing social network posts to encourage the sender to enter a payment credential, the system 100 can provide social network posts to encourage a recipient to accept a payment and enter a payment credential. Still further, the system 100 can provide social network posts announcing a payment from a sender to a recipient. Additionally, the system 100 can provide social network posts indicating that a user has provided a payment credential to notify "friends" that they can now send or receive payments from the user. One will appreciate in light of the disclosure herein that such social network posts can be subject to privacy settings of the sender or the recipient.

Figure 6B:
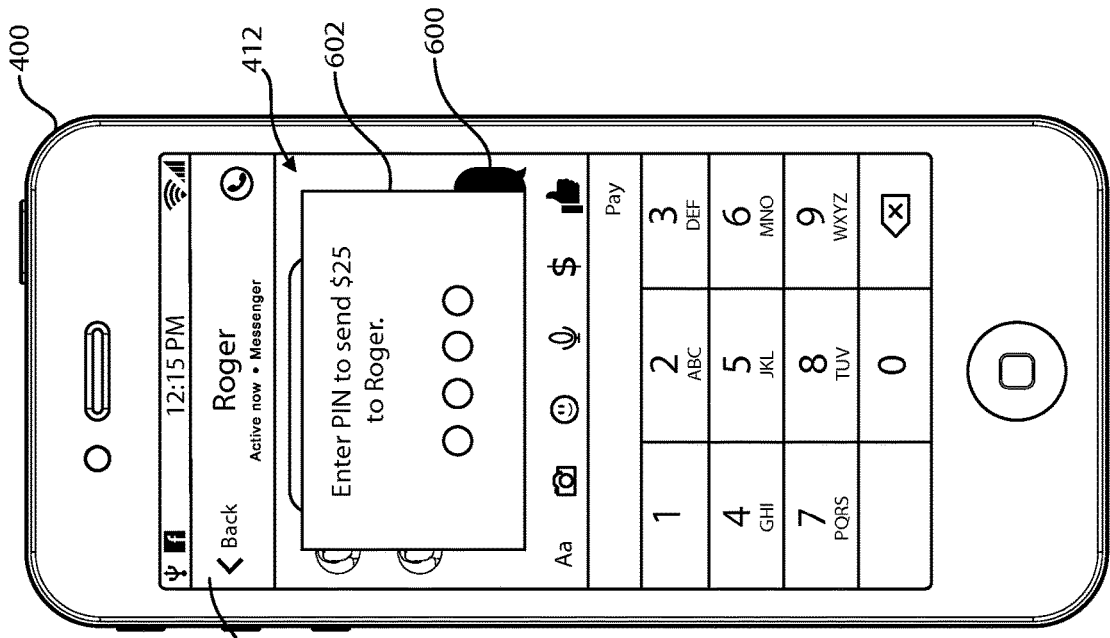
Figure 6A:
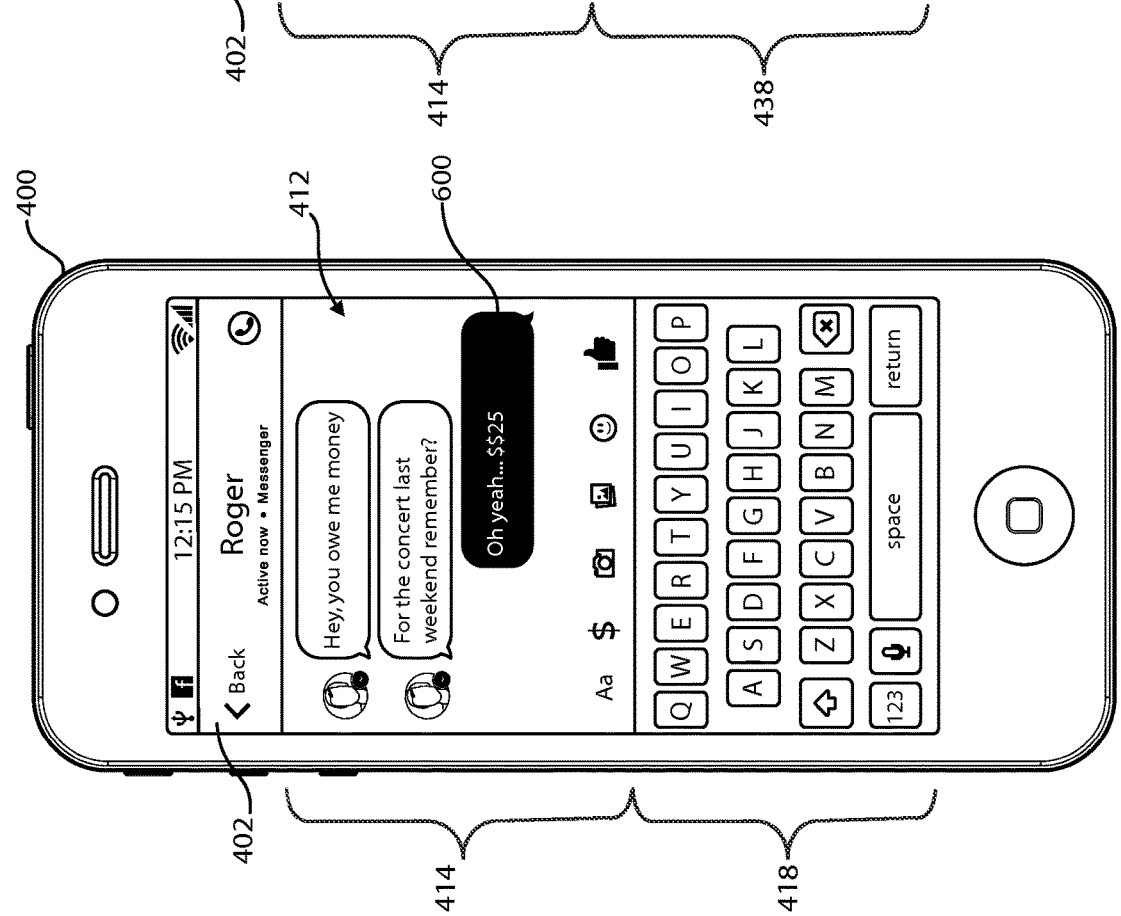

In addition to providing a payment interface to allow a sender to initiate a payment transaction, the system 100 can allow a user to send or initiate a payment directly from the messaging user interface 412 without having to open separate or dedicated user interfaces. As will be apparent from the description below, this can allow users to send or receive payments without interrupting a conversation flow. For example, the client application 202 can infer payments based on predetermined character strings, as shown in FIG. 6A. Specifically, the message analyzer 212 can recognize special syntax allowing users to perform payment events associated with payment transactions. For example, the sender can send messages containing a predetermined character string (such as a symbol) to the recipient, and the message analyzer 212 can recognized such syntax as a request to initiate a payment transaction. In some instances the system 100 can perform one or more operations for a payment transaction based on a predetermined character string, including requesting a payment from one or more other users, sending a payment to one or more users, setting a payment amount for the payment transaction, or confirming the payment transaction.

To illustrate, the sender and recipient can communicate with each other via messages about a possible payment transaction. For example, FIG. 6A illustrates a communication thread 414 with message regarding a payment due for concert tickets. For example, as shown in FIG. 5A, the recipient can send a reminder that the sender owes the recipient money. The sender can send a message 600 to the recipient that includes a predetermined character string indicating a payment event. When the sender replies to the recipient, the sender can send a message including the predetermined character string "$$" that indicates that the sender intends to pay the recipient. In one example, the message analyzer 212 can infer that the payment amount is equal to a numerical value following the "$$" character string (e.g., "$$25" means that the sender wants to pay the recipient $25), and can initiate/process the payment transaction based on the "$$" character string without any other input from the sender.

One will appreciate that the system 100 can select the special syntax to be character strings that are typically not used (like two dollar symbols). In one or more embodiments, the system 100 can allow users to customize the recognized syntax for different payment events. Specifically, users can modify existing syntax, remove existing syntax or add new syntax. Additionally or alternatively, users can modify existing payment events with associated with special syntax, remove existing payment events associated with special syntax or add new payment events associated with special syntax. Thus, users can customize the payment flow to recognize customized character strings for association with customized payment events.

In still further embodiments, the payment control 424b of the message input control palette or toolbar 422 can act as the special syntax. In other words, if the user selects the payment control 424b the user input detector 208 can recognize that the user desires to send a payment. The payment message generator 216 identify a payment amount as any amount entered following the selection of the payment control 424b.

After the message analyzer infers the payment event based on the predetermined character string, the system 100 can continue with the payment transaction process. For example, if the sender does not have a payment credential on file, the system 100 can provide the payment credential interface 434 to solicit a payment credential from the sender. Alternatively, if the sender already has a payment credential on file and has provided a PIN, the user interface manager 206 can present a PIN confirmation user interface. For example, FIG. 6B illustrates a PIN dropdown overlay 602 or other notification over, or in, the messaging interface 412 allowing the sender to provide their PIN and confirm that they wish to send a payment.

One will appreciate that the PIN confirmation user interface 602 can allow the user to confirm that they wish to send a payment based on special syntax. Thus, the PIN confirmation process and prevent the user from forgetting about the special syntax and accidentally sending a payment. As explained below in reference to FIG. 7C, if a user chooses not to use a PIN, the system 100 can provide a separate payment confirmation user interface to prevent the user from accidently sending a payment.

When the sender finishes composing a message 600 including the special syntax and a payment amount and confirms the payment via entry of a PIN or otherwise, the payment message generate can generate a payment message, which is in turn sent to the network application 204. In response to the payment message, the network application can process the payment and the message 600. For example, the network application 204 can send the message 600 to the recipient client device 104b to allow for a corresponding message 600a to be provided in the messaging interface 412b of the recipient as shown in FIG. 6C. Furthermore, the network application 204 can transfer funds to the recipient.

In addition to the foregoing, as shown by FIGS. 6A and 6C, the user interface manager 206 can change one or more characteristic or attributes of the messages 600, 600a to indicate that they contain a payment. For example, FIGS. 6A and 6C both show the payment amount of the messages 600, 600a highlighted. Furthermore, one or more embodiments the user interface manager 206 can configure the visually-distinguished payment amount as a selectable element. Upon the sender selecting the visually-distinguished payment amount from the communication thread 141, the payment message generator 216 can allow the sender to cancel the payment, change the payment amount, or otherwise change one or more parameters of the payment.

When the sender finishes composing a message 600 including the special syntax and a payment amount and confirms the payment via entry of a PIN or otherwise, the payment message generate can generate a payment message, which is in turn sent to the network application 204. In response to the payment message, the network application can process the payment and the message 600. For example, the network application 204 can send the message 600 to the recipient client device 104b to allow for a corresponding message 600a to be provided in the messaging interface 412b of the recipient as shown in FIG. 6C. Furthermore, the network application 204 can transfer funds to the recipient.

In addition to allowing a user to proactively initiate a payment transaction, one more embodiments intelligently initiate payment transactions or prompts users to initiate payment transactions. For example, one or more embodiments involve inferring payment events based on electronic messages exchanged between users. Specifically, one or more embodiments analyze electronic messages exchanged between two or more users to determine whether a payment event involving the two or more users has likely occurred. After inferring a payment event, one or more embodiments provide an option to initiate a payment transaction between the users based on the inferred payment event. Thus, one or more embodiments can allow users to initiate payment transactions with other users based on messages exchanged between the users without interrupting the natural flow of the message exchange.

For example, FIG. 7A illustrates a communication thread 414 showing a plurality of messages exchanged between "Rodger" (hereinafter sender) and "Joe" (hereinafter recipient). FIG. 7A illustrates that the recipient sent a message to the sender saying, "Hey I'm short on cash and need some money." In response to which, the sender sent a message saying: "How much money do you need?" The recipient in reply sent a message 416c stating: "I need about 75 bucks to pay bills."

The message analyzer 212 can analyze the outgoing and incoming messages between the sender and the recipient. When analyzing the messages, the messaging system 210 can parse the messages into sentences, words, phrases, characters, and/or any type of grouping that allows the message analyzer 212 to interpret the content of the messages. Specifically, the message analyzer 212 interprets the content to be able to infer payment events from the messages. For example, the message analyzer 212 can interpret the conversation to determine that the recipient is requesting money from the sender based on the messages generated by one or both the sender and the recipient.

While analyzing the messages between the sender and the recipient, the message analyzer 212 can interpret natural language in the messages corresponding to a payment event. Specifically, the messages can include an intention by either the sender or the recipient to initiate a payment transaction using natural language. The message analyzer 212 can interpret the natural language using natural language processing to determine the payment event rather than by performing a rigid, predetermined sequence of operations for initiating and processing the payment transaction. To illustrate, the message analyzer 212 can determine from the messages between the sender and recipient that the recipient is requesting $75 from the sender as a payment event.

In response to the inferred payment event, the user interface manager 206 can provide an option to initiate the payment transaction. In particular, the user interface manager 206 can provide an option to the sender to initiate the payment transaction by modifying one or more of the messages in the graphical user interface at the sender client device 104a. For example, the user interface manager 206 can convert the "75 bucks" in the recipient's message 416c into a payment initiation selectable element 700. In another example, the user interface manager 206 can convert the entire message 416c into a payment initiation selectable element. In an additional example, the user interface manager 206 can provide a notification (e.g., a pop-up window or other onscreen element) to ask the sender if the sender would like to initiate a payment transaction with the recipient.

In any event, the user interface manager 206 can also modify/change one or more attributes or characteristics of the message 416c or a portion thereof to indicate the creation of the payment initiation selectable element 700. For example, the user interface manager 206 can highlight the "75 bucks" as shown in FIG. 7A. Alternatively, the user interface manager 206 can underline, change the font style, size, color etc., or otherwise visually distinguish the payment initiation selectable element 700.

As the message analyzer 212 is capable of interpreting natural language, the message analyzer 212 can infer a payment event based on variations of text or content in the messages. For example, if the recipient said, "75 dollars," "$75," "seventy-five dollars," or the like, instead of "75 bucks," the message analyzer 212 is able to interpret the content and infer the amount of the intended payment transaction. Additionally, the message analyzer 212 can infer from the messages that the sender is the one who will be paying the money and the recipient is requesting the money. Thus, the message analyzer 212 can infer and pre-populate details for quickly processing a payment transaction if the sender or the recipient initiates the transaction within the messaging application.

To aid the message analyzer 212 in identifying potential payment events, the system 100 can include a list of predetermined terms or phrases that indicate that a payment event is likely. For example, phrases that can indicate that a payment event is possible include an amount either with or without a currency symbol (e.g., $, €) that is alone or accompanied by phrases such as: "you owe me," "I owe you," "your portion is," "your half is," "pay me," "I will pay you," etc. As such, the message analyzer 212 can use content in multiple messages of a conversation to infer a payment event is likely. For instance, a message that consists of "$45" may not provide enough to indicate that a payment event is likely. On the other hand, a message that consist of "$45" proceeded by a message consisting of "how much do I owe you" can indicate a possibility for a payment event.

In addition to the foregoing, the message analyzer 212 can compute the probability of a payment event using a machine learning model and historical data of other users of the social-networking system who have initiated payment events. In one or more embodiments, the message analyzer 212 trains a machine-learning model using historical data collected for the users, whether each user participated in a payment event, and the type of event. The machine-learning model can use several data points within the collected data as variables to generate a predictive algorithm. For example, the machine-learning model can analyze messages sent or received or other actions that a first user or users performed before initiating a payment. The message analyzer 212 can then provide a second user the option to participate in a payment event upon recognizing that the second user has performed the same or similar actions.

In one or more embodiments, the system 100 can generate the training set for training the machine-learning model based on content obtained via one or more users' social-networking profiles or other profiles associated with the system 100. For example, the system 100 can identify users of the social networking system that have performed a payment transaction. The system 100 can then collect information about such users, such as location, messages exchanged, check-ins, social network posts, etc. prior to conducting the payment transaction. Thus, the system can collect communications data, social-network data, and other information that identifies or is associated with the users. To illustrate, the system 100 can retrieve data for a particular time period before a payment transaction from a user profile (e.g., a week or a month prior to the event). In another illustrative example, the time period can vary based on the event.

In one or more embodiments, the system 100 can weight data based on the corresponding dates. For example, the system 100 can determine that a change in relationship status on April first is not a reliable indicator of a detected payment transaction. The system 100 can remove unreliable data from the training set.

The system 100 can compute a probability of a user participating in a payment event based on the user's communications and actions and also based on the training set. The system 100 can train the machine-learning model based on several factors, including words in electronic messages associated with the user, the length of the messages, the frequency of communications for the user, the types of actions taken, etc. In such an embodiment, the system 100 can assign a high probability of a payment event to the user whose communications data indicates a high incidence of the identified words. The machine-learning model can generate a prediction algorithm for computing the probability of a user participating in a payment event or of a payment event occurring.

If the user's probability score is above a provided threshold score, the system 100 can predict that the a payment event has occurred, is occurring, or is likely to occur. Based on this determination, the system 100 can provide the user an option to initiate a payment transaction as discussed above. In particular, the system 100 can convert a portion of a message into a payment initiation selectable element 700. In another example, the user interface manager 206 can convert the entire message 416c into a payment initiation selectable element. In an additional example, the user interface manager 206 can provide a notification (e.g., a pop-up window or other onscreen element) to ask the sender if the sender would like to initiate a payment transaction with the recipient.

After the user input detector 208 detects a user selection of the payment initiation selectable element 700, the system 100 can continue with the payment transaction process as described above. For example, if the sender does not have a payment credential on file, the system 100 can provide the payment credential interface 434 to solicit a payment credential from the sender. Alternatively, if the sender already has a payment credential on file and has provided a PIN, the user interface manager 206 can present a PIN confirmation user interface 602 as shown in FIG. 7B. One will appreciate that the PIN confirmation user interface 602 can allow the user to confirm that they wish to send a payment based on the inferred payment event.

If the user has not provided a PIN, the system 100 can provide a payment confirmation interface 708 as shown in FIG. 7C. In particular, the payment confirmation interface 708 allows the sender to enter or verify a payment amount associated with the payment transaction, as well as to enter or verify other details associated with the payment transaction. For example, the payment confirmation interface 708 can include a payment type element 710, a payment amount field 712, a payment source element 716, a send confirmation option 714, and a numerical keypad 438. In some examples, the payment confirmation interface 708 can include more or fewer graphical components and/or features than shown in FIG. 7C.

In one or more embodiments, the system 100 can prepare the payment confirmation interface 708 based on information inferred from the messages between the sender and the recipient. Specifically, the system 100 can pre-populate the payment confirmation interface 708 with as much information as possible from the analyzed messages to help speed up the payment transaction process. For example, the system 100 can automatically select a "Send Money" payment type, rather than a "Request Money" payment type, based on the inferred information from the messages. Additionally, the system 100 can pre-populate the payment amount field 712 with an inferred payment amount from the messages. In some embodiments, the sender can change any of the information that is prepopulated in the payment confirmation interface 708 (e.g., the payment amount, the payment type), for example, by using the numerical keypad 438.

In some embodiments, the payment information can include the payment source element 716. In particular, the payment source element 716 allows the sender to input a payment source for completing the payment transaction. For example, the sender can select the payment source element 716 to navigate to a payment credential interface 434, shown in FIG. 4N, for inputting payment information (e.g., credit card information, debit card information, financial account information).

In one or more embodiments, the system 100 can additionally or alternatively provide an option to the recipient to initiate the payment transaction. Specifically, the system 100 can provide an option to request the money from the sender in a payment transaction. For example, the system 100 can convert the text or other content in one or more messages in a communication thread of the recipient into a selectable element. When the recipient selects the selectable object corresponding to the inferred payment event, the system 100 can initiate the payment transaction to allow the recipient to send a request to the sender for funds.

As described above, the system 100 can facilitate payment transactions between groups of users. For example, the system can provide an option to initiate a payment transaction based on inferring a payment event involving multiple co-users. The system 100 can infer such payment events based on messages exchanged in a group communication session, social network posts, connections between users, location data, etc. FIGS. 8A-8D illustrates one example of providing an option to initiate a group payment.

FIG. 8A illustrates a timeline or information feed 800 of a social network. The information feed can include electronic messages from the user of the corresponding client device in addition to electronic messages to the user from other users within the system 100. Specifically, the information feed 800 can include an aggregation of electronic messages (e.g., social-network posts) that may be relevant to the user based on a relationship of the user to authors of the electronic messages. For example, if a user has a predefined relationship (e.g., "friend") with an author of an electronic message, electronic messages posted by the author in the system 100 can appear in the information feed 800. In various instances, the electronic messages in the information feed 800 can be ordered according to a time in which the authors posted the electronic messages or according to an importance ranking system, as determined by the system 100.

In one or more embodiments, an electronic message can be a message generated by the system 100 or another user in connection with a group event. Specifically, the electronic message can be any message within the messaging application and associated with a group event. For example, the electronic message can include a message identifying a user and indicating an event associated with the user. In some examples, the electronic message can also identify other users associated with the event.

In one or more embodiments, a user can post an electronic message to the social networking system. Specifically, the user can post an electronic message associated with a group event to his information feed 800. For example, the electronic message can be a check-in message 804 that tags co-users to indicate that the user is eating at a restaurant (e.g., "At The Good Diner with John Doe, Brutus Pendleton, and Jane Smith."). In some examples, the electronic message can indicate that at least one other user of the system 100 is also at the restaurant with the user.

In one or more implementations, the system 100 can use any information related to an electronic message to identify a past, present or a future group event, in addition to a user and/or members of the group. For example, the system 100 can use location information (as shown in the map 806 of FIG. 8A), review information, and other information associated with the event in one or more electronic messages in the system 100. In some instances, the system 100 can utilize user interaction information, such as information associated with comments or "likes" corresponding to the electronic message. The system 100 can also utilize sharing data associated with one or more electronic messages (e.g., which users shared an electronic message with other users).

According to various additional or alternative embodiments of the system 100, the system 100 can predict an event associated with one of more users of the system 100. Specifically, events can include concerts, visits to a restaurant, amusement park visits, work activities, birthdays, baby birth, adoption, death, change in marital status, graduation, employment status, age, health or the like. In one or more examples, the system 100 determines an event based on whether there is a cost or a gift associated with the event. For example, the system 100 can identify that a user is about to have a birthday and has a product on a wish list based on social network data. The system 100 can then identify friends of the user that may want to go in on the product for the user for her birthday. The system 100 can then send a payment request notification. In such embodiments, the user (i.e., the person having the birthday) may not receive the payment request notification and in fact may be prevented from determining that the system sent the friends a payment request notification allowing the users to go in on a gift. The system 100 can select the friends to provide the payment request notification based on a relationship between the user and each friend, between the friends (i.e., whether they are family members), based on an RSVP to a birthday party for the user, based on location information, etc.

The system 100 can compute the probability of a user undergoing an event using a machine learning model and historical data of other users of the social-networking system who have gone through events, as defined by the system 100. In one or more embodiments, the system 100 trains a machine-learning model using historical data collected for the users, whether each user went through an event change and the type of event. The machine-learning model can use several data points within the collected data as variables to generate a predictive algorithm. For example, the use of words such as "congratulations," the presence of virtual gifts offered to the users, the number of times other users clicked on the user's profile, change in other profile information, such as a change in address or last name, electronic messages posted by the users on their own and/or other users' information feeds, etc.

In one or more embodiments, the system 100 can generate the training set for training the machine-learning model based on content obtained via one or more users' social-networking profiles or other profiles associated with the system 100. For example, the system 100 can collect marital status information, employment information, home address information, age information, communications data, social-network data, and other information that identifies or is associated with the users. To illustrate, the system 100 can retrieve data for a particular time period before a recorded event from a user profile (e.g., a week or a month prior to the event). In another illustrative example, the time period can vary based on the event.

In one or more embodiments, the system 100 can weight events based on the corresponding dates. For example, the system 100 can determine that a change in relationship status on April first is not a reliable indicator of a detected event. The system 100 can remove unreliable data from the training set.

The system 100 can compute a probability of a user undergoing an event based on the user's communications and actions within the system 100, and also based on the training set. The system 100 can train the machine-learning model based on several factors, including words in electronic messages associated with the user, the length of the messages, the frequency of communications for the user, the types of actions taken, etc. The machine-learning model can generate a prediction algorithm for computing the probability of a user undergoing a particular event. If the user's probability score is above a provided threshold score, the system 100 can predict that the user is undergoing an event.

The system 100 can use the historical data of a user as an input for determining a probability score indicative of whether the user will undergo a particular event based on historical data of other users. In one example, the system 100 can classify the user as experiencing an event if the probability score of the user is higher than a threshold score. In another example, the system 100 can identify characters, words, or phrases indicative of an event in electronic messages exchanged between two or more users of the system 100. In such an embodiment, the system 100 can assign a high probability of an event to the user whose communications data indicates a high incidence of the identified words.

As described above, using the machine-learning model, the system 100 can infer an event from one or more electronic messages associated with one or more users of the system 100. The system 100 can also infer a user and one or more members associated with the event.

In response to inferring a group event, the system 100 can provide an option to the user to allow the user to initiate a payment transaction with one or more other members of the group. For example, the system 100 can provide an option in an electronic message from which the system 100 inferred the event, as shown in FIG. 8A. To illustrate, the system 100 can provide a payment collection element 808 (e.g., "Collect Payment") in a text field of the electronic message. In some instances, the option can be inline in the electronic message. Alternatively, the system 100 can provide a push notification or other electronic message with a prompt to initiate a payment transaction.

Figures 8B, 8C:
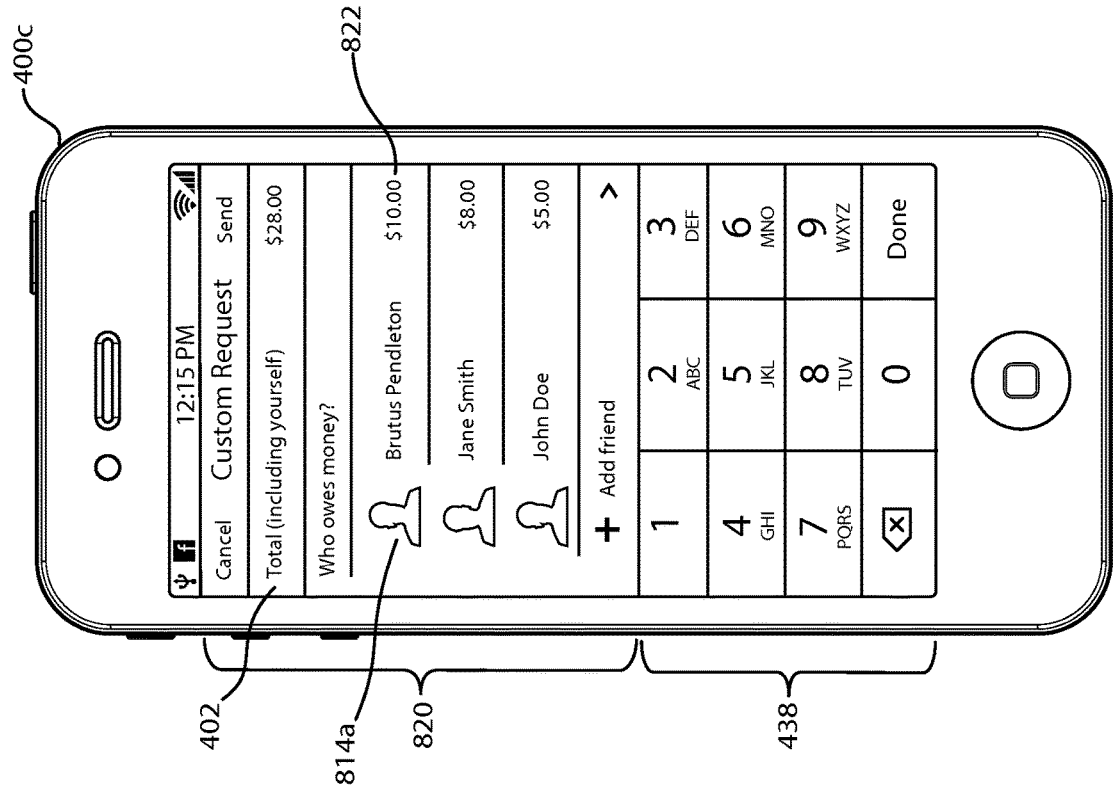

In one or more embodiments, the system 100 can detect that the user selects the option to initiate the payment transaction with one or more members of the group and present a payment request interface 810 in the messaging application, as shown in FIG. 8B. The payment request interface 810 can provide an interface for the user to request money from one or more members of the group in accordance with the inferred event. For example, the payment request interface 810 can present an amount 812 associated with the payment event. The amount 812 can be prepopulated based on content analyzed by the message analyzer 212. Alternatively, the user can enter the total amount manually.

In one or more additional or alternative embodiments, the system 100 can infer the cost from one or more messages associated with the group event. Specifically, the system 100 can analyze one or more electronic messages and information associated with the messages to determine the cost. For example, the system 100 can find the cost of the event based on content included in an electronic message from a third party site. To illustrate, if the group event is a concert, the system 100 can determine the cost of tickets based on visiting a website for buying tickets to the concert and multiplying the cost of each ticket by the number of users in the group. The user can modify the total inferred cost by manually changing the total cost 812 and/or by modifying the number of users in the list of group members.

The payment request interface 810 can further include a list of the users identified as being associated with the payment event. For example, FIG. 8B includes a list of the users (814a-814c) tagged in the post 804. For example, the system 100 can infer members of the group based on one or more electronic messages associated with the event and/or relationships between users of the system 100. To illustrate, the system 100 can present suggestions based on previous payment transactions (e.g., who has been involved in previous transactions with the user), a level of relationship between the user and members (e.g., how close the relationship is or whether the relationship is a "high coefficient" relationship), who has checked in with the user at a current location, who is physically near the user at a current time, and who has a relationship with friends of the user, whether any users are identified in one or more electronic messages, etc. The system 100 can present suggested members of the group in the payment request interface 810 so that the user can verify the members of the group.

In one example, the user can modify the suggested list by adding or removing users from the list of members by selecting a cancel option 816 or an add friend option 818. The user may modify the list if one or more of the members does not belong in the group or if the user decides not to collect payment from one or more members of the group. Thus, the user can potentially remove each of the suggested members to create a list of members not originally shown in the payment request interface 810.

The payment request interface 810 can provide the user the ability to split the total amount 812 equally by selecting the option 818a. Additionally, the payment request interface 810 can provide the user the ability to split the total amount 812 in a custom fashion by selecting custom option 818b. Upon selection of the custom option 818b, the user interface manager 206 can provide a custom request interface 820, as shown in FIG. 8C. In the custom request interface 820, the user can populate custom request amounts 822 for each of the users individually. For example, the user can input an amount for each individual user based on what the users owe the user or based on some other criteria. To illustrate, if the event corresponds to a dinner event at which the user paid the dinner bill, the user can enter a custom payment amount 822 for each user corresponding to the cost of each user's meal.

Upon confirming the payment, the payment message generator 216 can prepare and send a payment message to the network application 204. The payment message can include in information provided in the payment request interface 810 and/or the custom request interface 820, such as for example identification of each of the users and a payment amount to send to each of the users. Alternatively, the payment message generator 216 can prepare and send individual payment messages for each user included the request.

The network application 204 can process the payment request for each user. In particular, the network system 204 can send a payment request notification to each user. The payment request notification can comprise a push notification send to one or more client devices associated with the users. Upon receipt of the notification, the client application 202 can present a payment request notification. For example, the user interface manager 202 can provide a notification indicator 840 over a notification control 842. The notification indicator 840 can inform the user of a received notification.

Upon selecting the notification control 840, the user interface manager 206 can provide a notification interface 844. The notification interface 844 can display a plurality of notifications received for the user client device 400c. In one instance, the notification interface 844 presents the payment request notification 846 at the top of a list of notifications for the user, as shown in FIG. 8D. The payment request notification 846 can include a selectable element 848 or the entire payment request notification 846 can be a selectable element. The system can also provide an option to allow the sender to apply social pressure by reminding the recipient of the payment transaction. For example, by selecting a reminder option (similar to the reminder option 504 describe above) can cause the system 100 to send a message to the recipient to complete the payment transaction by entering the credentials for the payment transaction. In some instances, the message to the recipient can cause a message or notification to appear at the sender client device 104a and/or within the messaging interface 412 at the sender client device 104a. Additionally or alternatively, the system 100 can present the credential user interface 434 to the recipient in response to the reminder message from the recipient. In further embodiments, the system can generate and post social network posts to the accounts of the sender and/or the recipients noting the pending payment. Such social network posts can create social pressure for the recipient to provide a credential to complete the transaction.

Figure 8E:
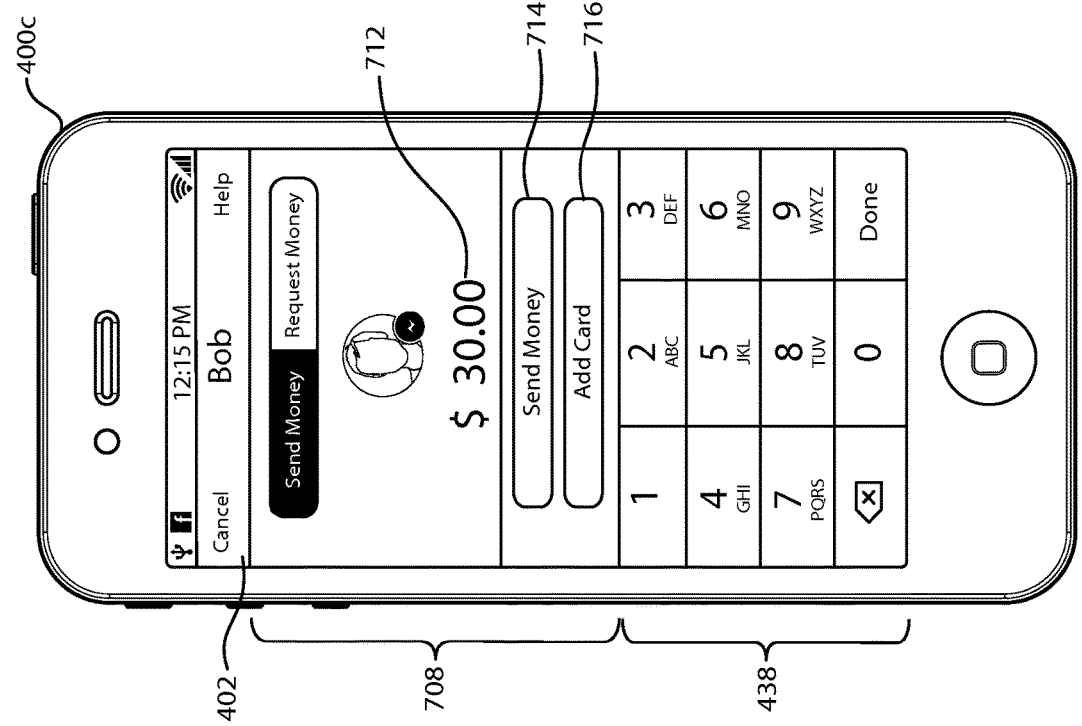
Figure 8D:
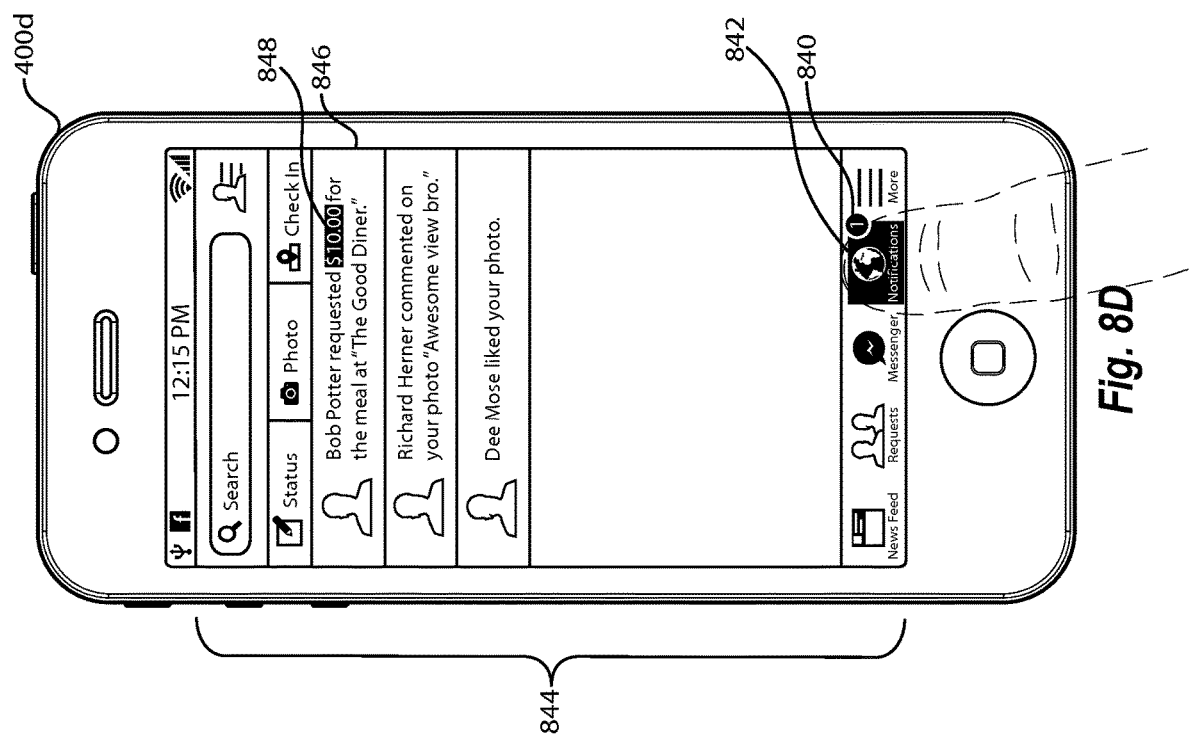

The user interface manager 206 can provide a payment confirmation interface 708 as shown in FIG. 8E and as described above in relation to FIG. 7C upon a user selecting the payment request notification 846 in the notification interface 844. Alternatively, the user interface manager 206 can provide a PIN confirmation user interface as described above in relation to FIG. 6B. In any event, the PIN confirmation user interface or the payment confirmation interface 708 can allow the user to confirm the payment. In response to which, the client application can send a payment message to the network application 204 that causes the network application 204 to process a payment transaction as described above.

In one or more embodiments, the user can pay the total cost associated with the group event after collecting from the co-users of the group. For example, the user can enter into a payment transaction with a vendor (e.g., a restaurant) associated with the group event. The user can enter into the payment transaction with the vendor from using the system 100.

In additional or alternative implementations, the user can initiate a single payment transaction with the vendor and the group users, such that the vendor can collect payment from each of the users directly, rather than requiring the user to collect payment from the users in a separate transaction. Specifically, the system 100 can infer the group event based on input from the vendor. In such embodiments, the user can organize a payment transaction for the group as a whole in a many-to-one transaction in which the vendor is the recipient (e.g., for splitting a bill in a restaurant), but for which the user verifies the group users, the payment amount, and the payment split. Allowing a user to organize such a payment transaction can simplify a payment transaction between the group and the vendor.

As described previously, the system 100 can infer a payments event by analyzing natural language in an electronic message. The system 100 can also infer group payment events. Specifically, the system 100 can infer a group event from a user's electronic message (e.g., a status message 800 within an information feed 900), as well as comments 902 and "likes" 906 associated with the electronic message, as shown in FIG. 9A. In one or more instances, the user can use natural language to indicate that the user is going to a future event. To illustrate, if the user (identified as the user by the system 100) says, "Going to the Old Wizard Puppet concert in Palo Alto . . . Who wants to come?" the system 100 can analyze the natural language to determine that the future event is a certain concert located in Palo Alto.

Additionally, the system 100 can determine that one or more additional users are attending the concert with the user based on comments 902 and "likes" 906 associated with the status message 904 (or other electronic message). Specifically, the system 100 can analyze the content of the comments 902 associated with the status message 904 to determine whether one or more of the users commenting on the 904 are users of a group associated with a group event. For example, if a user comments in reply to the status message 904 about the concert, "Show sounds way cool, I'm in!" the system 100 can determine that the user is also going to the concert and is a user of the group. In another example, the system 100 can analyze the "likes" 906 for the status message 904 to determine whether the corresponding users are users of the group. To illustrate, the system 100 can identify the users and analyze electronic messages associated with the identified users to determine whether the users are users of the group.

As previously discussed, the system 100 can provide a payment collection option 908 for the user to initiate a payment process for collecting payment from users of the group. Upon selecting the option 908, the system 100 can present a payment request interface 810 including the list of users (814c, 814d, 814e), as shown in FIG. 9B and as described above in relation to FIG. 8B. The user can modify the list of users to include more, fewer or different users than those listed.

In one or more embodiments, the user can select to split the total cost 812 equally. Specifically, selecting to split the total cost 812 equally can cause the system 100 to automatically split the requested payment amounts based on the total cost 812 and the number of users in the list of users. For example, the system 100 can divide the total cost 812 by the number of users (including the user) to obtain the payment amount for requesting from the users. After verifying the details of the group (e.g., users and payment split), the user can send the payment requests to each of the users from the payment request interface 810. After which the payment request process can proceed as described above in relation to FIGS. 8A-8E.

FIGS. 1-9B, the corresponding text, and the examples, provide a number of different systems and devices for sending and receiving payments using an integrated electronic payment and messaging system. In addition to the foregoing, embodiments can be described in terms of flowcharts comprising acts and steps in a method for accomplishing a particular result. For example, FIGS. 12-19 illustrate flowcharts of exemplary methods in accordance with one or more embodiments.

Figure 10:
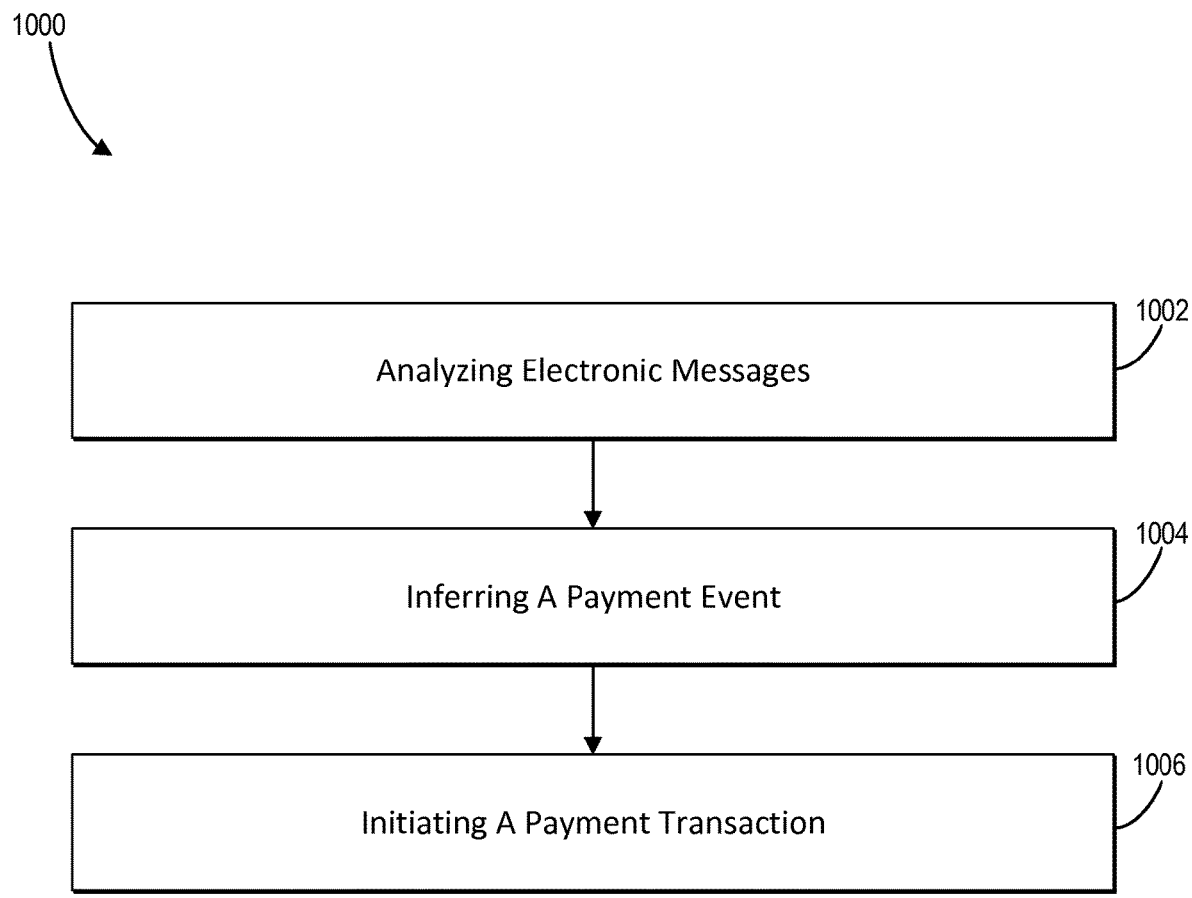
FIG. 10 illustrates a flow chart of a series of acts in a method of inferring a payment event based on exchanged messages and initiating a payment transaction in response to the inferred payment event in accordance with one or more embodiments.

FIG. 10 illustrates a flow chart of a method 1000 of initiating a payment transaction based on inferring a payment event. The method 1000 includes an act 1002 of analyzing electronic messages. Specifically, act 1002 involves analyzing, by at least one processor, one or more electronic messages exchanged between a user and one or more co-users. In one example, act 1002 can involve analyzing electronic messages in a messaging conversation involving the user and the one or more co-users. Furthermore, act 1002 can involve parsing the text of multiple messages to identify one or more phrases or terms.

The method 1000 also includes an act 1004 of inferring a payment event. In particular, act 1004 involves inferring a payment event based on the analysis of the one or more electronic messages exchanged between the user and the one or more co-users. Act 1004 can involve identifying, from the one or more electronic messages, a natural language phrase indicating the payment event. For example, act 1004 can involve utilizing natural language processing techniques to infer a payment event from natural language in a message exchanged between the user and the one or more co-users.

In one instance, act 1004 can involve inferring a desire to initiate a payment transaction using natural language techniques.

To illustrate, act 1004 can also involve identifying language that indicates the user desires to send or owes the one or more co-users money. In some instances, natural language phrases can include at least one predetermined phrase, character string, or symbol. In one example, a symbol can include one or more dollar signs. In one example, a natural language phrase can include a number. In one example, act 1004 can involve detecting a predetermined symbol followed by a payment amount (e.g., "$$25") in an electronic message (e.g., an instant message) from the user to the one or more co-users, indicating that the user desires to initiate a payment transaction to send the payment amount to the one or more co-users.

Additionally, the method 1000 includes an act 1006 of initiating a payment transaction. Specifically, act 1006 involves initiating, by the at least one processor, a payment transaction based on the payment event. Act 1006 can involve providing an option to initiate the payment transaction, for example, by creating a selectable object in connection with the natural language phrase.

In one example, act 1006 can comprise making at least a portion of the natural language phrase selectable. To illustrate, act 1006 can involve modifying (e.g., by highlighting, underlining, coloring or otherwise modifying the appearance of) an identified word, phrase, or group of characters to indicate that the word, phrase, or group of characters are selectable for initiating a payment transaction between the user and the one or more co-users.

Act 1006 can additionally or alternatively involve providing a confirmation request to the user. In one example, providing a confirmation request can involve providing the confirmation request in response to detecting a selection of the selectable object and prior to initiating the payment transaction. Act 1006 can also involve providing the user with an option to request a payment from the one or more co-users.

Act 1006 can additionally involve sending a request to transfer the payment amount from the user to the one or more co-users without further user interaction upon detecting the predetermined symbol followed by the payment amount. In one example, sending a request to transfer the payment amount can involve sending the payment amount to the one or more co-users in response to detecting the predetermined symbol and the payment amount in an electronic message from the user to the one or more users.

As part of act 1006, or as an additional act, the method 1000 can include detecting, by the at least one processor, a selection of the selectable object by the user, and initiating the payment transaction in response to detecting the selection. In some examples, detecting the selection of the selectable object by the user can involve detecting a touch input, a cursor input, a voice input, or other type of input by the user to select the selectable object. In one or more examples, initiating the payment transaction can involve presenting a request to the user to complete the transaction with the one or more co-users for a payment amount inferred from the one or more electronic messages.

Figure 11:
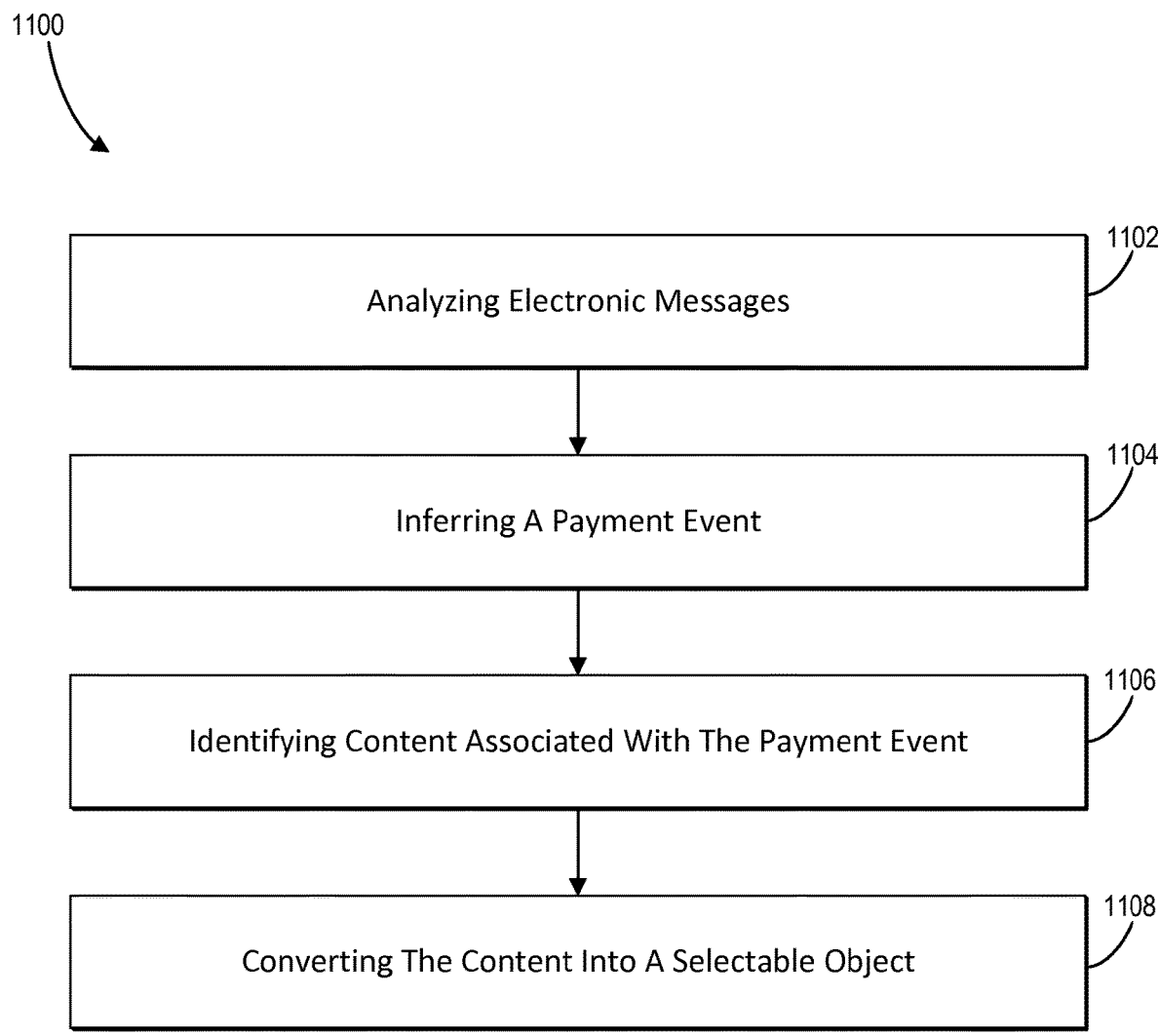
FIG. 11 illustrates a flow chart of a series of acts in another method of inferring a payment event based on exchanged messages and initiating a payment transaction in response to the inferred payment event in accordance with one or more embodiments.

FIG. 11 illustrates a flowchart of a series of acts in a method 1100 of initiating a payment transaction based on inferring a payment event. The method includes an act 1102 of analyzing electronic messages. Specifically, act 1102 involves analyzing, by at least one processor, one or more electronic messages exchanged between a user and one or more co-users. Act 1102 can involve identifying natural language content in the one or more electronic messages. Identifying natural language content can involve parsing the one or more electronic messages into a plurality of logical components, which can further involve parsing the one or more electronic messages into characters, words, and phrases.

The method 1100 includes an act 1104 of inferring a payment event. In particular, act involves inferring a payment event based on the analysis of the one or more electronic messages exchanged between the user and the one or more co-users. Act 1104 can involve identifying, from the one or more electronic messages, a payment event from the natural language content. Identifying the payment event can involve identifying, in the natural language content, a request for payment from the one or more co-users using natural language processing. Identifying the payment event can alternatively involve identifying, in the natural language content, a request to send payment to the one or more co-users using natural language processing.

Additionally, the method 1100 includes an act 1106 of identifying content associated with the payment event. Specifically, act 1106 involves identifying, in the one or more electronic messages exchanged between the user and the one or more co-users, content associated with the payment event. For example, act 1106 can involve identifying text indicating a desire to initiate a payment transaction between the user and the one or more co-users. To illustrate, act 1106 can involve inferring an intent of the user to initiate the payment transaction based on an analysis of characters, words, and/or phrases from the one or more messages. Additionally or alternatively, act 1106 can involve identifying a payment amount in the one or more electronic messages.

The method 1100 also includes an act 1108 of converting the content into a selectable object. More specifically, act 1108 involves converting, by the at least one processor, the content into a selectable object for initiating a payment transaction based on the payment event. For example, act 1108 can involve converting at least a portion of text indicating a desire to initiate a payment transaction into a selectable object. To illustrate, act 1108 can involve converting a word, phrase, symbol, or payment amount into a selectable object. In additional or alternative examples, act 1108 can involve using the identified content in the one or more electronic messages to add new text or selectable objects in connection with the identified content.

As part of act 1108, or as an additional act, the method 1100 can include identifying a predetermined character string in the one or more electronic messages, and performing an operation associated with the payment transaction based on the predetermined character string. For example, identifying a predetermined character string can include identifying a symbol, character, or group of characters comprising a specific syntax associated with a particular operation for the payment event. The specific syntax can include a predetermined combination and/or order of symbols, characters, or groups of characters. In one instance, performing the operation can include performing the operation upon identifying the predetermined character string comprising the specific syntax.

Figure 12:
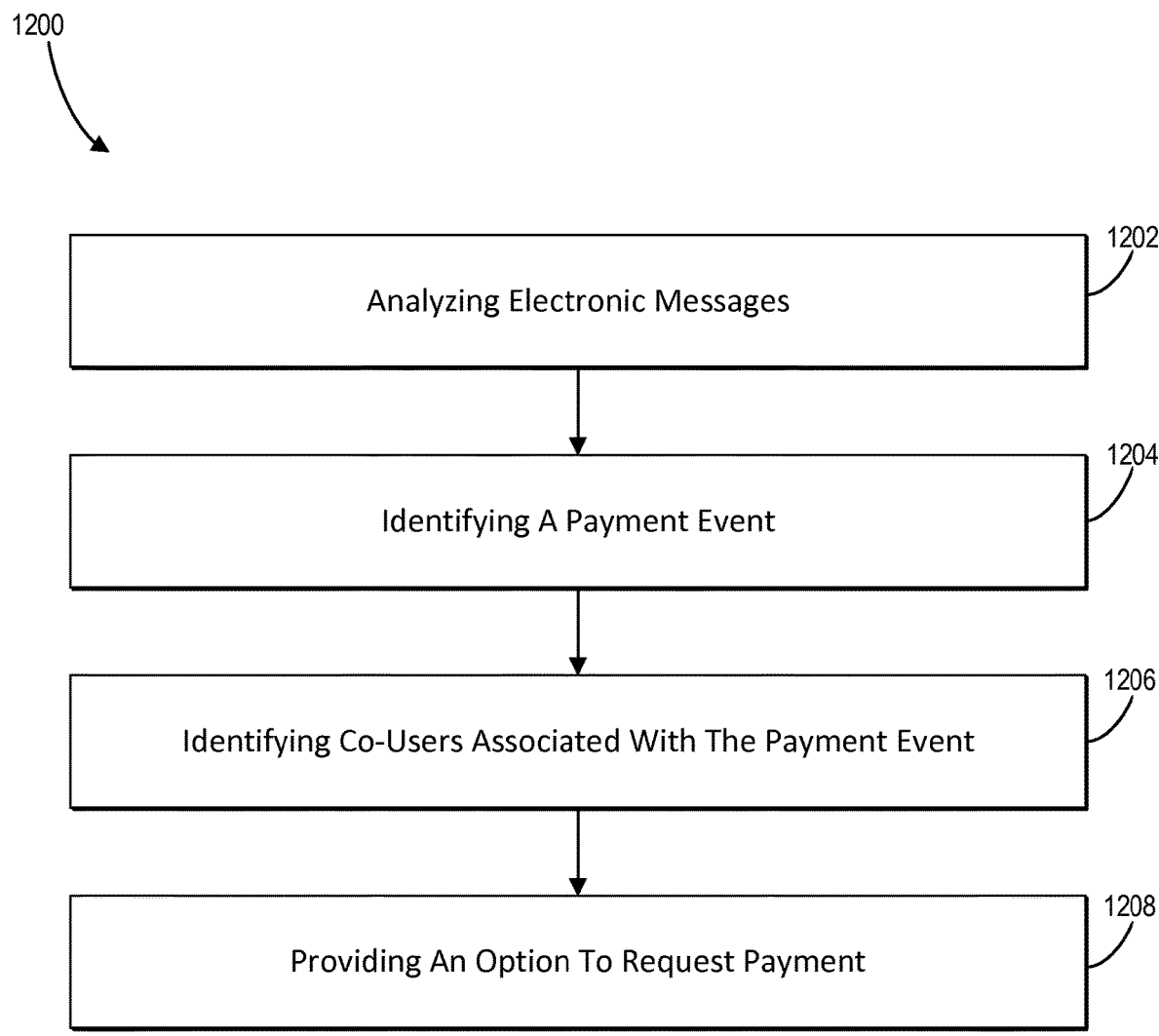
FIG. 12 illustrates a flowchart of a series of acts in a method of facilitating group payment transactions in accordance with one or more embodiments.

FIG. 12 illustrates a flowchart of a series of acts in a method 1200 of facilitating a payment between a group of users. The method 1200 includes an act 1202 of analyzing electronic messages. Specifically, act 1202 involves analyzing, by at least one processor, one or more electronic messages. In one example, the one or more electronic messages can comprise one or more electronic messages exchanged in an electronic messaging session, one or more social network posts, or other electronic messages. In one example, the electronic messages can include data generated by one or more devices corresponding to the one or more co-users, including location information periodically sent by the one or more devices.

The method 1200 also includes an act 1204 of identifying a payment event. In particular, act 1204 involves identifying a payment event based on the analysis of the one or more electronic messages. In various examples, the payment event can be a past event, a presently occurring event or a future event.

Act 1204 can involve identifying a natural language phrase, from the one or more electronic messages, indicating the payment event. Act 1204 can additionally or alternatively involve identifying location information for the co-users. Identifying location information can involve identifying location information based on the one or more electronic messages and/or on location information obtained from electronic devices associated with one or more of the co-users.

Additionally, the method 1200 includes an act 1206 of identifying co-users associated with the payment event. In one example, act 1206 can involve determining that the one or more electronic messages comprise identifiers corresponding to the co-users. For example, act 1206 can involve identifying co-users based on location information used to identify the payment event. In some instances, act 1206 can also involve identifying co-users based on established relationships between co-users, previous interactions between co-users, proximity of co-users to each other and/or to a specific location, or other information about the co-users or the payment event.

The method 1200 also includes an act 1208 of providing an option to request payment. Specifically, act 1208 involves providing, to a user of the co-users and by the at least one processor, an option to request a payment from the co-users. In one example, act 1208 can involve presenting the option within a message exchanged between the co-users. In another example, act 1208 can involve presenting the option within a social-network post by the user. In one example, act 1208 can involve modifying content in the one or more electronic messages to create a selectable object associated with the option to request payment.

As part of act 1208, or as an additional act, the method 1200 can include identifying a payment amount from the one or more electronic messages, and providing the payment amount in the option to request a payment from the co-users. Additionally, the method 1200 can include dividing the payment amount by a number of co-users, and providing the divided payment amount in separate payment requests for each of the co-users. For example, dividing the payment amount can include calculating the number of co-users associated with the payment event and dividing the total payment amount by the calculated number of co-users. In one example, providing the divided payment amount in separate payment requests for each of the co-users comprises generating the payment requests comprising an identifier of each of the co-users and the divided payment amount.

Figure 13:
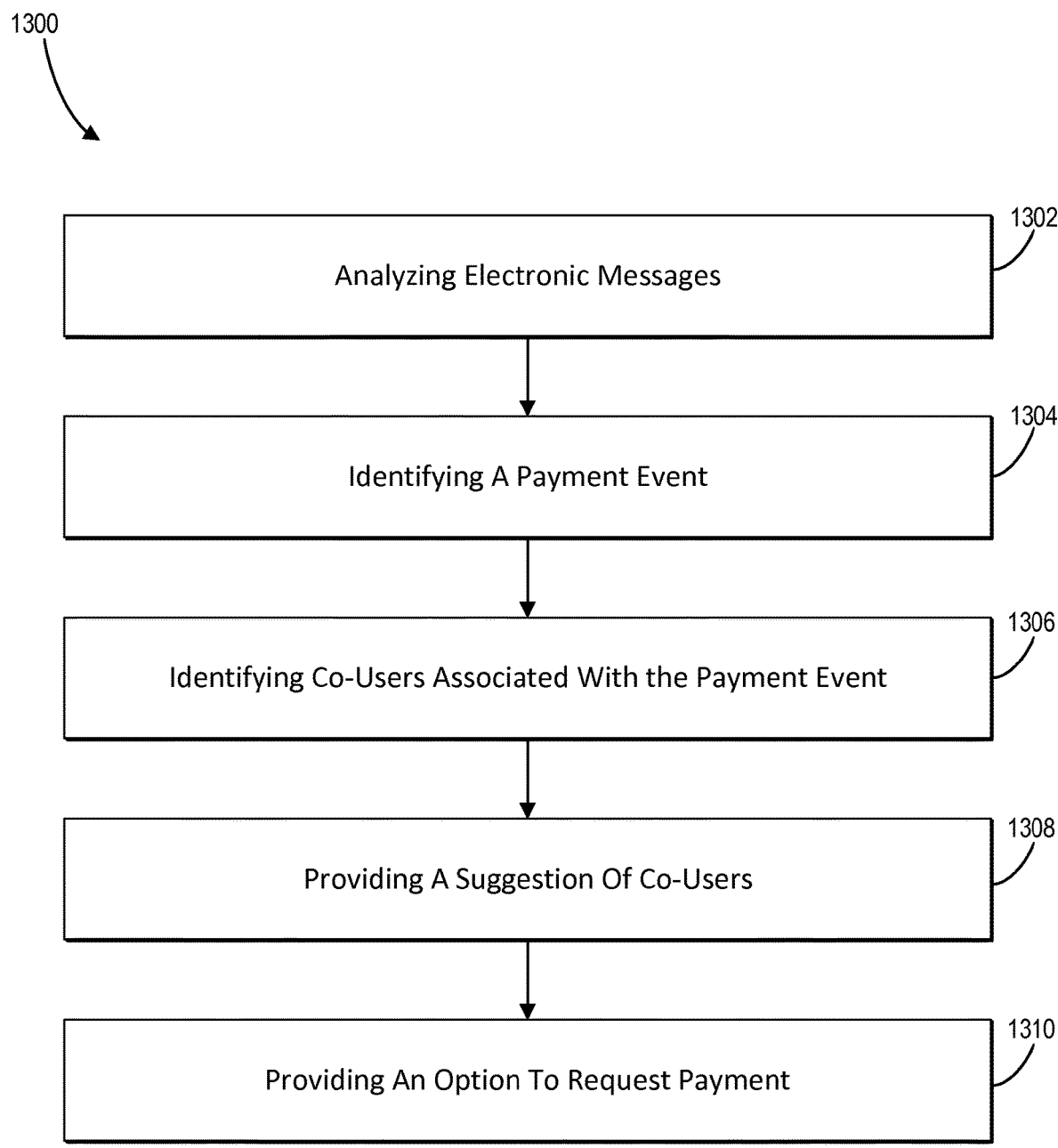
FIG. 13 illustrates a flowchart of a series of acts in another method of facilitating group payment transactions in accordance with one or more embodiments.

FIG. 13 illustrates a flowchart of a series of acts in a method 1300 of facilitating a payment between a group of co-users. The method includes an act 1302 of analyzing electronic messages. Specifically, act 1302 involves analyzing, by at least one processor, one or more electronic messages. In one example, the one or more electronic messages can include one or more electronic messages in one or more information feeds corresponding to the co-users. In another example, the one or more electronic messages can include one or more electronic messages exchanged between at least two of the co-users. In one example, the electronic messages can include data generated by one or more devices corresponding to the one or more co-users, including location information periodically sent by the one or more devices.

The method 1300 also includes an act 1304 of identifying a payment event. In particular, act 1304 involves identifying a payment event based on the analysis of the one or more electronic messages. In one example, act 1304 can involve identifying a natural language phrase, from the one or more electronic messages, indicating the event. In an alternative example, act 1304 can involve identifying location information for the co-users. In some instances, identifying location information includes identifying location information from electronic messages associated with one or more of the co-users. In other instances, identifying location information includes identifying location information from electronic devices corresponding to one or more of the co-users.

The method 1300 further includes an act 1306 of identifying co-users associated with the payment event. In one example, act 1306 can involve identifying the co-users associated with the event based on the analysis of the one or more electronic messages. In one example, act 1306 can involve identifying the co-users based on electronic messages generated by the electronic devices corresponding to one or more of the co-users. To illustrate, act 1306 can detect a location of electronic devices corresponding to one or more of the co-users and determine the payment event based on a proximity of the co-users to a particular location.

Additionally, the method 1300 includes an act 1308 of providing a suggestion of co-users. More particularly, act 1308 involves providing, to a user of the co-users and by the at least one processor, a suggestion of at least one other user of the co-users for requesting a payment from the at least one other user. In one example, the suggestion of the at least one other user of the plurality of co-users is based on a relationship strength between the user and the at least one other user. For example, the relationship strength can be based on a number of interactions between the user and the at least one other user, a number of common friends between the user and the at least one other user, or a degree of separation between the user and the at least one other user. In another example, the suggestion of the at least one other user of the co-users is based on previous payment interactions between the user and the at least one other user. For example, previous payment interactions can include previous group payments involving the user and the at least one other user.

The method 1300 also includes an act 1310 of providing an option to request payment. Specifically, act 1310 involves providing, to the user of the co-users and by the at least one processor, an option to request a payment from the at least one other user based on the suggestion. For example, act 1310 can involve presenting a selectable option for requesting payment from each suggested co-user in a list of suggested co-users.

As part of act 1310, or as part of an additional act, the method 1300 can include providing a prompt to the user to request the payment from the at least one other user. For example, the method 1300 can involve presenting a prompt to the user to request payment from the at least one other user in response to identifying the at least one other user associated with the payment event.

As part of act 1310, or as part of an additional act, the method 1300 can include identifying a payment amount from the one or more electronic messages, providing the payment amount in the option to request a payment from the co-users, dividing the payment amount by a number of co-users, and providing the divided payment amount in separate payment requests for each of the co-users. For example, dividing the payment amount by a number of co-users can involve dividing a total payment amount for the payment transaction by a number of co-users identified in association with the payment event.

Figure 14:
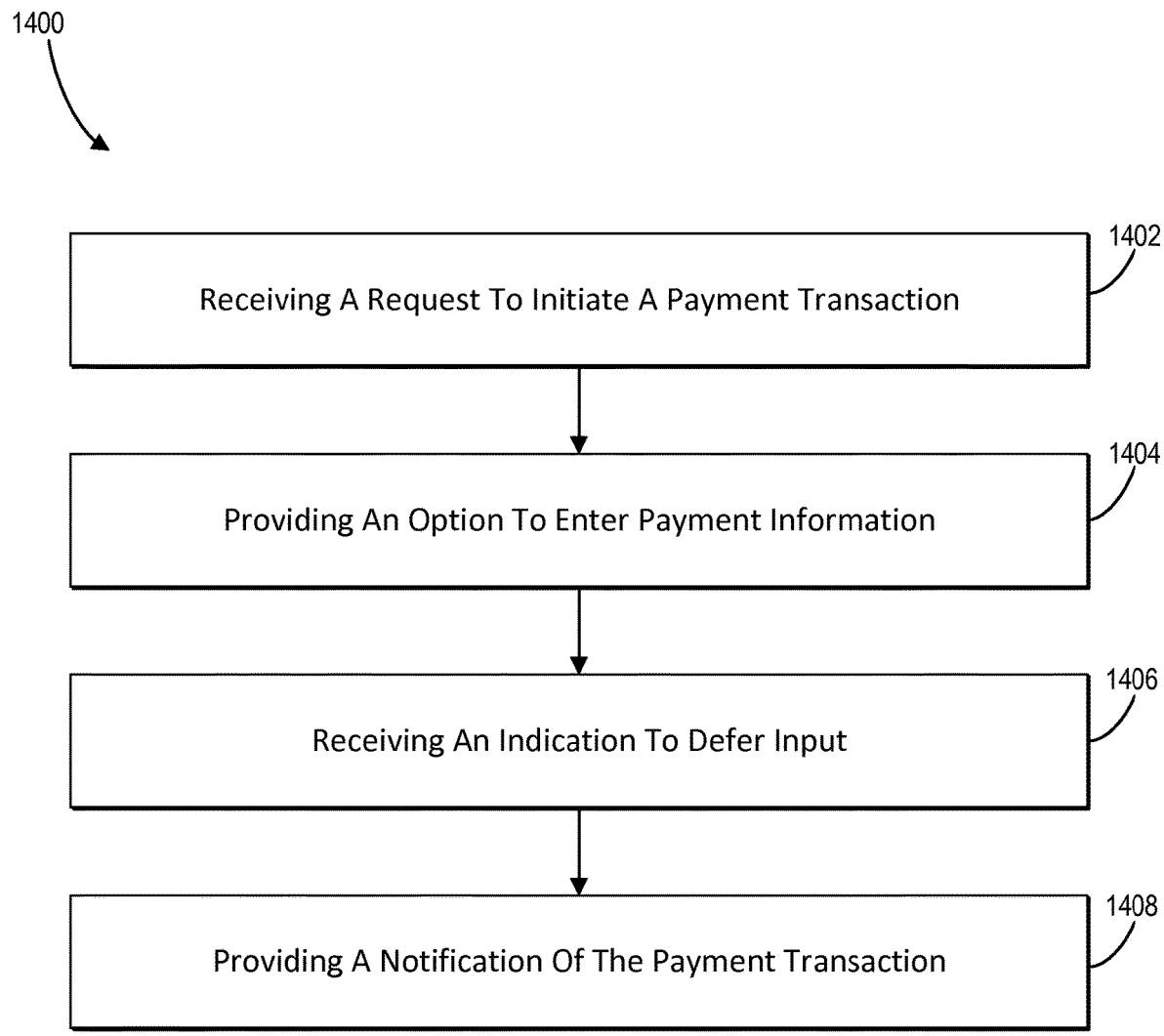
FIG. 14 illustrates a flowchart of a series of acts in a method of initiating a payment without first providing a payment credential in accordance with one or more embodiments.

FIG. 14 illustrates a flowchart of a series of acts in a method 1400 of initiating a payment transaction without a payment credential. The method 1400 includes an act 1402 of receiving a request to initiate a payment transaction. Specifically, act 1402 involves receiving from a user, at a server, a request to initiate a payment transaction between the user and one or more co-users. In one example, act 1402 can involve receiving from the user, at the server, identification information and a payment amount for the payment transaction, and storing, at the server, the identification information and the payment amount for the payment transaction.

As part of act 1402, or as an additional act, the method can include receiving, at the server, the payment information from the user, and using the stored identification information and the stored payment amount to process the payment transaction with the received payment information. For example, processing the payment transaction can involve completing the payment transaction by verifying the payment information from the user to access an account to transfer funds from the user to the one or more co-users based on the stored identification information and the stored payment amount.

The method 1400 also includes an act 1404 of providing an option to enter payment information. Specifically, act 1404 involves providing to the user, by the server, an option to enter payment information. For example, the payment information can include financial account information for the user. To illustrate, the payment information can include an account number and a routing number for a financial account. In another embodiment, the payment information can include credit card information.

The method 1400 further involves an act 1406 of receiving an indication to defer input of the payment information. In particular, act 1406 involves receiving, from the user, an indication to defer input of the payment information. In one example, act 1406 can involve detecting a passive indication to defer input of the payment information based on a time elapsed after receiving the request. To illustrate, act 1406 can involve detecting that the time elapsed after receiving the request satisfies a time threshold without receiving the payment information. In another example, act 1406 can involve detecting an active indication to defer input based on a deferral action performed by the user. To illustrate, the deferral action can include a selection to defer input of the payment information.

Additionally, the method 1400 includes an act 1408 of providing a notification of the payment transaction. In particular, act 1408 involves providing a notification to the one or more co-users of the payment transaction. In another example, act 1408 can involve sending an electronic message to the one or more co-users. In one example, the notification includes a notification that the user is sending a payment to the one or more co-users. The notification can also include a payment amount for the payment.

As part of act 1408, or as an additional act, the method 1400 can include receiving a request, from the one or more co-users, to complete the payment transaction, and providing to the user, by the at least one processor, the option to enter payment information a second time. In one example, act 1408 can involve receiving the request to complete the payment transaction after providing the notification of the payment transaction to the one or more co-users.

As part of act 1408, or as an additional act, the method 1400 can include sending a reminder notification to the user to enter the payment information. In one example, the method 1400 can include sending the reminder notification in response to detecting a selection of reminder option from the one or more co-users. In another example, the method 1400 can include sending the reminder notification in response to determining that a certain amount of time has elapsed since receiving the request to initiate the payment transaction. In another example, the method 1400 can include sending the reminder notification in response to determining that a certain amount of time has elapsed since sending a previous reminder notification. In an alternative example, the method 1400 can also include canceling the payment transaction in response to determining that a certain amount of time has elapsed since receiving the request to initiate the payment transaction.

Figure 15:
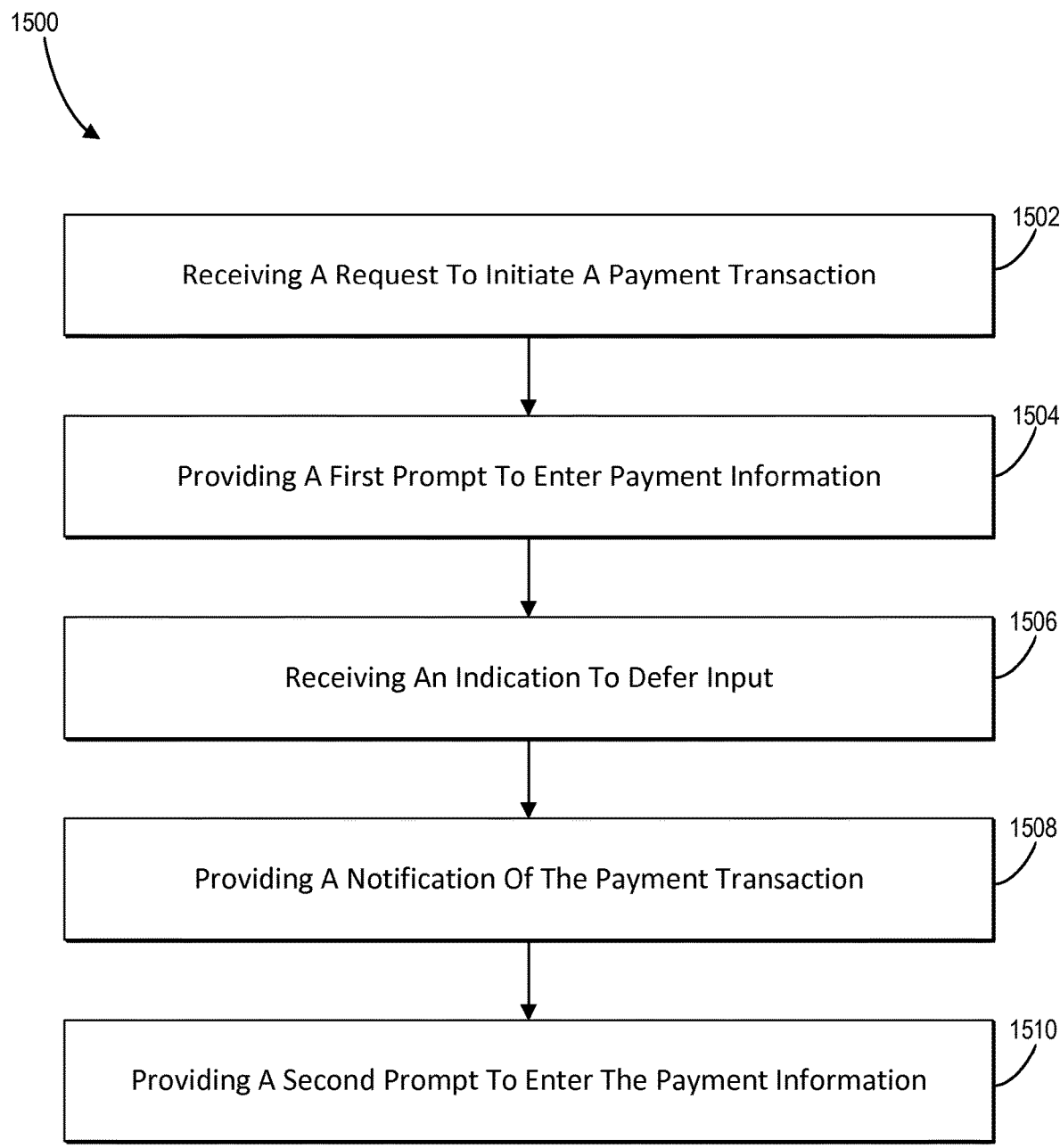
FIG. 15 illustrates a flowchart of a series of acts in another method of initiating a payment without first providing a payment credential in accordance with one or more embodiments.

FIG. 15 illustrates a flowchart of a series of acts in a method 1500 of facilitating a payment transaction without initially receiving a payment credential from the sender. The method 1500 includes an act 1502 of receiving a request to initiate a payment transaction. Specifically, act 1502 involves receiving from a user, at a server, a request to initiate a payment transaction between the user and one or more co-users. For example, act 1502 can involve receiving from the user, at the server, identification information and a payment amount for the payment transaction, and storing, at the server, the identification information and the payment amount for the payment transaction.

As part of act 1502, or as an additional act, the method 1500 can include receiving, at the server, the payment information from the user, and using the stored identification information and the stored payment amount to process the payment transaction with the received payment information. For example, processing the payment transaction can involve completing the payment transaction by verifying the payment information from the user to access an account to transfer funds from the user to the one or more co-users based on the stored identification information and the stored payment amount.

Additionally, the method 1500 includes an act 1504 of providing a first prompt to enter payment information. In particular, act 1504 involves providing, by the server, a first prompt to the user to enter payment information in response to the detected payment transaction.

The method 1500 also includes an act 1506 of receiving an indication to defer input. Specifically, act 1506 involves receiving, from the user, an indication to defer input of the payment information. Act 1506 can involve receiving an indication that the user actively dismissed the prompt. To illustrate, act 1506 can involve detecting a selection by the user to defer input of the payment information. Act 1506 can alternatively involve receiving an indication that the user passively dismissed the prompt. To illustrate, act 1406 can involve detecting that a time elapsed after receiving the request to initiate the payment transaction satisfies a time threshold without receiving the payment information.

The method 1500 further includes an act 1508 of providing a notification of the payment transaction. Specifically, act 1508 involves providing a notification to the one or more co-users of the payment transaction. In one example, act 1508 can involve sending an electronic message to the one or more co-users. In one example, the notification includes a notification that the user is sending a payment to the one or more co-users. The notification can also include a payment amount for the payment.

Additionally, the method 1500 includes an act 1510 of providing a second prompt to enter the payment information. In particular, act 1510 involves providing, by the server and in response to the received indication, a second prompt to the user to enter the payment information for the detected payment transaction at an appropriate time. In one example, act 1510 can involve providing the second prompt in response to detecting a reminder notification to the user to enter the payment information.

As part of act 1510, or as an additional act, the method 1500 can include determining the appropriate time by analyzing one or more electronic messages associated with one or more co-users. Alternatively, the method 1500 can include determining the appropriate time based on a predetermined time relative to the detected payment transaction. Alternatively, the method 1500 can include receiving a request, from the one or more co-users, to complete the payment transaction, and determining the appropriate time based on the request to complete the payment transaction.

Figure 16:
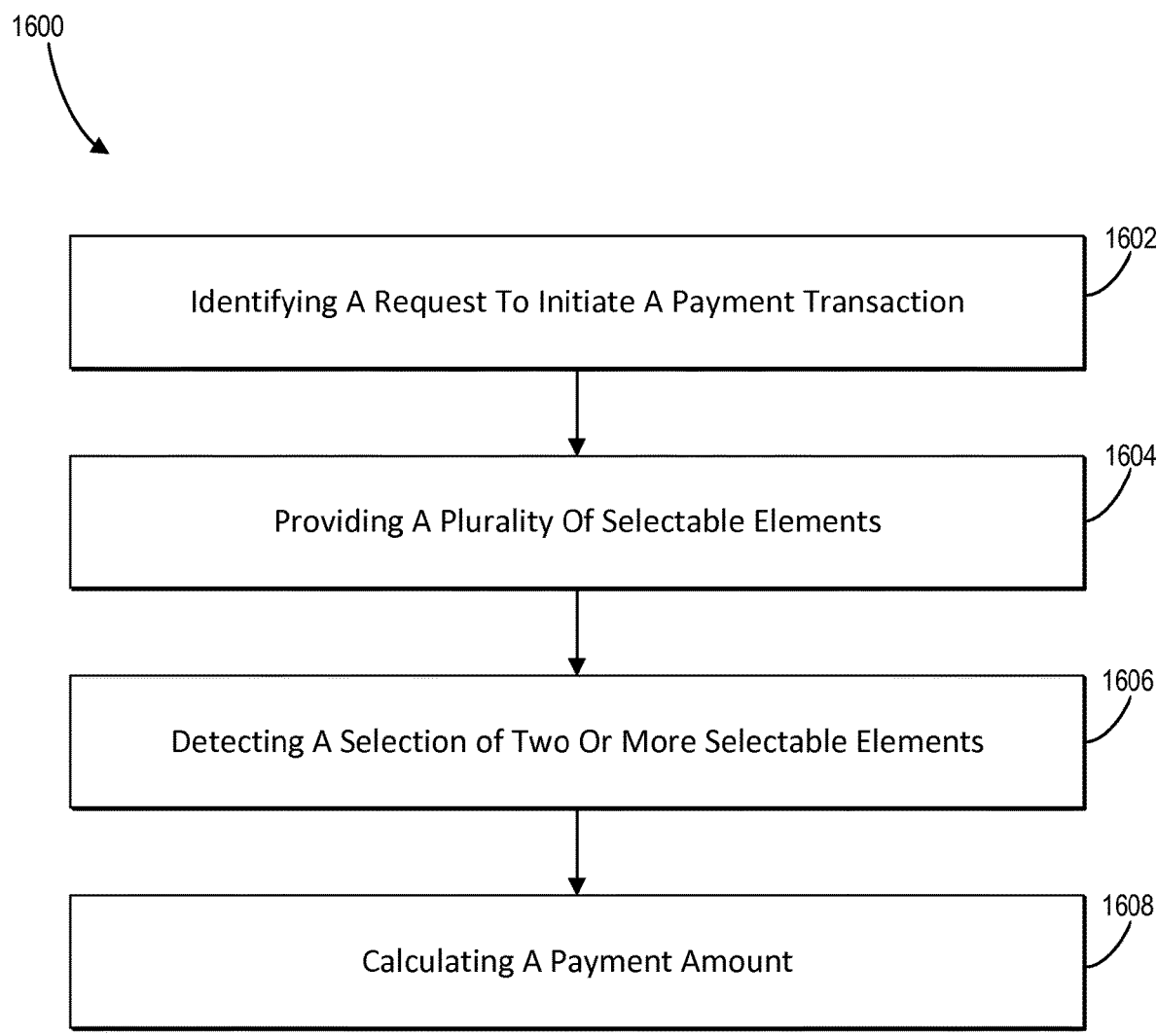
FIG. 16 illustrates a flowchart of a series of acts in a method of setting a payment amount in a payment transaction in accordance with one or more embodiments.

FIG. 16 illustrates a flowchart of a series of acts in a method 1600 of setting a payment amount in a payment transaction. The method 1600 includes an act 1602 of identifying a request to initiate a payment transaction. Specifically, act 1602 involves identifying, by at least one processor, a request to initiate a payment transaction between a user and one or more co-users participating in a conversation using a messaging application.

The method 1600 also includes an act 1604 of providing a plurality of selectable elements 1100. In particular, act 1604 involves providing, on a display device of a mobile device and in response to the identified request, a plurality of selectable elements 1100 with associated numerical values within a messaging graphical user interface of the messaging application. In one example, the associated numerical values can correspond to payment amounts for incrementing a payment amount associated with the payment transaction.

Additionally, the method 1600 includes an act 1606 of detecting a selection of two or more selectable elements 1100. Specifically, act 1606 involves detecting, by the at least one processor, a selection of two or more selectable elements 1100 of the plurality of selectable elements 1100. In one example, the plurality of selectable elements 1100 comprise icons representing currency values. To illustrate, the plurality of selectable elements 1100 can include icons representing common currency values corresponding to a nationality of the user.

Act 1606 can also involve detecting a flicking motion of the two or more selectable elements 1100 toward a conversation thread within the messaging graphical user interface. In an alternative example, act 1606 can involve detecting a tapping motion of the two or more selectable elements 1100.

The method 1600 also includes an act 1608 of calculating a payment amount. Particularly, act 1608 involves calculating, by the at least one processor, a payment amount for the payment transaction by aggregating the numerical values associated with the selected two or more selectable elements 1100.

As part of act 1608, or as an additional act, the method 1600 can also include monitoring a touch input in connection with the two or more selectable elements 1100. The method 1600 can also increment or decrement the payment amount based on a direction of the touch input. To illustrate, the method 1600 can increment the payment amount in response to detecting an upward flicking motion of the touch input in connection with the two or more selectable elements 1100. In another instance, the method 1600 can decrement the payment amount in response to detecting a downward flicking motion of the touch input the in connection with the two or more selectable elements 1100.

As part of act 1608, or as an additional act, the method 1600 can also include monitoring a period of time since a selection of a selectable element 1100 of the plurality of selectable elements 1100. The method 1600 can also include determining that the monitored period of time has met a predetermined inactivity threshold. The method 1600 can also include sending a request to complete the payment transaction with the calculated payment amount in response to determining that the monitored period of time has met the predetermined inactivity threshold. Alternatively, the method 1600 can include completing the payment transaction with the calculated payment amount in response to determining that the monitored period of time has met the predetermined inactivity threshold. The inactivity threshold can be a user-configurable time threshold.

In one example, sending the request to complete the payment transaction can include generating an electronic message comprising an indication of the payment transaction, and sending the indication of the payment transaction, and sending the electronic message to the one or more co-users. The method 1600 can include sending the electronic message as part of a time-dependent flow of the conversation within the messaging graphical user interface.

As part of act 1608, or as an additional act, the method 1600 can also include detecting a selection by the user to send the calculated payment amount to the one or more co-users, and sending the calculated payment amount to a server associated with the messaging application. For example, sending the calculated payment amount to a server associated with the messaging application can involve sending the calculated payment amount as an electronic message in a messaging exchange involving the user and the one or more co-users. In one example, the messaging exchange is an instant messaging exchange in an instant messaging application.

In some instances, the method 1600 can also include converting the calculated payment amount to a different amount based on a currency of the one or more co-users. For example, the method 1600 can detect a country of the one or more co-users, and convert the calculated payment amount into a converted value based on a currency for the detected country.

As part of act 1608, or as an additional act, the method 1600 can also include providing an initial payment amount in response to detecting a selection of a first selectable element 1100. The method 1600 can also include changing the initial payment amount provided in the messaging graphical user interface in response to detecting a selection of a second selectable element 1100 by adding a numerical value associated with the second selectable element 1100 to the initial payment amount. For example, adding the numerical value associated with the second selectable element 1100 to the initial payment amount can involve adding the numerical value associated with the second selectable element 1100 without detecting a selection of any other element after detecting the selection of the first selectable element 1100.

As part of act 1608, or as an additional act, the method 1600 can include providing, in a conversation thread of the messaging graphical user interface, the payment amount in response to calculating the payment amount. The method 1600 can also include sending a request to complete the payment transaction. For example, the request can include an electronic message provided in the conversation thread of the messaging graphical user interface.

The method 1600 can also include modifying an appearance of the payment amount in response to sending the request to complete the payment transaction. For example, modifying the appearance of the payment amount can include modifying a color of the payment amount or animating the payment amount. To illustrate, modifying the appearance of the payment amount can involve modifying the appearance of the payment amount until the payment amount is accepted. In one example, the method 1700 can involve detecting an acceptance of the payment amount and further modifying the appearance of the payment amount.

Figure 17:
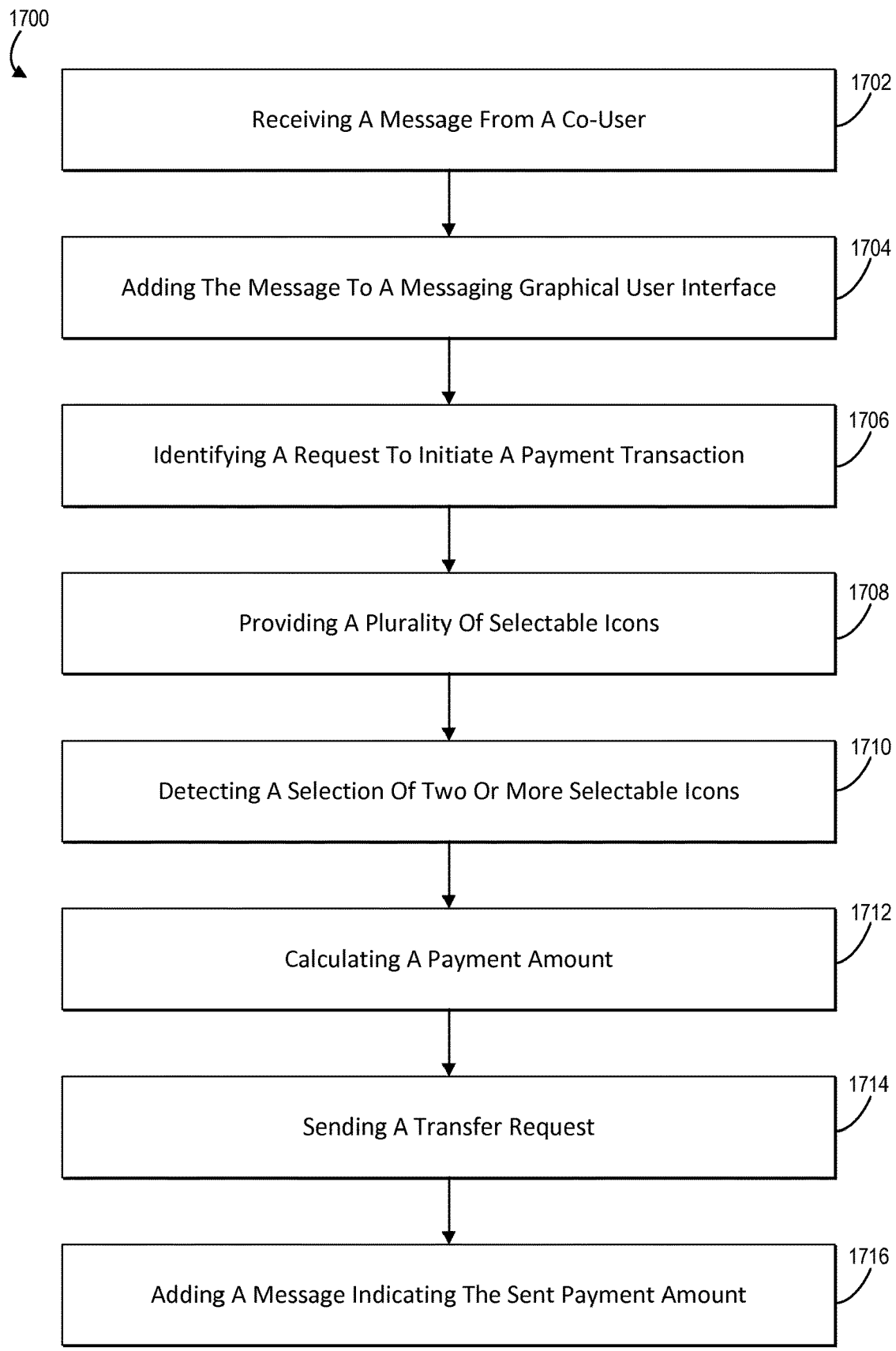
FIG. 17 illustrates a flowchart of a series of acts in another method of setting a payment amount in a payment transaction in accordance with one or more embodiments.

FIG. 17 illustrates a flowchart of a series of acts in a method 1700 of setting a payment amount in a payment transaction. The method 1700 includes an act 1702 of receiving a message from a co-user. Specifically, act 1702 involves receiving, at a mobile device, a message from a co-user for a user of the mobile device. For example, the message can include a message sent by the co-user to the user.

The method 1700 also includes an act 1704 of adding the message to a messaging graphical user interface. In particular, act 1704 involves adding the message to a messaging graphical user interface displayed at the mobile device, the messaging graphical user interface including a communication thread comprising a plurality of electronic messages exchanged between the user and the co-user. For example, act 1704 can add the message to the communication thread according to a time-dependent flow of the plurality of electronic messages exchanged between the user and the co-user.

The method 1700 further includes an act 1706 of identifying a request to initiate a payment transaction. Specifically, act 1706 involves identifying, by at least one processor, a request to initiate a payment transaction between the user and the co-user. For example, the request can include a natural language request, a special syntax request, or a selection of a payment request option in the messaging application.

The method 1700 additionally includes an act 1708 of providing a plurality of selectable icons. Specifically, act 1708 involves providing a plurality of selectable icons representing currency values within the messaging graphical user interface.

As part of act 1708, or as an additional act, the method can also include determining a currency used by the user, and setting the currency values based on the determined currency. For example, determining the currency can include determining a country in which the user is located. For example, the currency values can correspond to common currency values for the country in which the user is located.

The method also includes an act 1710 of detecting a selection of two or more selectable icons. In particular, act 1710 involves detecting, by the at least one processor of the mobile device, a selection of two or more selectable icons of the plurality of selectable icons.

Additionally, the method 1700 includes an act 1712 of calculating a payment amount. Specifically, act 1712 involves calculating, by the at least one processor, a payment amount for the payment transaction by aggregating the currency values associated with the selected two or more selectable icons. For example, act 1712 can involve incrementing the payment amount for each selected icon. To illustrate, act 1712 can involve incrementing the payment amount upon detecting a selection of each selectable icon.

The method 1700 also includes an act 1714 of sending a transfer request. In particular, act 1714 involves request to transfer the payment amount from the user to the co-user. For example, act 1714 can involve monitoring a period of time since a selection of a selectable icon of the plurality of selectable icons. Act 1714 can further involve determining that the monitored period of time has met a predetermined inactivity threshold. Act 1714 can also involve, in response to determining that the monitored period of time has met the predetermined inactivity threshold, sending the request to transfer the payment amount. Alternatively, act 1714 can involve, in response to determining that the monitored period of time has met the predetermined inactivity threshold, completing the payment transaction for the payment amount. In one example, the inactivity threshold amount of time is a user-configurable time threshold.

The method 1700 also includes an act 1716 of adding a messaging indicating the sent payment amount. Specifically, act 1716 involves adding a message to the messaging graphical user interface indicting that the payment amount has been sent to the co-user. For example, act 1716 can involve adding the message to the conversation thread according to a time-dependent flow of electronic messages in the conversation thread.

As part of act 1716, or as an additional act, the method 1700 can include providing, in the conversation thread, an initial payment amount in response to detecting a selection of a first selectable icon. The method 1700 can also include changing the initial payment amount provided in the messaging graphical user interface to the payment amount in response to detecting a selection of one or more additional selectable icons by adding the currency value associated with the one or more additional selectable icons to the initial payment amount. Act 1716 can further involve modifying an appearance of the payment amount provided in the conversation thread in response to sending the request to transfer the payment amount from the user to the co-user. Act 1716 can additionally or alternatively involve modifying an appearance of the payment amount provided in the conversation thread in response to detecting acceptance of the payment amount from the co-user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 18 illustrates a block diagram of exemplary computing device 1800 that may be configured to perform one or more of the processes described above. One will appreciate that one or more computing devices such as the computing device 1800 may implement the payment system 100. As shown by FIG. 18, the computing device 1800 can comprise a processor 1802, a memory 1804, a storage device 1806, an I/O interface 1808, and a communication interface 1810, which may be communicatively coupled by way of a communication infrastructure 1812. While an exemplary computing device 1800 is shown in FIG. 18, the components illustrated in FIG. 18 are not intended to be limiting. Additional or alternative components may be used in other embodiments. Furthermore, in certain embodiments, the computing device 1800 can include fewer components than those shown in FIG. 18. Components of the computing device 1800 shown in FIG. 18 will now be described in additional detail.

In one or more embodiments, the processor 1802 includes hardware for executing instructions, such as those making up a computer program. As an example and not by way of limitation, to execute instructions, the processor 1802 may retrieve (or fetch) the instructions from an internal register, an internal cache, the memory 1804, or the storage device 1806 and decode and execute them. In one or more embodiments, the processor 1802 may include one or more internal caches for data, instructions, or addresses. As an example and not by way of limitation, the processor 1802 may include one or more instruction caches, one or more data caches, and one or more translation lookaside buffers (TLBs). Instructions in the instruction caches may be copies of instructions in the memory 1804 or the storage 1806.

The memory 1804 may be used for storing data, metadata, and programs for execution by the processor(s). The memory 1804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1804 may be internal or distributed memory.

The storage device 1806 includes storage for storing data or instructions. As an example and not by way of limitation, storage device 1806 can comprise a non-transitory storage medium described above. The storage device 1806 may include a hard disk drive (HDD), a floppy disk drive, flash memory, an optical disc, a magneto-optical disc, magnetic tape, or a Universal Serial Bus (USB) drive or a combination of two or more of these. The storage device 1806 may include removable or non-removable (or fixed) media, where appropriate. The storage device 1806 may be internal or external to the computing device 1800. In one or more embodiments, the storage device 1806 is non-volatile, solid-state memory. In other embodiments, the storage device 1806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1808 allows a user to provide input to, receive output from, and otherwise transfer data to and receive data from computing device 1800. The I/O interface 1808 may include a mouse, a keypad or a keyboard, a touch screen, a camera, an optical scanner, network interface, modem, other known I/O devices or a combination of such I/O interfaces. The I/O interface 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1808 is configured to provide graphical data to a display for presentation to a user. The graphical data may be representative of one or more graphical user interfaces and/or any other graphical content as may serve a particular implementation.

The communication interface 1810 can include hardware, software, or both. In any event, the communication interface 1810 can provide one or more interfaces for communication (such as, for example, packet-based communication) between the computing device 1800 and one or more other computing devices or networks. As an example and not by way of limitation, the communication interface 1810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1812 may include hardware, software, or both that couples components of the computing device 1800 to each other. As an example and not by way of limitation, the communication infrastructure 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 19:
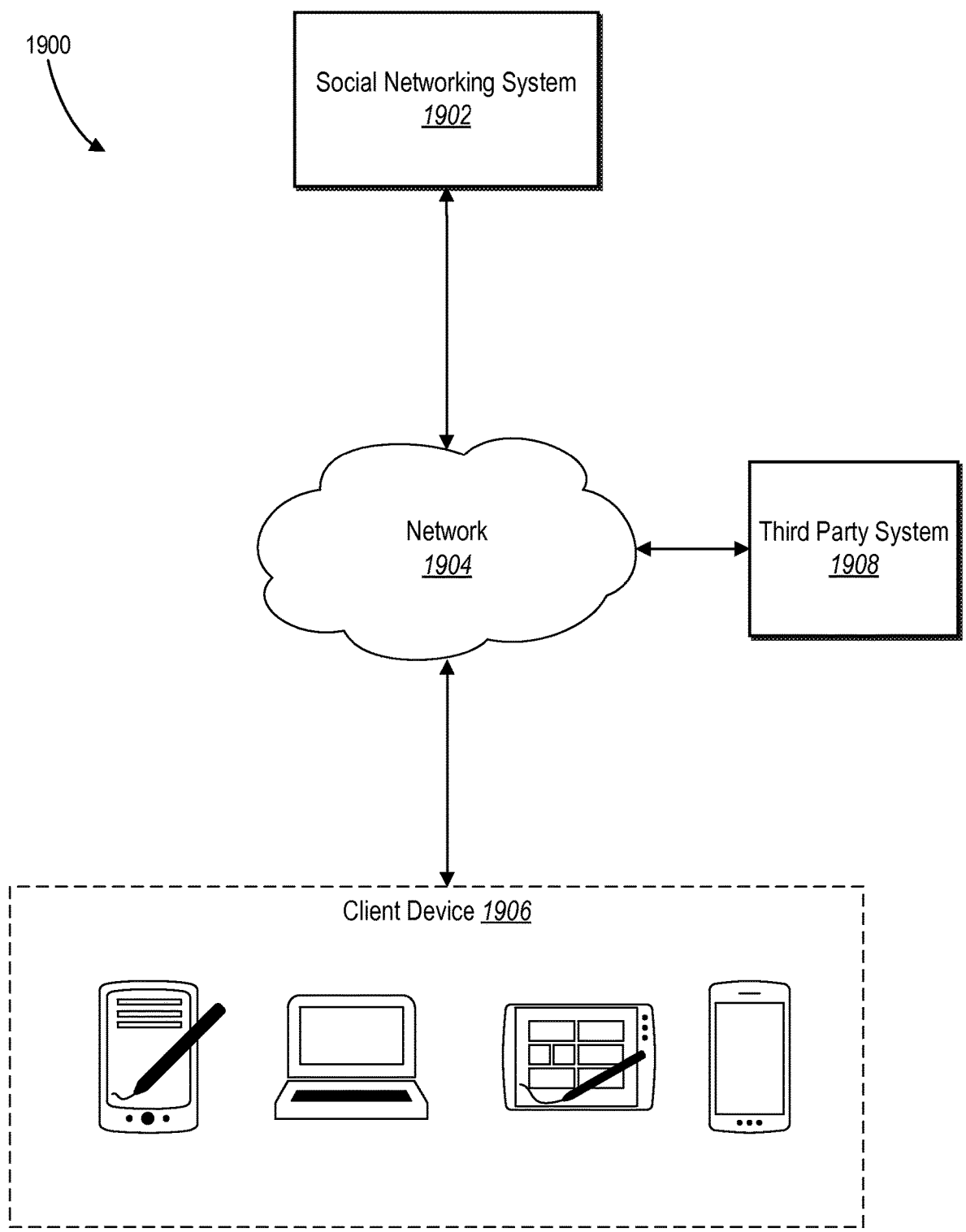
FIG. 19 illustrates an example network environment of a social-networking system in accordance with one or more embodiments.

FIG. 19 illustrates an example network environment 1900 of a social-networking system. Network environment 1900 includes a client system 1906, a social-networking system 1902, and a third-party system 1908 connected to each other by a network 1904. Although FIG. 19 illustrates a particular arrangement of client system 1906, social-networking system 1902, third-party system 1908, and network 1904, this disclosure contemplates any suitable arrangement of client system 1906, social-networking system 1902, third-party system 1908, and network 1904. As an example and not by way of limitation, two or more of client system 1906, social-networking system 1902, and third-party system 1908 may be connected to each other directly, bypassing network 1904. As another example, two or more of client system 1906, social-networking system 1902, and third-party system 1908 may be physically or logically co-located with each other in whole or in part. Moreover, although FIG. 19 illustrates a particular number of client systems 1906, social-networking systems 1902, third-party systems 1908, and networks 1904, this disclosure contemplates any suitable number of client systems 1906, social-networking systems 1902, third-party systems 1908, and networks 1904. As an example and not by way of limitation, network environment 1900 may include multiple client system 1906, social-networking systems 1902, third-party systems 1908, and networks 1904.

This disclosure contemplates any suitable network 1904. As an example and not by way of limitation, one or more portions of network 1904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1904 may include one or more networks 1904.

Links may connect client system 1906, social-networking system 1902, and third-party system 1908 to communication network 1904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1900. One or more first links may differ in one or more respects from one or more second links.

In particular embodiments, client system 1906 may be an electronic device including hardware, software, or embedded logic components or a combination of two or more such components and capable of carrying out the appropriate functionalities implemented or supported by client system 1906. As an example and not by way of limitation, a client system 1906 may include any of the computing devices discussed above in relation to FIG. 16. A client system 1906 may enable a network user at client system 1906 to access network 1904. A client system 1906 may enable its user to communicate with other users at other client systems 1906.

In particular embodiments, client system 1906 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1906 may enter a Uniform Resource Locator (URL) or other address directing the web browser to a particular server (such as server, or a server associated with a third-party system 1908), and the web browser may generate a Hyper Text Transfer Protocol (HTTP) request and communicate the HTTP request to server. The server may accept the HTTP request and communicate to client system 1906 one or more Hyper Text Markup Language (HTML) files responsive to the HTTP request. Client system 1906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1902 may be a network-addressable computing system that can host an online social network. Social-networking system 1902 may generate, store, receive, and send social-networking data, such as, for example, user-profile data, concept-profile data, social-graph information, or other suitable data related to the online social network. Social-networking system 1902 may be accessed by the other components of network environment 1900 either directly or via network 1904. In particular embodiments, social-networking system 1902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 1902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1906, a social-networking system 1902, or a third-party system 1908 to manage, retrieve, modify, add, or delete, the information stored in data store.

In particular embodiments, social-networking system 1902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 1902 may provide users of the online social network the ability to communicate and interact with other users. In particular embodiments, users may join the online social network via social-networking system 1902 and then add connections (e.g., relationships) to a number of other users of social-networking system 1902 whom they want to be connected to. Herein, the term "friend" may refer to any other user of social-networking system 1902 with whom a user has formed a connection, association, or relationship via social-networking system 1902.

In particular embodiments, social-networking system 1902 may provide users with the ability to take actions on various types of items or objects, supported by social-networking system 1902. As an example and not by way of limitation, the items and objects may include groups or social networks to which users of social-networking system 1902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1902 or by an external system of third-party system 1908, which is separate from social-networking system 1902 and coupled to social-networking system 1902 via a network 1904.

In particular embodiments, social-networking system 1902 may be capable of linking a variety of entities. As an example and not by way of limitation, social-networking system 1902 may enable users to interact with each other as well as receive content from third-party systems 1908 or other entities, or to allow users to interact with these entities through an application programming interfaces (API) or other communication channels.

In particular embodiments, a third-party system 1908 may include one or more types of servers, one or more data stores, one or more interfaces, including but not limited to APIs, one or more web services, one or more content sources, one or more networks, or any other suitable components, e.g., that servers may communicate with. A third-party system 1908 may be operated by a different entity from an entity operating social-networking system 1902. In particular embodiments, however, social-networking system 1902 and third-party systems 1908 may operate in conjunction with each other to provide social-networking services to users of social-networking system 1902 or third-party systems 1908. In this sense, social-networking system 1902 may provide a platform, or backbone, which other systems, such as third-party systems 1908, may use to provide social-networking services and functionality to users across the Internet.

In particular embodiments, a third-party system 1908 may include a third-party content object provider. A third-party content object provider may include one or more sources of content objects, which may be communicated to a client system 1906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1902 also includes user-generated content objects, which may enhance a user's interactions with social-networking system 1902. User-generated content may include anything a user can add, upload, send, or "post" to social-networking system 1902. As an example and not by way of limitation, a user communicates posts to social-networking system 1902 from a client system 1906. Posts may include data such as status updates or other textual data, location information, photos, videos, links, music or other similar data or media. Content may also be added to social-networking system 1902 by a third-party through a "communication channel," such as a newsfeed or stream.

In particular embodiments, social-networking system 1902 may include a variety of servers, sub-systems, programs, modules, logs, and data stores. In particular embodiments, social-networking system 1902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1902 may also include suitable components such as network interfaces, security mechanisms, load balancers, failover servers, management-and-network-operations consoles, other suitable components, or any suitable combination thereof. In particular embodiments, social-networking system 1902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1902 to one or more client systems 1906 or one or more third-party system 1908 via network 1904. The web server may include a mail server or other messaging functionality for receiving and routing messages between social-networking system 1902 and one or more client systems 1906. An API-request server may allow a third-party system 1908 to access information from social-networking system 1902 by calling one or more APIs. An action logger may be used to receive communications from a web server about a user's actions on or off social-networking system 1902. In conjunction with the action log, a third-party-content-object log may be maintained of user exposures to third-party-content objects. A notification controller may provide information regarding content objects to a client system 1906. Information may be pushed to a client system 1906 as notifications, or information may be pulled from client system 1906 responsive to a request received from client system 1906. Authorization servers may be used to enforce one or more privacy settings of the users of social-networking system 1902. A privacy setting of a user determines how particular information associated with a user can be shared. The authorization server may allow users to opt in to or opt out of having their actions logged by social-networking system 1902 or shared with other systems (e.g., third-party system 1908), such as, for example, by setting appropriate privacy settings. Third-party-content-object stores may be used to store content objects received from third parties, such as a third-party system 1908. Location stores may be used for storing location information received from client systems 1906 associated with users. Advertisement-pricing modules may combine social information, the current time, location information, or other suitable information to provide relevant advertisements, in the form of notifications, to a user.

Figure 20:
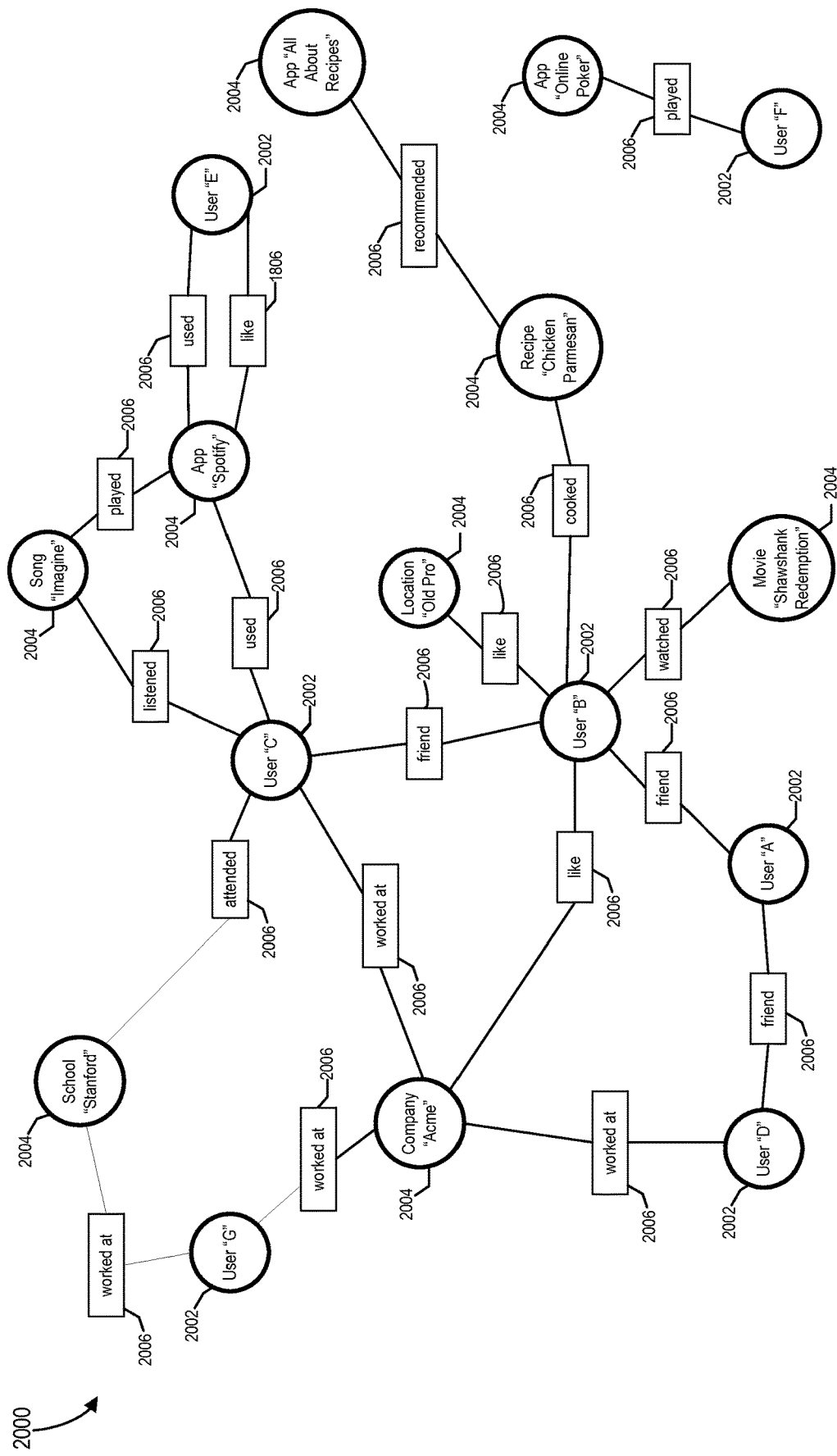
FIG. 20 illustrates an example social graph for a social-networking system in accordance with one or more embodiments.

FIG. 20 illustrates example social graph 2000. In particular embodiments, social-networking system 1902 may store one or more social graphs 2000 in one or more data stores. In particular embodiments, social graph 2000 may include multiple nodes—which may include multiple user nodes 2002 or multiple concept nodes 2004—and multiple edges 2006 connecting the nodes. Example social graph 2000 illustrated in FIG. 20 is shown, for didactic purposes, in a two-dimensional visual map representation. In particular embodiments, a social-networking system 1902, client system 1906, or third-party system 1908 may access social graph 2000 and related social-graph information for suitable applications. The nodes and edges of social graph 2000 may be stored as data objects, for example, in a data store (such as a social-graph database). Such a data store may include one or more searchable or query able indexes of nodes or edges of social graph 2000.

In particular embodiments, a user node 2002 may correspond to a user of social-networking system 1902. As an example and not by way of limitation, a user may be an individual (human user), an entity (e.g., an enterprise, business, or third-party application), or a group (e.g., of individuals or entities) that interacts or communicates with or over social-networking system 1902. In particular embodiments, when a user registers for an account with social-networking system 1902, social-networking system 1902 may create a user node 2002 corresponding to the user, and store the user node 2002 in one or more data stores. Users and user nodes 2002 described herein may, where appropriate, refer to registered users and user nodes 2002 associated with registered users. In addition or as an alternative, users and user nodes 2002 described herein may, where appropriate, refer to users that have not registered with social-networking system 1902. In particular embodiments, a user node 2002 may be associated with information provided by a user or information gathered by various systems, including social-networking system 1902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 2004 may correspond to a concept. As an example and not by way of limitation, a concept may correspond to a place (such as, for example, a movie theater, restaurant, landmark, or city); a website (such as, for example, a website associated with social-network system 1902 or a third-party website associated with a web-application server); an entity (such as, for example, a person, business, group, sports team, or celebrity); a resource (such as, for example, an audio file, video file, digital photo, text file, structured document, or application) which may be located within social-networking system 1902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 2004 may be associated with information of a concept provided by a user or information gathered by various systems, including social-networking system 1902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 2004 may be associated with one or more data objects corresponding to information associated with concept node 2004. In particular embodiments, a concept node 2004 may correspond to one or more webpages.

In particular embodiments, a node in social graph 1800 may represent or be represented by a webpage (which may be referred to as a "profile page"). Profile pages may be hosted by or accessible to social-networking system 1902. Profile pages may also be hosted on third-party websites associated with a third-party server 1708. As an example and not by way of limitation, a profile page corresponding to a particular external webpage may be the particular external webpage and the profile page may correspond to a particular concept node 2004. Profile pages may be viewable by all or a selected subset of other users. As an example and not by way of limitation, a user node 2002 may have a corresponding user-profile page in which the corresponding user may add content, make declarations, or otherwise express himself or herself. As another example and not by way of limitation, a concept node 2004 may have a corresponding concept-profile page in which one or more users may add content, make declarations, or express themselves, particularly in relation to the concept corresponding to concept node 2004.

In particular embodiments, a concept node 2004 may represent a third-party webpage or resource hosted by a third-party system 1908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1906 to send to social-networking system 1902 a message indicating the user's action. In response to the message, social-networking system 1902 may create an edge (e.g., an "eat" edge) between a user node 2002 corresponding to the user and a concept node 2004 corresponding to the third-party webpage or resource and store edge 2006 in one or more data stores.

In particular embodiments, a pair of nodes in social graph 1800 may be connected to each other by one or more edges 2006. An edge 2006 connecting a pair of nodes may represent a relationship between the pair of nodes. In particular embodiments, an edge 2006 may include or represent one or more data objects or attributes corresponding to the relationship between a pair of nodes. As an example and not by way of limitation, a first user may indicate that a second user is a "friend" of the first user. In response to this indication, social-networking system 1902 may send a "friend request" to the second user. If the second user confirms the "friend request," social-networking system 1902 may create an edge 2006 connecting the first user's user node 2002 to the second user's user node 2002 in social graph 1800 and store edge 2006 as social-graph information in one or more of data stores. In the example of FIG. 20, social graph 1800 includes an edge 2006 indicating a friend relation between user nodes 1802 of user "A" and user "B" and an edge indicating a friend relation between user nodes 1802 of user "C" and user "B." Although this disclosure describes or illustrates particular edges 2006 with particular attributes connecting particular user nodes 1802, this disclosure contemplates any suitable edges 2006 with any suitable attributes connecting user nodes 1802. As an example and not by way of limitation, an edge 2006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1800 by one or more edges 2006.

In particular embodiments, an edge 2006 between a user node 2002 and a concept node 2004 may represent a particular action or activity performed by a user associated with user node 2002 toward a concept associated with a concept node 2004. As an example and not by way of limitation, as illustrated in FIG. 20, a user may "like," "attended," "played," "listened," "cooked," "worked at," or "watched" a concept, each of which may correspond to a edge type or subtype. A concept-profile page corresponding to a concept node 2004 may include, for example, a selectable "check in" icon (such as, for example, a clickable "check in" icon) or a selectable "add to favorites" icon. Similarly, after a user clicks these icons, social-networking system 1902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1902 may create a "listened" edge 2006 and a "used" edge (as illustrated in FIG. 20) between user nodes 1802 corresponding to the user and concept nodes 2004 corresponding to the song and application to indicate that the user listened to the song and used the application. Moreover, social-networking system 1902 may create a "played" edge 2006 (as illustrated in FIG. 20) between concept nodes 2004 corresponding to the song and the application to indicate that the particular song was played by the particular application. In this case, "played" edge 2006 corresponds to an action performed by an external application (SPOTIFY) on an external audio file (the song "Imagine"). Although this disclosure describes particular edges 2006 with particular attributes connecting user nodes 1802 and concept nodes 2004, this disclosure contemplates any suitable edges 2006 with any suitable attributes connecting user nodes 1802 and concept nodes 2004. Moreover, although this disclosure describes edges between a user node 2002 and a concept node 2004 representing a single relationship, this disclosure contemplates edges between a user node 2002 and a concept node 2004 representing one or more relationships. As an example and not by way of limitation, an edge 2006 may represent both that a user likes and has used at a particular concept. Alternatively, another edge 2006 may represent each type of relationship (or multiples of a single relationship) between a user node 2002 and a concept node 2004 (as illustrated in FIG. 20 between user node 2002 for user "E" and concept node 2004 for "SPOTIFY").

In particular embodiments, social-networking system 1902 may create an edge 2006 between a user node 2002 and a concept node 2004 in social graph 1800. As an example and not by way of limitation, a user viewing a concept-profile page (such as, for example, by using a web browser or a special-purpose application hosted by the user's client system 1906) may indicate that he or she likes the concept represented by the concept node 2004 by clicking or selecting a "Like" icon, which may cause the user's client system 1906 to send to social-networking system 1902 a message indicating the user's liking of the concept associated with the concept-profile page. In response to the message, social-networking system 1902 may create an edge 2006 between user node 2002 associated with the user and concept node 2004, as illustrated by "like" edge 2006 between the user and concept node 2004. In particular embodiments, social-networking system 1902 may store an edge 2006 in one or more data stores. In particular embodiments, an edge 2006 may be automatically formed by social-networking system 1902 in response to a particular user action. As an example and not by way of limitation, if a first user uploads a picture, watches a movie, or listens to a song, an edge 2006 may be formed between user node 2002 corresponding to the first user and concept nodes 2004 corresponding to those concepts. Although this disclosure describes forming particular edges 2006 in particular manners, this disclosure contemplates forming any suitable edges 2006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1902) or RSVP (e.g., through social-networking system 1902) to an event associated with the advertisement. In addition or as an alternative, an advertisement may include social-networking-system context directed to the user. As an example and not by way of limitation, an advertisement may display information about a friend of the user within social-networking system 1902 who has taken an action associated with the subject matter of the advertisement.

In particular embodiments, social-networking system 1902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1902 may calculate a coefficient based on a user's actions. Social-networking system 1902 may monitor such actions on the online social network, on a third-party system 1908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 1902 may calculate a coefficient based on the user's actions with particular types of content. The content may be associated with the online social network, a third-party system 1908, or another suitable system. The content may include users, profile pages, posts, news stories, headlines, instant messages, chat room conversations, emails, advertisements, pictures, video, music, other suitable objects, or any combination thereof. Social-networking system 1902 may analyze a user's actions to determine whether one or more of the actions indicate an affinity for subject matter, content, other users, and so forth. As an example and not by way of limitation, if a user may make frequently posts content related to "coffee" or variants thereof, social-networking system 1902 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1902 may calculate a coefficient based on the type of relationship between particular objects. Referencing the social graph 1800, social-networking system 1902 may analyze the number and/or type of edges 2006 connecting particular user nodes 1802 and concept nodes 2004 when calculating a coefficient. As an example and not by way of limitation, user nodes 1802 that are connected by a spouse-type edge (representing that the two users are married) may be assigned a higher coefficient than a user nodes 1802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1902 may determine that the user has a higher coefficient with respect to the first photo than the second photo because having a tagged-in-type relationship with content may be assigned a higher weight and/or rating than having a like-type relationship with content. In particular embodiments, social-networking system 1902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1800. As an example and not by way of limitation, social-graph entities that are closer in the social graph 1800 (i.e., fewer degrees of separation) may have a higher coefficient than entities that are further apart in the social graph 1800.

In particular embodiments, social-networking system 1902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1906 of the user). A first user may be more interested in other users or concepts that are closer to the first user. As an example and not by way of limitation, if a user is one mile from an airport and two miles from a gas station, social-networking system 1902 may determine that the user has a higher coefficient for the airport than the gas station based on the proximity of the airport to the user.

In particular embodiments, social-networking system 1902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1902 may provide information that is relevant to user's interests and current circumstances, increasing the likelihood that they will find such information of interest. In particular embodiments, social-networking system 1902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1908 (e.g., via an API or other communication channel), or from another suitable system. In response to the request, social-networking system 1902 may calculate the coefficient (or access the coefficient information if it has previously been calculated and stored). In particular embodiments, social-networking system 1902 may measure an affinity with respect to a particular process. Different processes (both internal and external to the online social network) may request a coefficient for a particular object or set of objects. Social-networking system 1902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 2004 corresponding to a particular photo may have a privacy setting specifying that the photo may only be accessed by users tagged in the photo and their friends. In particular embodiments, privacy settings may allow users to opt in or opt out of having their actions logged by social-networking system 1902 or shared with other systems (e.g., third-party system 1908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 1902 may send a request to the data store for the object. The request may identify the user associated with the request and may only be sent to the user (or a client system 1906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computer system to:
analyze, using natural language processing, a plurality of electronic messages previously exchanged between a user and one or more co-users within a messaging thread to determine, for the plurality of electronic messages, a context from a plurality of natural language phrases in the plurality of electronic messages;
infer a payment event based on the determined context for the plurality of electronic messages previously exchanged between the user and the one or more co-users, wherein inferring the payment event comprises determining a sender, one or more recipients, and payment information for processing a payment transaction based on the determined context from two or more natural language phrases of the plurality of natural language phrases;
identify, in response to inferring the payment event and using natural language processing, one or more character strings indicating the payment event in an electronic message of the plurality of electronic messages previously exchanged between the user and the one or more co-users within the messaging thread, wherein the electronic message comprising the one or more character strings is composed by the user and sent to the one or more co-users in the plurality of electronic messages previously exchanged between the user and the one or more co-users within the messaging thread, the one or more character strings comprising a payment amount of the inferred payment event;
convert, in response to inferring the payment event, the one or more character strings of the electronic message composed by the user into a payment initiation selectable object within the electronic message displayed within the messaging thread, wherein converting the one or more character strings into the payment initiation selectable object comprises changing one or more visual attributes of the one or more character strings in the electronic message within the messaging thread to visually distinguish the one or more character strings from other text in the messaging thread at a client device of the user and one or more client devices of the one or more co-users;
pre-populate, in response to inferring the payment event, payment transaction details for processing the payment transaction using the sender, the one or more recipients, and the payment information from the inferred payment event;
identify a selection of the payment initiation selectable object in response to a user input interacting with the payment initiation selectable object in the electronic message within the messaging thread at the client device of the user or the one or more client devices of the one or more co-users; and
initiate, in response to the selection of the payment initiation selectable object, a payment transaction based on the inferred payment event and the pre-populated payment transaction details.

2. The non-transitory computer readable storage medium as recited in claim 1, wherein the instructions, when executed by the at least one processor, cause the computer system to analyze, using natural language processing, the plurality of electronic messages by:
analyzing a first electronic message from the plurality of electronic messages to identify a first natural language phrase;
analyzing a second electronic message from the plurality of electronic messages to identify a second natural language phrase; and
determining the context from the first natural language phrase and the second natural language phrase.

3. The non-transitory computer readable storage medium as recited in claim 1, wherein the plurality of natural language phrases comprise at least one predetermined phrase, character string, or symbol.

4. The non-transitory computer readable storage medium as recited in claim 1, wherein the plurality of natural language phrases comprise text without a predetermined syntax.

5. The non-transitory computer readable storage medium as recited in claim 1, wherein the instructions, when executed by the at least one processor, cause the computer system to convert the one or more character strings of the electronic message composed by the user into the payment initiation selectable object by converting text from the electronic message composed by the user into an object that, when selected, causes the at least one processor to initiate the payment transaction.

6. The non-transitory computer readable storage medium as recited in claim 1, wherein the instructions, when executed by the at least one processor, cause the computer system to convert the one or more character strings of the electronic message composed by the user into the payment initiation selectable object by converting an entirety of the electronic message composed by the user into a selectable object.

7. The non-transitory computer readable storage medium as recited in claim 1, wherein the instructions, when executed by the at least one processor, cause the computer system to convert the one or more character strings of the electronic message composed by the user into the payment initiation selectable object cause the computer system to change one or more visual attributes of the payment amount to indicate that the payment amount is selectable.

8. The non-transitory computer readable storage medium as recited in claim 1, wherein the electronic message composed by the user comprises the payment amount, and the electronic message composed by the user is preceded by an electronic message of the plurality of electronic messages indicating that the user or the one or more co-users is the sender.

9. The non-transitory computer readable storage medium as recited in claim 1, further comprising instructions that, when executed by the at least one processor, cause the computer system to initiate the payment transaction by providing a confirmation request to the user in response to the selection of the payment initiation selectable object.

10. The non-transitory computer readable storage medium as recited in claim 1, wherein the payment initiation selectable object comprises an option to request a payment from the one or more co-users.

11. The non-transitory computer readable storage medium as recited in claim 1, wherein the instructions, when executed by the at least one processor, cause the computer system to infer the payment event based on analyzing the plurality of electronic messages previously exchanged between the user and the one or more co-users by identifying a natural language phrase that indicates the user desires to send or owes the one or more co-users money.

12. The non-transitory computer readable storage medium as recited in claim 10, wherein the instructions, when executed by the at least one processor, cause the computer system to initiate the payment transaction in response to the selection of the payment initiation selectable object by sending a payment request to the one or more co-users to pay the user the payment amount.

13. A non-transitory computer readable storage medium comprising instructions that, when executed by at least one processor, cause a computer system to:
analyze, using natural language processing, a plurality of electronic messages previously exchanged between a user and one or more co-users within a messaging thread to determine, for the plurality of electronic messages, a context from a plurality of natural language phrases in the plurality of electronic messages;
infer a payment event based on the determined context for the plurality of electronic messages previously exchanged between the user and the one or more co-users, wherein inferring the payment event comprises determining a sender, one or more recipients, and payment information for processing a payment transaction based on the determined context from two or more natural language phrases of the plurality of natural language phrases;
identify, in response to inferring the payment event and using natural language processing, one or more character strings indicating the payment event in an electronic message of the plurality of electronic messages previously exchanged between the user and the one or more co-users within the messaging thread, wherein the electronic message comprising the one or more character strings is composed by the user and sent to the one or more co-users in the plurality of electronic messages previously exchanged between the user and the one or more co-users within the messaging thread, the one or more character strings comprising a payment amount of the inferred payment event;
convert, in response to inferring the payment event, the one or more character strings of the electronic message composed by the user into a payment initiation selectable object within the messaging thread displayed within the messaging thread, wherein converting the one or more character strings into the payment initiation selectable object comprises changing one or more visual attributes of the one or more character strings in the electronic message within the messaging thread to visually distinguish the one or more character strings from other text in the messaging thread at a client device of the user and one or more client devices of the one or more co-users;
pre-populate, in response to inferring the payment event, payment transaction details for processing the payment transaction using the sender, the one or more recipients, and the payment information from the inferred payment event;
identify a selection of the payment initiation selectable object in response to a user input interacting with the payment initiation selectable object in the electronic message within the messaging thread at the client device of the user or othe one or more client devices of the one or more co-users; and
initiate, in response to the selection of the payment initiation selectable object, the payment transaction based on the inferred payment event and the pre-populated payment transaction details.

14. The non-transitory computer readable storage medium as recited in claim 13, wherein the instructions, when executed by the at least one processor, cause the computer system to analyze, using natural language processing, the plurality of electronic messages by:
analyzing a first electronic message from the plurality of electronic messages to identify a first natural language phrase;
analyzing a second electronic message from the plurality of electronic messages to identify a second natural language phrase; and
determining a context that indicates a payment event from the first natural language phrase and the second natural language phrase.

15. The non-transitory computer readable storage medium as recited in claim 14, wherein the instructions, when executed by the at least one processor, cause the computer system to identify the payment event by identifying, in the first natural language phrase, a request for payment from the one or more co-users using natural language processing.

16. The non-transitory computer readable storage medium as recited in claim 14, wherein the instructions that, when executed by the at least one processor, cause the computer system to identify the payment event by identifying, in the second natural language phrase, a request to send payment to the one or more co-users using natural language processing.

17. The non-transitory computer readable storage medium as recited in claim 13, wherein the instructions that, when executed by the at least one processor, cause the computer system to convert the one or more character strings of the electronic message composed by the user into the payment initiation selectable object cause the computer system to change one or more visual attributes of the payment amount to indicate that the payment amount is selectable.

18. A mobile device comprising:
at least one processor;
a display device; and
at least one non-transitory computer readable storage medium storing instructions thereon, that, when executed by the at least one processor, cause the mobile device to:
analyze, using natural language processing, a plurality of electronic messages previously exchanged between a user and one or more co-users within a messaging thread to determine, for the plurality of electronic messages, a context from a plurality of natural language phrases in the plurality of electronic messages;
infer a payment event based on the determined context for the plurality of electronic messages previously exchanged between the user and the one or more co-users, wherein inferring the payment event comprises determining a sender, one or more recipients, and payment information for processing the payment transaction based on the determined context from two or more natural language phrases of the plurality of natural language phrases;
identify, in response to inferring the payment event and using natural language processing, one or more character strings indicating the payment event in an electronic message of the plurality of electronic messages previously exchanged between the user and the one or more co-users within the messaging thread, wherein the electronic message comprising the one or more character strings is composed by the user and sent to the one or more co-users in the plurality of electronic messages previously exchanged between the user and the one or more co-users within the messaging thread, the one or more character strings comprising a payment amount of the inferred payment event;

convert, in response to inferring the payment event, the one or more character strings of the electronic message composed by the user into a payment initiation selectable object within the electronic message displayed within the messaging thread, wherein converting the one or more character strings into the payment initiation selectable object comprises changing one or more visual attributes of the one or more character strings in the electronic message within the messaging thread to visually distinguish the one or more character strings from other text in the messaging thread at a client device of the user and one or more client devices of the one or more co-users;

pre-populate, in response to inferring the payment event, payment transaction details for processing the payment transaction using the sender, the one or more recipients, and the payment information from the inferred payment event;

identify a selection of the payment initiation selectable object in response to a user input interacting with the payment initiation selectable object in the electronic message within the messaging thread at the client device of the user or the one or more client devices of the one or more co-users; and initiate, in response to the selection of the payment initiation selectable object, a payment transaction based on the inferred payment event and the pre-populated payment transaction details.

19. The mobile device as recited in claim 18, further comprising instructions that, when executed by the at least one processor, cause the mobile device to analyze the plurality of electronic messages by:

analyzing a first electronic message from the plurality of electronic messages to identify a first natural language phrase;

analyzing a second electronic message from the plurality of electronic messages to identify a second natural language phrase; and determining the context from the first natural language phrase and the second natural language phrase.

20. The mobile device as recited in claim 18, further comprising instructions that, when executed by the at least one processor, cause the mobile device to convert the one or more character strings of the electronic message composed by the user into the payment initiation selectable object by converting text from the electronic message composed by the user into an object that, when selected, causes the at least one processor to initiate the payment transaction.

\* \* \* \* \*